(12) United States Patent
Witchell et al.

(10) Patent No.: US 11,103,049 B2
(45) Date of Patent: Aug. 31, 2021

(54) METHOD, SYSTEM AND APPARATUS FOR DISPENSING PRODUCTS FOR A PERSONAL CARE SERVICE, INSTRUCTING ON PROVIDING A PERSONAL CARE TREATMENT SERVICE, AND SELECTING A PERSONAL CARE SERVICE

(71) Applicant: ColorCulture Network, LLC, Newtown, PA (US)

(72) Inventors: David J. Witchell, Newtown, PA (US); Carl Wickstrom, Bellevue, WA (US); Alana Barakat, Bellevue, PA (US); Scott Bush, Bellevue, WA (US); Dilan DeSilva, Philadelphia, PA (US); William Arnold, Lambertville, NJ (US); Eric Thompson, Lambertville, PA (US); Musse Olol, Portland, OR (US)

(73) Assignee: COLORCULTURE NETWORK, LLC, Newtown, PA (US)

(*) Notice: Subject to any disclaimer, the term of this patent is extended or adjusted under 35 U.S.C. 154(b) by 177 days.

(21) Appl. No.: 15/972,924

(22) Filed: May 7, 2018

(65) Prior Publication Data
US 2018/0317633 A1    Nov. 8, 2018

Related U.S. Application Data

(63) Continuation of application No. 14/635,943, filed on Mar. 2, 2015, now Pat. No. 9,961,984, and a
(Continued)

(51) Int. Cl.
*A45D 44/00* (2006.01)
*G01F 15/00* (2006.01)
(Continued)

(52) U.S. Cl.
CPC ............ *A45D 44/005* (2013.01); *F04B 43/12* (2013.01); *F04B 49/06* (2013.01); *G01F 1/42* (2013.01);
(Continued)

(58) Field of Classification Search
CPC . A45D 44/005; A45D 2044/007; F04B 43/12; F04B 49/06; G01F 1/42;
(Continued)

(56) References Cited

U.S. PATENT DOCUMENTS 4,258,478 A    3/1981   Scott et al.
4,434,467 A    2/1984   Scott
(Continued)

FOREIGN PATENT DOCUMENTS

DE    19835331 A1    2/2000
EP     0443741 A1    8/1991
(Continued)

OTHER PUBLICATIONS

Swedberg, Claire; ShelfX Unveils Store Shelves for Automating Purchases; 2011; http://www.rfidjournal.com/articles/view?8926#sthash.1XDqqOW6.dpuf.
(Continued)

*Primary Examiner* — Michael Collins
(74) *Attorney, Agent, or Firm* — Bonini IP Law, LLC; Frank J. Bonini, Jr.

(57) ABSTRACT

A method, system and apparatus for delivery of custom blended dispensing custom blended personal care beauty products for a beauty service, wherein one or more components of a beauty product are stored where they may be supplied as needed to a dispenser, and where a control mechanism regulates the dosage of beauty components to provide a desired selected personal care beauty product with the characteristics selected. A selection screen display pro-
(Continued)

vides an image of a person and the person's hair that may be manipulated to simulate modifications that may include cut or styling and color or other effects. The selections are processed and stored and a formula is generated and communicating to a dispensing device to deliver the product components to produce the formula.

23 Claims, 28 Drawing Sheets

Related U.S. Application Data continuation of application No. 14/201,638, filed on Mar. 7, 2014, now Pat. No. 8,977,389.

(60) Provisional application No. 61/847,215, filed on Jul. 17, 2013.

(51) Int. Cl.
```
G01F 1/42      (2006.01)
F04B 43/12     (2006.01)
F04B 49/06     (2006.01)
B67D 7/20      (2010.01)
B65G 53/42     (2006.01)
G01F 11/02     (2006.01)
G01F 1/50      (2006.01)
G06Q 30/06     (2012.01)
G06F 3/0484    (2013.01)
```

(52) U.S. Cl.
CPC .............. *G01F 1/50* (2013.01); *G01F 15/005* (2013.01); *G06F 3/04845* (2013.01); *G06Q 30/0621* (2013.01); *A45D 2044/007* (2013.01); *B65G 53/42* (2013.01); *B67D 7/20* (2013.01); *G01F 11/024* (2013.01)

(58) Field of Classification Search
CPC ........ G01F 1/50; G01F 15/005; G01F 11/024; G06Q 30/0621; G06F 3/04845; B67D 7/20; B65G 53/42
USPC .................................................. 700/231–244
See application file for complete search history.

(56) References Cited

U.S. PATENT DOCUMENTS

| | | |
|---|---|---|
| 4,844,889 A | 7/1989 | Papantoniou et al. |
| 4,871,262 A | 10/1989 | Krauss et al. |
| 5,064,121 A | 11/1991 | Bolduc |
| 5,163,010 A | 11/1992 | Klein et al. |
| 5,607,408 A | 3/1997 | Boucly |
| 5,855,626 A | 1/1999 | Wiegner et al. |
| 5,862,947 A | 1/1999 | Wiegner et al. |
| 6,089,408 A | 7/2000 | Fox |
| 6,453,052 B1* | 9/2002 | Kurokawa ............... G06T 11/00 30/30 |
| 6,510,366 B1 | 1/2003 | Murray et al. |
| 6,592,282 B2 | 7/2003 | Fontanet et al. |
| 6,935,386 B2 | 8/2005 | Miller et al. |
| 6,980,888 B2 | 12/2005 | Baker et al. |
| 6,986,886 B2 | 1/2006 | Hammond et al. |
| 7,121,430 B2 | 10/2006 | Mink et al. |
| 7,185,789 B2 | 3/2007 | Mink et al. |
| 7,264,161 B2 | 9/2007 | Polarine |
| 7,267,248 B2 | 9/2007 | Yerby et al. |
| 7,357,158 B2 | 4/2008 | Yerby et al. |
| 7,523,018 B2 | 4/2009 | Grossinger et al. |
| 7,654,416 B2 | 2/2010 | Buining et al. |
| 7,758,347 B2* | 7/2010 | Sasaki ............... A45D 44/005 434/94 |
| 7,793,796 B1 | 9/2010 | Evans |
| 7,963,303 B2 | 6/2011 | Saranow et al. |
| 7,972,056 B2 | 7/2011 | Lontoc |
| 8,091,559 B2 | 1/2012 | Lund et al. |
| 8,121,904 B2 | 2/2012 | Johnson |
| 8,336,582 B2 | 12/2012 | Saranow |
| 8,393,358 B2 | 3/2013 | Saranow |
| 8,393,363 B2 | 3/2013 | Saranow et al. |
| 8,425,622 B2 | 4/2013 | Felts et al. |
| 8,439,981 B2 | 5/2013 | Felts et al. |
| 8,444,716 B1 | 5/2013 | Felts et al. |
| 8,499,770 B2 | 8/2013 | Smith |
| 8,564,778 B1 | 10/2013 | Igarashi |
| 8,567,455 B2 | 10/2013 | Saranow et al. |
| 8,573,232 B2 | 11/2013 | Glenn, Jr. et al. |
| 8,593,634 B1 | 11/2013 | Igarashi |
| 8,616,222 B2 | 12/2013 | Baker et al. |
| 8,977,389 B2 | 3/2015 | Witchell et al. |
| 10,849,408 B2* | 12/2020 | Skwarek ................. G06T 19/20 |
| 2002/0155069 A1 | 10/2002 | Pruche et al. |
| 2002/0179639 A1 | 12/2002 | Bartholomew et al. |
| 2003/0062379 A1 | 4/2003 | Bartholomew |
| 2003/0216969 A1 | 11/2003 | Bauer et al. |
| 2004/0004088 A1 | 1/2004 | Yerby et al. |
| 2005/0018140 A1* | 1/2005 | Ishizaki ................ G06F 1/1601 353/28 |
| 2005/0165705 A1 | 7/2005 | Lauper et al. |
| 2005/0194403 A1 | 9/2005 | Mink et al. |
| 2005/0228538 A1 | 10/2005 | Limburger |
| 2006/0031081 A1* | 2/2006 | Arne ...................... G06Q 30/02 705/1.1 |
| 2006/0169718 A1 | 8/2006 | Buining et al. |
| 2006/0195300 A1 | 8/2006 | Grossinger et al. |
| 2006/0231578 A1 | 10/2006 | Mink et al. |
| 2006/0261089 A1 | 11/2006 | Mink et al. |
| 2007/0222547 A1 | 9/2007 | Stahle et al. |
| 2007/0265867 A1 | 11/2007 | Lin |
| 2007/0276677 A1 | 11/2007 | Applegarth |
| 2009/0159612 A1 | 6/2009 | Beavis et al. |
| 2009/0161481 A1 | 6/2009 | Lontoc |
| 2009/0248199 A1 | 10/2009 | Milhorn |
| 2010/0169055 A1* | 7/2010 | Kobeck ................ G09B 19/003 703/1 |
| 2010/0181340 A1 | 7/2010 | Wallace et al. |
| 2011/0153045 A1 | 6/2011 | Ryckman et al. |
| 2011/0313879 A1 | 12/2011 | Mourad et al. |
| 2011/0317511 A1 | 12/2011 | Dobay |
| 2012/0048880 A1 | 3/2012 | Damolaris |
| 2012/0067364 A1 | 3/2012 | Wong |
| 2012/0192969 A1 | 8/2012 | Beavis et al. |
| 2012/0297556 A1 | 11/2012 | Felts et al. |
| 2012/0301412 A1 | 11/2012 | Felts et al. |
| 2013/0012281 A1 | 5/2013 | Pivaudran |
| 2013/0122817 A1 | 5/2013 | Pivaudran |
| 2013/0280688 A1 | 10/2013 | Pagana-Lausch |
| 2013/0338821 A1 | 12/2013 | Igarashi |
| 2014/0008394 A1 | 1/2014 | Höfte |
| 2014/0277704 A1 | 9/2014 | Memar |
| 2015/0173488 A1 | 6/2015 | Witchell et al. |

FOREIGN PATENT DOCUMENTS

| | | |
|---|---|---|
| EP | 0443741 B1 | 6/1995 |
| EP | 0788831 A2 | 8/1997 |
| EP | 0788831 A3 | 1/1998 |
| EP | 0829821 A2 | 3/1998 |
| EP | 0788831 B1 | 11/2003 |
| EP | 1374720 A1 | 1/2004 |
| EP | 2014353 A2 | 1/2009 |
| EP | 2014353 A3 | 4/2009 |
| EP | 1817976 B1 | 12/2009 |
| WO | WO 1999048802 A1 | 11/1999 |
| WO | WO 2002083282 A1 | 10/2002 |
| WO | WO 2005089589 A1 | 9/2005 |
| WO | WO 2005082510 A2 | 11/2005 |
| WO | WO 2006090363 A1 | 8/2006 |
| WO | WO 2007093952 A1 | 8/2007 |
| WO | WO 2009085540 A3 | 9/2009 |
| WO | WO 2009120527 A2 | 10/2009 |
| WO | WO 2009120527 A3 | 1/2010 |

(56) References Cited

FOREIGN PATENT DOCUMENTS

| WO | WO 2012027456 A1 | 3/2012 |
|---|---|---|
| WO | WO 2012102608 A1 | 8/2012 |
| WO | WO 2012166477 A2 | 12/2012 |
| WO | WO 2012166478 A2 | 12/2012 |
| WO | WO 2013036618 A1 | 3/2013 |
| WO | WO 2013123422 A2 | 8/2013 |
| WO | WO 2013176666 A1 | 11/2013 |
| WO | WO 2014008274 A1 | 1/2014 |

OTHER PUBLICATIONS

Swedberg, Claire; SteadyServ Launches RFID Solution That Keeps Beer Flowing; *RFID Journal*; 2013; http://www.rfidjournal.com/articles/view?11208.

Want, Roy; An Introduction to RFID Technology; Pervasive Computing; 2006; http://gtubicomp2013.pbworks.com/w/file/fetch/64846805/want-rfid.pdf.

What is OPC?; http://www.opcdatahub.com/WhatIsOPC.html; Copyright © 1995-2010, Cogent Real-Time Systems Inc.

Abdulaziz, Salman; RFID Technologies for Inventory Management; http://www.slideshare.net/sabdulaz/rfid-technologies-for-inventory-management.

Lee, Nicole; 2013; Monsieur robotic bartender automates mixed drinks with a tap of a finger; http://www.engadget.com/2013/09/11/monsieur-robotic-bartender/.

J. Lankhof R&D; Dispensing Bulk Color (unknown whether this was published).

Dr. Katherine Albrecht; RFID's in consumables—Spychips update; http://www.davidicke.com/forum/showthread.php?t=3319.

McBeath, Bill; The Blank Canvas of RFID Part 1: RFID in Product Designs; Feb. 19, 2013; http://www.clresearch.com/research/detail.cfm?guid=EE36CE97-3048-79ED-99E8-3D5D837BC4FA.

A1001 Near Field/Short Range UHF RFID Antenna; Copyright 2014 Times-7 Research Limited; http://www.times-7.com/a1001-near-field/short-range-uhf-rfid-antenna.html.

International Search Report and Written Opinion in PCT/US14/47050 (the counterpart PCT application) dated Nov. 17, 2014.

Extended European Search Report in PCT/US2014/047050 (the counterpart PCT application—EU regional phase) dated Mar. 23, 2017.

\* cited by examiner

METHOD, SYSTEM AND APPARATUS FOR DISPENSING PRODUCTS FOR A PERSONAL CARE SERVICE, INSTRUCTING ON PROVIDING A PERSONAL CARE TREATMENT SERVICE, AND SELECTING A PERSONAL CARE SERVICE

CROSS-REFERENCE TO RELATED APPLICATIONS

This application claims priority to U.S. patent application Ser. No. 14/635,943 filed on Mar. 2, 2015, and to U.S. patent application Ser. No. 14/201,638 filed on Mar. 7, 2014, and to U.S. Provisional application Ser. No. 61/847,214, filed on Jul. 17, 2013, the complete contents of which are herein incorporated by reference.

BACKGROUND OF THE INVENTION

1. Field of the Invention

The invention relates to methods, systems and apparatus for dispensing products for a personal care, and more particularly to a method, system and apparatus, for facilitating the dispensing of personal care products, such as a beauty product, such as, for example, a hair colorant, where the hair colorant components are delivered in a dosage to provide a resultant hair colorant product having the desired characteristics. The invention also may be configured to dispense shampoo, conditioner, skin and scalp treatments, and other beauty and personal care products.

2. Brief Description of the Related Art

Beauty treatments often involve the use of products to enhance, repair or rejuvenate the skin, hair or body of an individual to improve or change the appearance or characteristic of the individual. One example of a beauty treatment involves hair coloring. Hair coloring compositions are used for coloring human hair. They may be applied by individuals in the home, or professionally in salons and studios. The purpose of hair coloring is to bring about a particular look with the color, which, for some individuals, may involve returning graying hair to its original color, and, for others, may involve altering the individual's hair color by changing it to a different color (which may be for reasons that the individual desires, such as, for example, a fashion, trend or style).

Hair coloring generally is distributed in tubes and bottles. In some cases, the components of a hair colorant may need to be separately provided in order to prolong their useful life, or because of certain adverse chemical reactions that may take place, if stored together. The colorist often utilizes colorant from one or more tubes. In many cases, the colorant or coloring chemicals are wasted, as some of the chemical remains in the tube. Generally, the tubes are supplied containing 2 oz. of colorant. In addition, the colorist or stylist carrying out the coloring of an individual's hair may be required to mix colors, which in some cases, may require a small amount of one particular color. Often, where a small amount of coloring compound is used, the remainder of the coloring compound in the tube must be disposed of, leading to waste both of chemicals as well as the container that held the coloring and packaging. In addition, mixing colors to arrive at a desired color involves time in measuring and matching the colorant components to arrive at the desired color.

The tubes for hair coloring are usually hand-squeezed, from the bottom. Most hair-coloring jobs require an admixture of colors, and hence mixing of dyes from different tubes. The hair colors or dyes must be mixed with a developer, and, in some cases a bleach may be added. Once the dyes are squeezed from the tubes the dyes as well as developer and bleach that also may have been added are mixed together, which is conventionally performed by hand. One prior attempt to automate removal of the dyes from their tubes is disclosed in US Patent Application no. 2009/0161481, which provides rollers that receive the end of the tube, compress it therebetween, and squeeze the dye therefrom. The roller motor may be controlled to provide a desired amount of rotation or squeezing. The '481 application also discloses a separate agitator that is used to mix the dyes that have been squeezed from the tube, or alternatively, a separate mixing station.

U.S. Pat. No. 7,758,347 B2 discloses a system for simulating a resulting custom hair color imparted to hair by a custom hair coloring composition formulated from a mixture of two different hair color preparations with a computer system for generating a visual image representative of a likely resulting custom hair color.

EP 1 374 720 discloses a method for selecting a desired resulting custom hair color imparted to hair by a hair dye product. A user may use a touch screen to select a hair coloring product (such as a product on a store shelf) and the user may enter information about the product or scan the bar code of the product to enter the information. The screen may display a message prompting the user to input information relating to the type of coloration desired (grey coverage, root coverage or highlight), and/or information relating to the initial condition of the hair, apart from its initial color (e.g., previously colored, never colored and/or damaged). The '720 patent document discloses that the information may be later used by a micro-processing system to predict the resulting color of the coloration and/or predict a suitable product for the type of coloration desired. The '720 patent document further discloses displaying visual images on a computer screen for comparison. The '720 patent further discloses a loyalty card, smart card (RFI) chip and CD Disk as a marketing tool that may be used with its device to allow the consumers to earn points, discounts or coupons.

EP 0 443 741 A discloses an apparatus and a method to formulate a custom mixed cosmetic product in response to specific input criteria disclosed to be combinations of hair damage criteria, hair porosity criteria, and hair diameter criteria. The '741 patent document discloses formulating and dispensing a custom mixed cosmetic hair treatment product at the point of sale in response to input criteria. Containers for storing cosmetically functional mixtures that are adapted to interact when proper amounts are mixed to form a cosmetic hair treatment product are disclosed. Mating male and female members with a different shape are provided as a locking means for connecting a container to a reservoir to ensure that the proper mixture is located in the proper container position.

EP 1 817 976 discloses a method that involves inputting into a computer system an initial hair color of the hair, a first shade component amount from a defined collection; a second color shade component amount from the collection, and one or more amounts of one or more additional color shade components from the defined collection. The '976 patent documents discloses using a computer to predict a likely resulting custom hair color based on the inputted initial hair color of the hair and the inputted component amounts and to generate a visual image that represents the likely color to simulate the hair.

SUMMARY OF THE INVENTION

It is an object of the present invention to provide an automated system, method and apparatus for dispensing chemicals and treatments in the beauty industry.

According to one embodiment, it is an object to accomplish the above objects by dispensing hair colorant.

According to another embodiment, it is an object to accomplish the above objects by dispensing prescriptive home care products like shampoos, conditioners and treatments.

According to a preferred embodiment, the method, system and apparatus are configured to dose out an appropriate amount of a desired product that may be used by a technician who is providing a service to a client or customer.

Another object is to provide a system, method and apparatus for delivering a component used in a beauty industry that is premixed to provide a desired treatment characteristic. For example, in the case where the component is a hair colorant, the desired characteristic may be a particular color. The desired characteristic also may include the type of colorant, such as, permanent or temporary colorant.

It is another object of the invention to provide a method, system and apparatus that reduces or eliminates the need for multiple packaging associated with the dispensable or consumable components.

It is another object of the invention to provide a method, system and apparatus that reduces or eliminates waste of treatment chemicals, in particular hair coloring products.

It is another object of the invention to provide a method, system and apparatus that improves consistency in connection with the delivery of a treatment component.

It is another object of the invention to provide a method, system and apparatus that improves accuracy in connection with the delivery of a treatment component that is dispensed for use in forming the beauty product.

It is another object of the invention to provide a method, system and apparatus that reduces the need for underused inventory of treatment components.

It is another object of the invention to provide a method, system and apparatus that promotes improved reporting of time management.

It is another object of the invention to provide a method, system and apparatus that provides a repeatable result for a customer based on the customer's characteristics, desires, or previous experiences in relation to a treatment component.

Another object of the invention is to provide a system, method and device that allows an individual that desires to receive a beauty treatment, such as, for example, a hair coloring, cut or styling, to use a captured image of the individual and manipulate that image through selection options to provide desired options appearing on the individual's image. For example, the image of the individual's own hair is used to apply the treatment options, and the image is transformed by software containing instructions corresponding to the selected treatment to render the image with the appearance of the selected treatment applied. The individual may then save treatment sets applied, and select and preview additional treatments, and may then compare, save and change the treatment sets saved.

Another object is to provide a method, system and device that provides instructions on the application of a beauty treatment. For example, according to one embodiment, where the beauty treatment involves transforming a hair by cutting, styling, conditioning, coloring or other treatment application, the desired result is selected from selection options on a touch screen or other input mechanism, and a screen displays the desired effect. The image on the screen may be selected as the result desired, and, instructions may be provided in a visual graphic representation on steps to obtain the desired result. The instructions may be globally provided through a network so that a result may be obtained at one location, and the result selected at another location may be replicated through the instructional teaching. According to one embodiment, a system for instructing on the cutting, styling and coloring of hair may be carried out by capturing a real-time image of an individual who is to receive a haircut, color or style, and processing the image of the individual to locate the individual's hair; and then utilizing overlays to provide graphic representations for display of the procedures, which may involve suggesting through an overlay that contains at least one graphic of a step to be carried out on the hair of the individual, and then providing graphics of each subsequent step. According to preferred embodiments, as described herein, the procedure preferably involves a filtered translucent overlay that is utilized to generate the image for display.

It is another object of the invention to provide a system, method and apparatus for providing hair care and treatment products to consumers based on a distribution system that delivers customized hair products to the consumer.

It is a further object of the invention to provide a system, method and apparatus that generates a relationship building communications between a consumer and the marketer, salon, distributor and/or manufacturer of the hair product.

It is another object of the invention to provide means for monitoring the use of hair care products, including monitoring use in connection with replenishment or reordering of product or for determining trends and/or for use in connection with customizing marketing.

It is another object of the invention to provide a system, method and apparatus for determining global and local trends and preferences, events, celebrity popularity as they emerge in conjunction with marketing of beauty products and services, including hair care and salon services.

It is a further object of the invention to provide a system, apparatus and method that provides a consumer with the ability to obtain for the person's own personal use, the same hair product that is a specially formulated hair product made available to a consumer that is the same as the consumer's product that is specially formulated and applied at the consumer's salon.

It is a further object of the invention to provide a computer implemented system that displays the hair of an individual on a display screen, and which permits a representation of hair treatment, including stages of a haircut to be done by manipulating the image presented on the screen. It is a further object to provide a responsive representation on a display screen that permits a haircut to be represented on an individual and which allows the cut to be displayed by simulating the cut as if the stylist was using a tool, such as scissors on the person's actual hair. A depiction of a representative cut or styling is provided on the display and is carried out by allowing the manipulation of the user's depicted hair to remove as much or as little hair as desired, and in locations desired, and to have the image depicted on the display represent the progression of a style or haircut being carried out on the person's hair depicted on the display, so that the depiction is carried out prior to manipulation of the persons' physical hair.

It is a further object of the invention to distribute and formulate custom beauty products in addition to hair related products.

A further object is to provide an apparatus that may be configured to dispense waving solutions, shampoos, conditioners, lotions and creams, each of which may be customized with components selected or desired for the user or a particular designated client.

It is another object of the invention to provide a method, system and device that uses consumable components, where the container, such as a bag, containing a component, and a tube or line is supplied as a component unit. It is a further object to supply the container bag, line and nozzle as a unit as a contained unit that is installable on the device and on the pumping mechanism, and from which the contents of the unit (container bag, line and, optionally, the nozzle) may remain in a sealed condition for delivery to the dispenser location.

It is another object of the invention to provide a system, method and device in which the product components to be dispensed are provided in containers (and, in some embodiments, lines and nozzles that are connected thereto) that may be recycled and/or recharged with fresh component when the initial component has been exhausted. The invention preferably is designed to be environmentally beneficial as in addition to embodiments providing recyclable and/or rechargeable containers, the containers may replace the small tubes that currently are used to dispense hair colorant. For example, where a prior art tube contains 2 oz. of a hair dye colorant, the tube and the box in which it is contained are discarded as waste after use (albeit, if the tube is packaged in a cardboard box, the cardboard has potential for recycling). Nonetheless, these tubes are often discarded even when existing colorant remains within the tube. The present invention provides containers (which in some embodiments may hold 1 L of a component) that hold several time more than the tubes, and from which an exacting amount of component may be dispensed. According to preferred embodiments of the method, system and device, the invention produces considerably less landfill waste than traditional component packaging and delivery (e.g., tubes).

It is a further object of the invention to provide a device, system and method, where a container containing a component may be placed anywhere on the device (e.g., at any designated location or slot, and to be delivered by any pump), and the component will be automatically recognized by the device. The recognition feature provides for delivery of the proper components regardless of whether the component is placed in a designated or non-designated slot on the device. The software preferably includes instructions to deliver the dosage of proper component by operating the corresponding pump based on the reading and identification of the component location and its correspondence with a particular pump.

Although the above objects have been discussed as features of the invention, one or more of these objects may be accomplished with one or more other of the objects according to preferred and alternate embodiments of the invention.

BRIEF DESCRIPTION OF THE DRAWING FIGURES

DETAILED DESCRIPTION OF THE PREFERRED EMBODIMENTS

Figure 1:
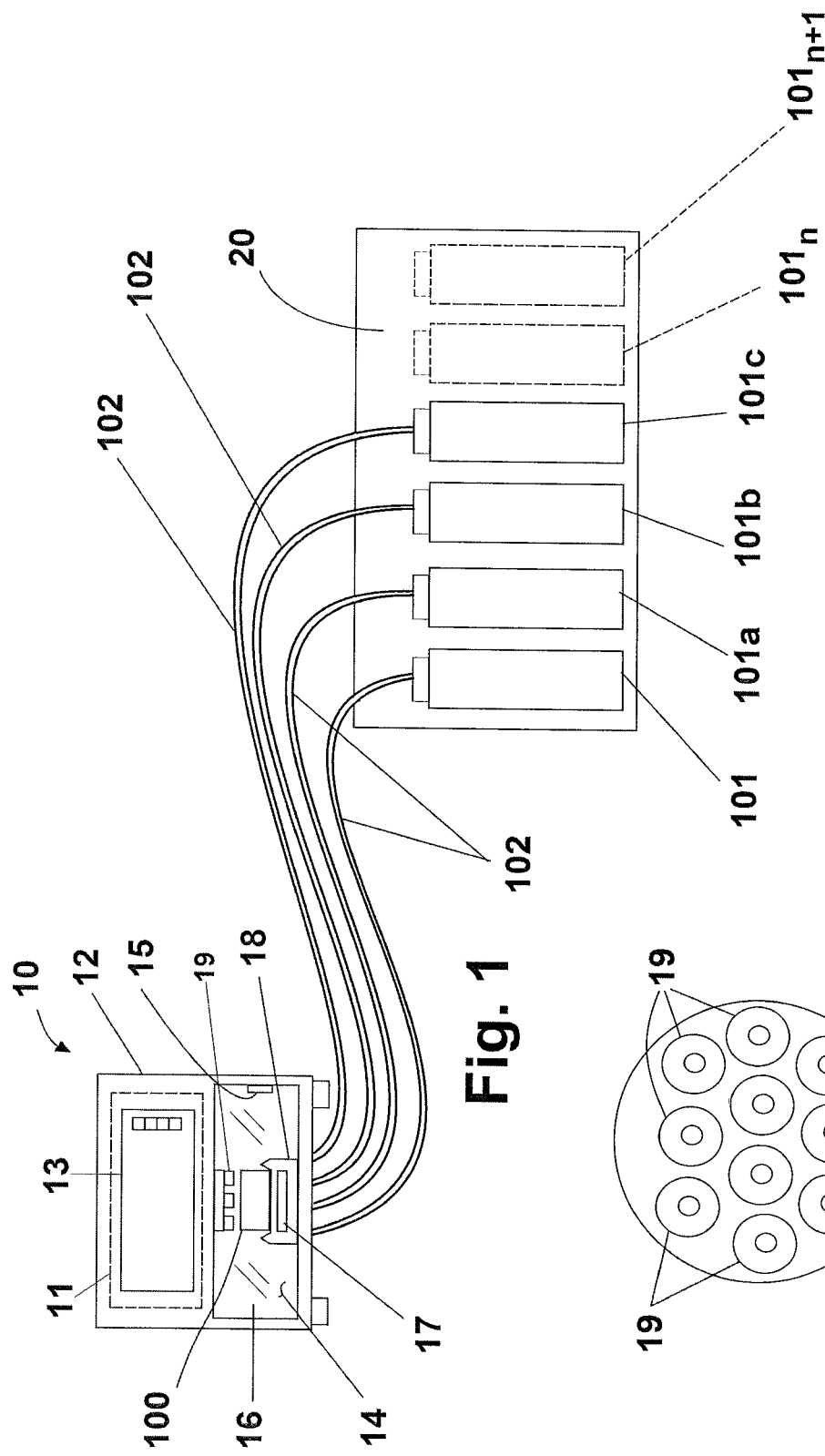
FIG. 1 is a schematic illustration of a first embodiment of a dispensing device according to my invention, showing a bank of canisters arranged in a location remote from the dispensing unit, and showing a plurality of lines for delivering the components from the dispensing canisters, the lines being shown, but in an installation, may remain hidden in a wall, cabinet or other structure.

A system, method and devices are provided for facilitating the application of a beauty treatment. According to a preferred embodiment, the system, method and devices facilitate an application of a beauty treatment that may be provided at a number of different locations in a uniform manner. According to preferred embodiments, a global network connects the devices that may be used to implement the methods and facilitate the beauty treatment. A database may be used to store information about particular beauty treatments, their applications and customizations, as well as the selection of a treatment and implementation of the treatment to correspond with a selected treatment. According to embodiments of the invention an individual may make a selection of a particular type of look that the individual desires. According to a preferred embodiment, the beauty treatment may be a hair treatment, which may be a haircut, style, color or any combinations of the aforementioned or other treatments to alter or enhance the appearance of an individual's hair. The devices also may be referred to herein as apparatus.

According to some embodiments, an individual may make selections from a selection menu that is used to populate a display that the individual views. The display preferably also has a capability of uploading an image of the individual, or optionally or in addition thereto, may include a camera which is configured with the ability to capture an image of the individual. According to one embodiment, a capturing mechanism may include a camera and a computing device for electronically storing an image taken with said camera. The capturing mechanism may also include software with instructions for storing the image to a storage location (e.g., hard drive, or server component or cloud) as well as a tool (such as software) to separate the image of the person's hair to be manipulated separately from other portions of the image, such as, for example, the person's face, background, person's body. The profile image of the individual that is captured may then be used by the individual or technician who is to apply the treatment, or both. The user then makes selections which are applied to the image of the individual to provide a depiction or representation of the individual with the selected treatment applied. According to preferred embodiments, the image of the individual is used and is manipulated to create the desired treatment effect by using the individual's image data and manipulating the user's image data (which may be pixels or other components of the image data) to correspond with the treatment selected. For example, the texture of an individual's hair may be altered by the individual selecting from a menu a desired hair texture. The desired hair texture is then applied to the image of the individual. Software programmed with instructions to manipulate the image data is provided. The software is configured to manipulate the image data when an instruction is received. The software may reside on a device being used by a user, such as, for example, a tablet or PDA, or may reside on a central server linked for association with the user device through a network, such as, for example, a local network or Internet. According to one example, the user may select from a menu of hair colors or other hair effects. For example, the user selecting the hair color may then have that color applied to the image to render that individual's hair with the selected color appearing in the image. According to one embodiment, the individual may be presented with a menu that permits the movement or styling of the individual's hair so that a desired shaping of the individual's hair on the displayed image of the individual may be customized According to one embodiment, the device on which the image is displayed may include a touch screen, and the image is displayed in a manner that permits the individual to move the hair (e.g., by moving one's fingers over the touch screen) as if the individual were actually moving the hair. Other selections enable the individual to shorten or remove hair, apply a color to all or parts of the hair or select and apply other treatments to the hair. In some cases, the individual may be presented with selection options from which to choose (for example, a discrete number of choices), while in other instances, the individual may make a selection of unlimited options (e.g., the moving of the hair). Although the examples are described with an individual making the selections, alternately, a technician may make the selections or may assist the individual in making or arriving at the selections, and ultimate effect desired.

According to one embodiment, the capturing mechanism is employed to capture an image of an individual whose hair is to be altered, such as, an individual who is to receive a haircut. An image is electronically stored with the capturing mechanism, the image including the individual's face and the individual's hair. In this embodiment, the image portion that includes the individual's hair is stored as a separate image. This may be done by processing the stored image of the individual to locate the individual's hair. The depiction of a haircut on the display is generated for the user as well as the stylist to see (e.g., the individual and stylist that is to provide the treatment). According to one embodiment, instructions are provided (e.g., to the salon stylist) suggesting through an overlay that contains at least one graphic, a step to be carried out on the hair of the individual to transform the hair of the individual on that image. Preferably, the hair image is manipulated on the display screen to correspond with the proposed or selected transformation to be carried out on the individual's hair by a filtered translucent overlay that retains the image of the individual's hair and differentiates the hair portion (in the displayed image) to which the manipulation has been applied. The instruction preferably depicts on the image of the person's hair, a preferred way to achieve a result and the result. The instructions preferably are provided through a series of graphic depictions on a display which correspond to depicted steps for transforming the hair of the individual based on a transformed image of the individual's hair appearing on the display. The application may provide teaching to salon personnel regarding how to obtain a particular treatment, effect, style or cut to a person, through depictions of graphic representations of the person's hair on an electronic display and generation of progressive steps depicting the changes to the hair with the steps of the treatment.

According to preferred embodiments, a database is provided and is populated with products that correspond with the selections made by the individual. For example, if the individual selected a straight hair, then a conditioning product that may be suitable for providing that effect is associated with the individual selection data. Alternately, if there are a number of products that may provide the desired effect, then options may be provided to be associated with the individual's selection data. Those options may be stored with the selections of the individual, including, for example, a record in a data file that identifies the individual by name, or other unique identifier, but may be stored in a manner that permits the product data to be regulated to whom it may be available for access. For example, according to one embodiment, the product data is available to a technician that is to apply the treatment. The product information may be identified by brand, type, name or a code.

Another object of the invention is to deliver a beauty treatment, such as, for example, a hair treatment component, which may be provided in a consistent manner to deliver a uniform product. The invention improves the ability to deliver and provide a treatment, such as, for example, a hair color, which is consistent from time to time, as well as from location to location. A delivery apparatus is implemented to deliver a consistent amount, including dosages, of colorants to provide a uniform color. The data may be stored, and delivery apparatus units, which may be in locations remote from each other, may provide a consistent treatment product delivery by utilizing the data stored for a particular individual in a database. The database may be accessible through a global network (such as the Internet), so that an individual's file, including the treatment products, the dosages constituting the treatment products, style and cut, and other information or preferences may be available to a technician or stylist at another location. According to a preferred embodiment, a plurality of locations are designated and a delivery apparatus may be located at each location. The location, for example, may be a salon. The salons may be designated salons on a network, or that otherwise share data relating to treatment components.

According to a preferred embodiment, a system, method and apparatus are provided to facilitate the delivery of a treatment component used for carrying out a beauty service. According to preferred embodiments, the systems and apparatus are configured to formulate and dose out appropriate amounts of desired products to a technician for a selected beauty service. The beauty service, for example, may be a facial, skin or other body treatment, a hair treatment, or other treatment in which a beauty component is required to be used or applied to the skin or hair of an individual. According to a preferred embodiment, the beauty treatment involves a hair treatment and the application of a hair treatment product to the hair of a person. For example, the hair treatment may involve the coloring of the hair of an individual with a hair coloring product.

According to one embodiment, a device is provided for dispensing the beauty component. For example, according to a preferred embodiment, where the beauty service involves hair coloring, the beauty component hair colorant is dispensed from a dispenser of the device to provide the technician with a suitable color characteristic that the individual has requested, or that the technician desires to use for that individual.

According to a first embodiment, a device 10 is shown in FIG. 1, including a control mechanism 11 with a selection component. The control mechanism 11 is represented schematically, and, in its simplest form, may include a computer, with an input means, such as a keyboard, mouse, pointer, touch screen or combination thereof, a storage component, such as a hard drive for storing data, and display for displaying information such as a monitor or the touch screen 13. According to the embodiment illustrated in FIG. 1, the device 10 has a touch screen 13 and the computing components of the control mechanism 11 may be housed within the housing 12 of the device 10. Other components of a computer may be used in association with the device 10, including networking hardware to permit the device 10 to communicate with other devices so as to share, store and/or save information. Customer information may be stored in the device 10 (or in an associated data storage component that is linked with or accessible to the device 10). A hard drive or other data storage medium may be provided. The data storage component preferably holds a database into which customer information may be recorded and stored, and a media that is capable of storing the information (e.g., a hard drive or other storage component). According to one embodiment, a customer record is created, and a customer record is populated with information. For example, the customer hair type and hair texture information may be entered, saved and stored for that customer. The technician also may select from a menu a desired result for the customer. The menu may provide selection options for formula, color and other options. The menu may be generated on a touch screen 13 and the computer may be programmed with software containing instructions to display the associated selection options for input requests that are to be received as well as for displaying information such as the customer name, other customer information, and information relating to the products that the device 10 is to dispense. For example, in the event that the customer makes a first visit, or for the first time that a customer's information is recorded, the selection option for the customer may be made by the technician (or other individual operating the device 10), and may be entered and stored. In the event where the customer already has a customer record associated with the customer, the customer record may be used, and upon entry or access of the customer record, the device 10 may offer suggested formula options to the technician.

When the technician has selected the desired formula and dosage, which may include a color option for the desired color in the case of a hair colorant, the technician places a container 100 at the dispensing area 14 of the device 10. Preferably, the device 10 includes a sensor 15 and indicator circuit that detects that a container 100 is in position to receive a component from the device 10. When the selections have been confirmed by the technician, and the container position is confirmed by the sensing circuit, then the device 10 dispenses the desired component or components into the container 100 based on the technician selections.

Once the components have been dispensed into the container 100, the technician may then mix the components together (as needed). A mixing option optionally may be provided to provide a mixing chamber or container that permits the components being dispensed by the device 10 also to be mixed.

The method may be carried out, according to one exemplary embodiment by the following steps:

the technician utilizes a touch screen to access formula screen where dosing options are entered or selected;

the technician chooses formula and dose;

an indicator light alerts technician "A" that product for client "B" is now ready to be dispensed and that dose is available at dispensing point;

a dispensing container is placed at point of delivery;

a sensor knows that container is in place;

the product is dispensed into the appropriate container;

the technician now blends the doses together for application.

The device 10 may be constructed utilizing a control mechanism for dispensing the components. The control mechanism, according to one embodiment, may include dispensing nozzles for dosing and/or dispensing pumps that transport the component from a storage location to be delivered from the dispensing nozzles to the dispensing container 100. A canister 101, which may be one of a plurality of canisters 101a, 101b, 101c and others (101n, 101$n_{+1}$), may be used to store the respective beauty components. The canisters may be purchased and delivered to provide components that correspond with the formulations that the software and display mechanism features rely on to obtain the desired effects or treatment. For example, in the case of a hair colorant component, the canister 101 may contain a particular colorant component that is stored within the canister 101 and dispensed from the canister 101 with the device 10 as required. The canister 101 may be part of an array 20 of canisters 101a, 101b, 101c and others (101n, 101$n_{+1}$), where each canister of the array 20 includes a component that may be dispensed from the canister as called for by the device 10. (For example, the array 20 shown in FIG. 1 may be made up of up to 64 canisters.) The amount of component from each canister is determined by the programs used in connection with the device 10, which regulate the dosage and type of component that is to be delivered to the container 100. The components delivered from the canisters 101 to the container 100 preferably are based on the selections of the technician. The canisters 101, 101a, 101b, 101c, and so on, may be linked to the device 10 with one or more feed lines 102. For example, according to some embodiments, a single canister, such as that 101, may be stored central to a plurality of devices 10 and may be used to supply a component to more than one device 10. According to alternate embodiments, each device 10 may have associated with it one canister (or set of canisters) for each separate beauty component to be delivered. According to one embodiment, a plurality of pumps are provided, and each pump preferably is associated with a feed line 102 that is connected to a canister 101, so that the pump may be operated to move a desired quantity of the component from the canister 101 in which it is stored, into a dispensing cup or container 100. The pumps, although not shown, preferably, may be disposed in the housing 12 of the device 10. One or more valves (also not shown) may be placed in association with the feed line 102 flow path to regulate the flow through the feed line 102. The valve may be used to selectively close flow, for example, when changing canisters 101 or when cleaning the device 10 or pumps.

The device 10 preferably includes a control mechanism, which, as discussed herein, may include software that is programmed with instructions to control the operation of the pumps of the device 10 to regulate the type and amount of the component to be delivered to the container 100. In addition control valves may be operated with software that is programmed with instructions for opening and/or closing valves to regulate from which canister 101 the component is or components are to be delivered.

The device 10 also may be programmed to accept inputs from operators of the system, and access may be regulated with pass codes and identities so that the users of the system and their selections may be saved and accessed, if needed. The device 10 may include one or more programmable logic controllers that may be used in connection with the software to provide data signals to the pumps and valves, or other operable components, in association with the desired component dosage based on the inputs from a technician or user. An operator pass code may be used, and a time stamped dosage dispensed from the device 10 into the container 101 may be recorded and stored in a data file (e.g., a data base).

The data base may be stored or may be connected to a live data feed through the Internet, or other network, and recommended complementary products selections may be provided when a user or technician using the device 10 logs on, or uses the device 10.

According to one embodiment, the device 10 includes a low inventory level alerting feature, which may be an alarm, display, page, or other visual or audible communication, that signals to the user that a component, such as a canister 101, is in need of being replaced, or is running low. The system also may track the inventory of canisters purchased and or shipped by the user, lessee, or owner of the device 10 location, and may monitor dispensings of components from canisters 101 to track the component level and the need for replenishment. This may be done through updates pushed or pulled from the device 10, such as, through a live connection through a network with the canister supplier.

According to one embodiment, operators may operate a control panel which may have a programmable logic controller in association therewith, to include the following information:

Operator Pass code

Time stamped dose

Low inventory level alarm

In addition, the controller may be programmed or linked with a server or database to generate recommended complimentary products selections in view of the product dispensed.

Figure 2:
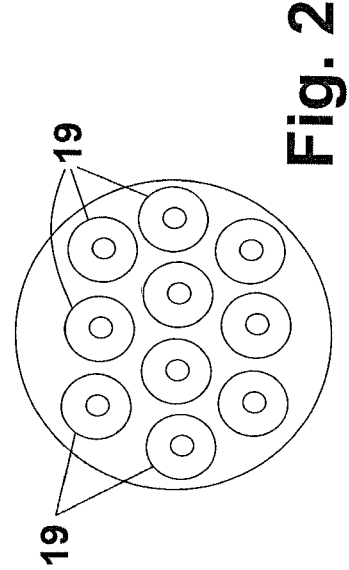
FIG. 2 is a separate view of the dispensing nozzles, looking up from the container toward the dispensing nozzles.

As shown in FIG. 2, a plurality of dispensing nozzles 19 may be provided to dispense the components from the canisters 101, 101a, 101b, 101c, and so on, into the container 100. The dispensing nozzles 19 may be mounted on the frame of the device 10. Dispensing sensors may be provided to ensure the container 100 is in position, and dispensing sensors may be provided in association with the nozzles to ensure that a supply of component is being delivered, and that the duration of the delivery is sufficient to correspond with the desired amount to be delivered. In this respect, a check on the dosage amount and the confirmation of delivery of the component to the container may be monitored for accuracy, and an operator may be alerted as to any deviations. The feed lines 102 may comprise hollow tubing, and fittings may be used to connect the tubing with the canisters 101 and the pumping mechanisms.

According to a preferred embodiment, the housing 12 may be constructed from an aesthetically pleasing material such as stainless steel, and the cover panel 16 may be constructed from glass with a handle 17 so that the dispensing of the components may be viewed. The sensor 15 preferably is provided within the enclosed space or dispensing area 14 of the device 10. An optional holder or stand 18 may be used to secure the container 100 in a proper alignment for receiving the components from the dispenser nozzles.

Figure 3:
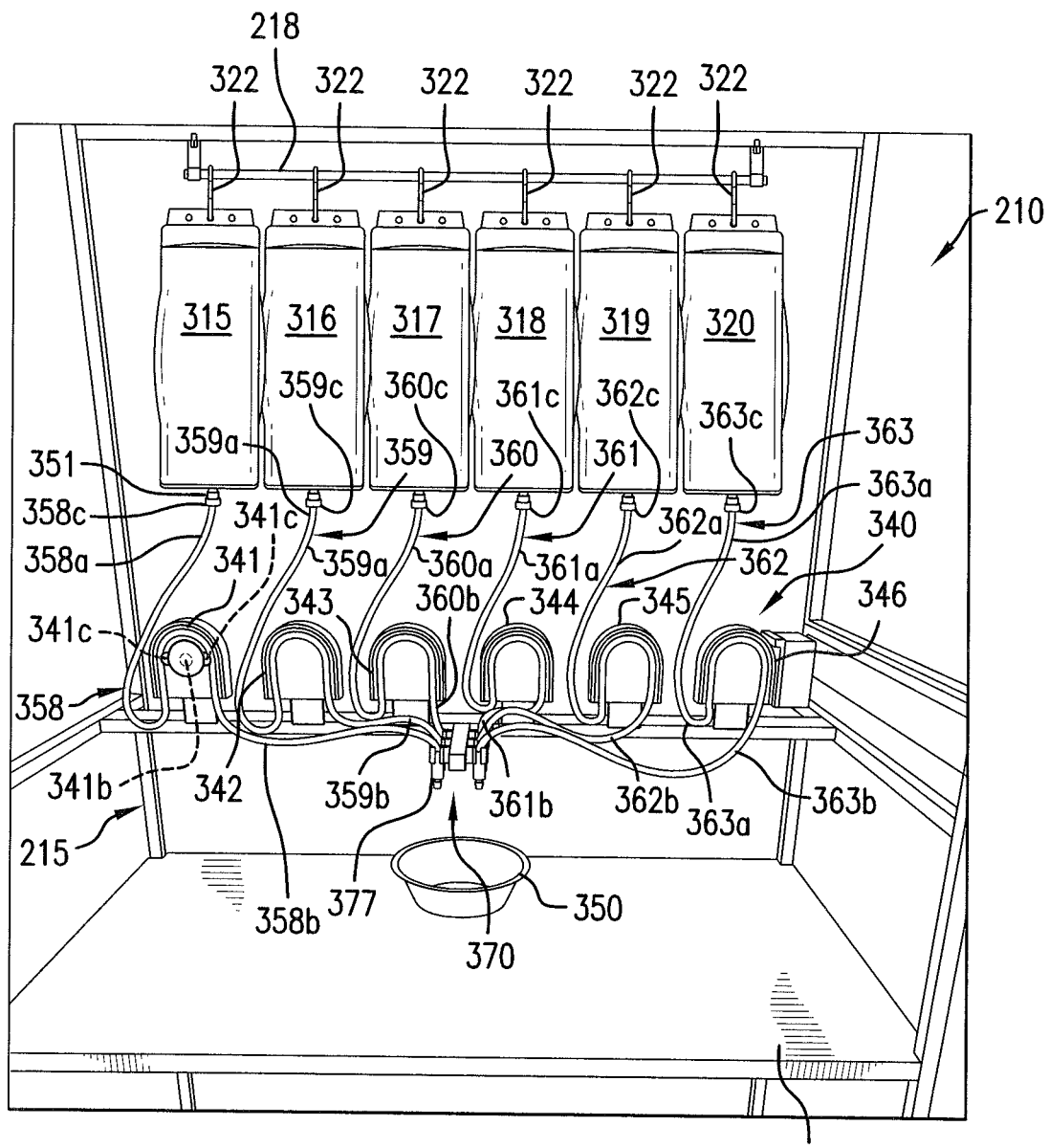
FIG. 3 is a perspective view of a dispensing device according to a second embodiment of the invention.
Figure 4:
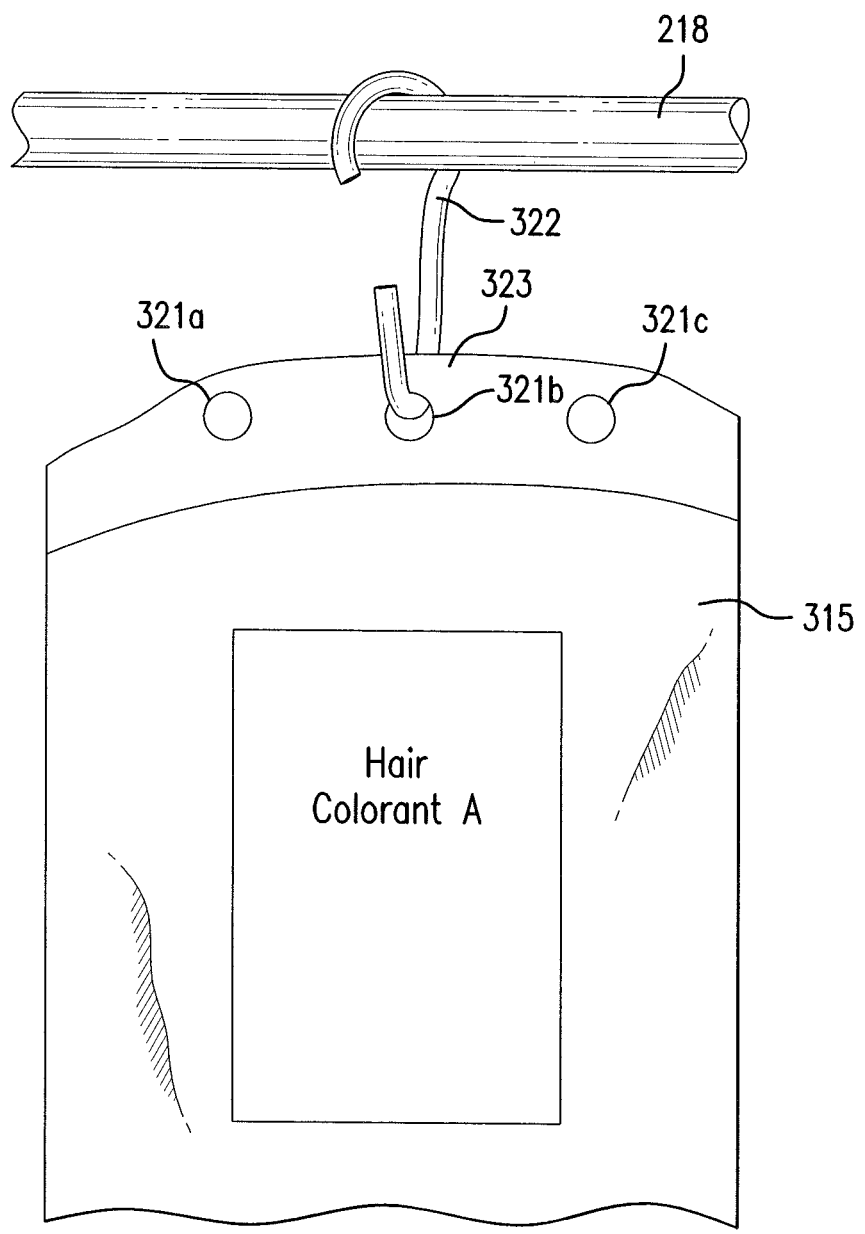
FIG. 4 is an enlarged front elevation view showing a view of a container installed on the dispensing device of FIG. 3.
Figure 4A:
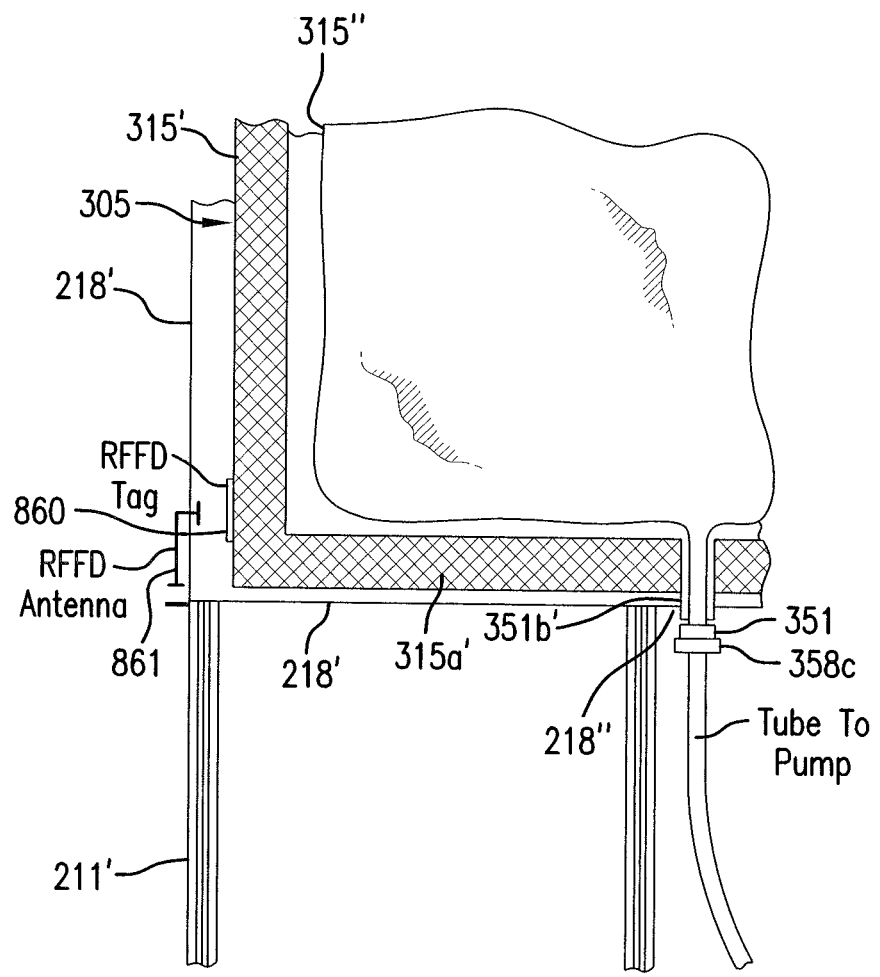
FIG. 4A is an enlarged view of an alternate embodiment of a container configured as a bag in a box casing, where the container is installed on a shelf of the dispensing device, which is shown having an alternate frame construction.

Referring to FIG. 3, a preferred embodiment of an apparatus 210 for delivering a hair treatment product is illustrated. The apparatus 210 is shown supported on a frame 211. Alternatively, according to an alternate installation option, the apparatus 210 may be installed in a cabinet and remain stationary (see FIG. 27). The frame 211 is shown having a lower supporting structure 212 that includes legs 213. The frame 211 also includes a stage 214 onto which a receptacle (or dispensing cup), such as the container or bowl 350 may be positioned to receive the dispensed product. The frame 211 is shown having an upper supporting structure 215. The upper supporting structure 215 includes a pair of transverse supports 216,217 and a component support rack 218. The support rack 218 preferably is configured to hold the components that contain the product that is to be dispensed. According to a preferred embodiment, the components or containers used to store and dispense the product are bags 315,316,317,318,319,320. According to a preferred embodiment, as illustrated in FIG. 4A, the container 305 is configured having a casing, such as, for example, a cardboard box 315' that preferably is a recyclable component, which surrounds the bag 315". The casing or box 315' is constructed to be secure and strong, so as to withstand potential effects of dropping and shifting during shipping. The bag 315" may be constructed as described herein in connection with the bag 315 (or other bags). According to a preferred embodiment, each bag 315" may be contained in a box 315', and preferably, the box 315' containing the component bag 315" is sized to fit on the device 210. As shown in FIG. 4A, the dispensing device 210 preferably is configured with an alternate support rack 218' that supports the containers, such as that container 305. The shelf preferably is provided above the pumps that are to deliver the respective components from the respective containers. The shelf 218' may be configured with slots into which the container 305 sits. According to a preferred embodiment, the slots preferably are aligned above each respective pump that is to deliver the component from the respective bag.

A mounting mechanism removably mounts the containers on the device 210. As shown in FIGS. 3, 3A, 3B, 4 and 6, bags 315,316,317,318,319,320 are mounted on the frame upper support 215, and preferably on the component support rack 218. The mounting mechanism is shown including slidable connectors 322 which have a first end that engages with a bag and a second end that slidably attaches to the component support rack 218 to slide along therewith. The support rack 218 preferably may support a plurality of bags, and, in addition, according to one option also may support replacement bags, so that if a component should run out, there is another bag of that component at the apparatus 210.

Figure 6:
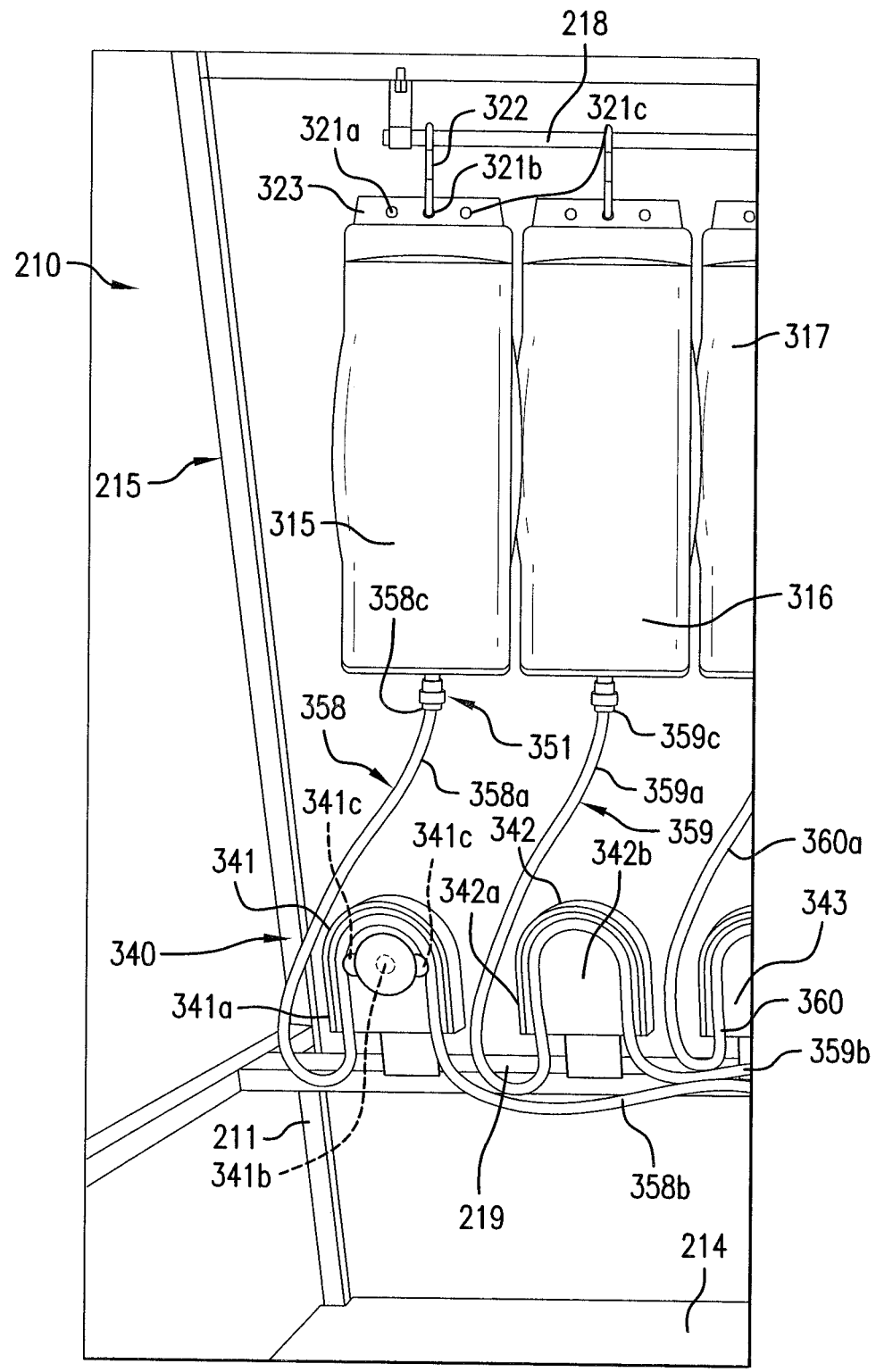
FIG. 6 is a perspective view looking at the left side of the dispensing device and showing a portion of the dispensing device of FIG. 3.

According to the embodiment illustrated in FIG. 6, the bags 315,316,317,318,319,320 are provided with at least one, and, preferably a plurality of apertures 321a,321b,321c thereof, provided in the top seam 323 of the bag 315. The connector 322 may slide along the support rack or rail 218 and in this manner may be installed at a location proximate to the pump that is to deliver that component to the bowl 350. The bags 315,316,317,318,319,320 are constructed to hold about 1 to 2 quarts of a component therein, although the bags may be made in different sizes to hold different amounts of components therein. The bag 315, as well as the bags for the other components, are constructed from material that is suitable for the components that the bag is to hold therein, and, more preferably, the bags are constructed from material that is resistant to, and non-reactive with the compounds that are present in other bags or being used with the apparatus that may inadvertently come into contact with the bag 315. According to a preferred embodiment, the bag material is inert with regard to the components. Examples of materials from which the bag may be constructed include polytetrafluoroethylene (PTFE) (also known as TEFLON®), foil, polyethylene, and nylon, The bag 315 preferably is constructed from a suitably strong material and has seams that are strong so as to resist breakage and leakage when being used and during shipping. The seams of the bag 315 (e.g., at the top, sides and bottom) may be formed by welding, applying an adhesive, thermal sealing or other suitable method. If an adhesive is used, preferably, it is composed of a material that does not react with or affect the component that the bag is provided to carry. Preferably, leakage of components from the bag 315 is minimized or eliminated. The components preferably are filled in the bag 315, and the bag sealed (although, the seals may be in place and the component delivered to fill the bag through a sealable port or other opening. The bag 315 preferably has a dispensing port for delivery of the contents. A tube or line is provided with a first end that connects with the dispensing port of the bag 315 and a second end that connects with the apparatus, and more particularly one of the dispensing nozzles of the apparatus. Alternately, the bag 315 may be supplied with the line preattached. According to some embodiments, the lines connecting to the port or connector of the bag may be used for repeated connection to bags (including to a new bag that has been installed to replace a bag whose contents are depleted). According to some embodiments, a line may include an optional restrictor or clamp (not shown) that may be adjusted to regulate the flow passage at the restriction. According to some embodiments, as shown in FIG. 6, the tube or line 358 preferably includes a first connector 358c at its first end for connecting with the bag port or bag connector 351. Each container, such as the box 315" or bag 315 also includes a label or other identification that provides the batch number the name of the component, an expiration date where applicable, and may also include the shipping or order information relating to delivery.

Figure 5:
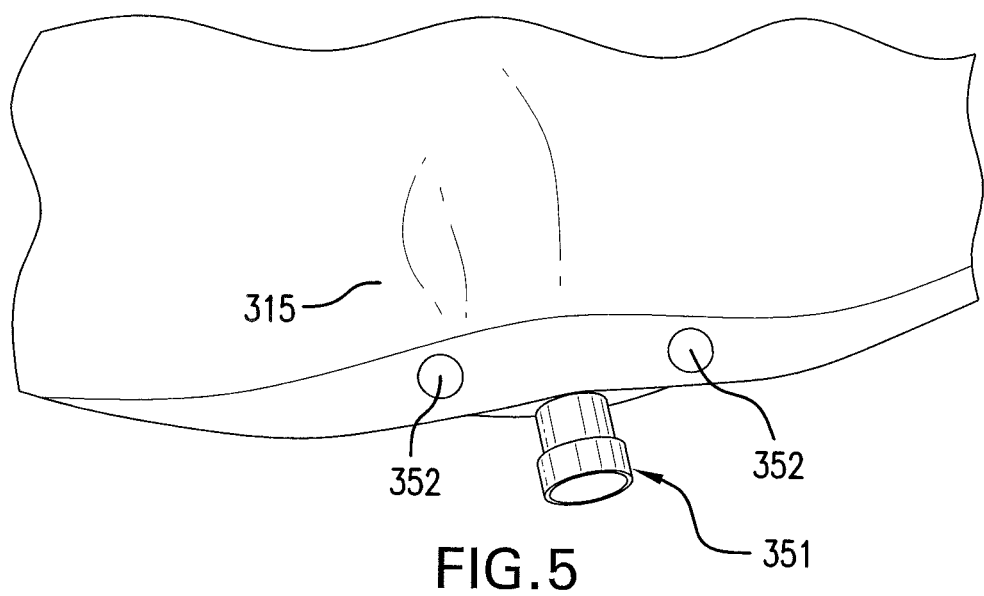
FIG. 5 is a partial view of a container according to a preferred embodiment shown configured as a bag, and shown separately from the other components of the dispensing device.

As best shown in FIGS. 3, 5 and 6, a bag port or connector 351 is provided at the lower end of the bag 315. The port or connector 351 preferably is in sealed communication with the interior of the bag 315 and the contents therein. Referring to FIG. 5, fasteners, such as the welds 352 are shown securing the connector 351 to the bag 315. The bag connector 351 may comprise a female shut-off pouch fitment that is secured by welding to the bag 351. The connector 351 may be made from a material that does not react with the component in the bag 315. Some suitable examples of material for the connector 351 include nylon, teflon and polypropylene. According to a preferred embodiment, the bag connector 351 is provided with a sealable valve that seals off the bag contents from air from the exterior of the bag 315. Referring to FIG. 6, the bag connector 351 preferably, is configured to receive a mating connector 358c that is attached to a line or connects with the line. The mating connector 358c preferably, when inserted into the bag connector 351 opens the valve of the bag connector 351 and maintains the open connection between the bag contents and the line 358 so that the component may be drawn out from the bag 315, through the bag connector 351 and mating connector 358c, into the line 358. The bag connector 351 preferably may have a removable cap (not shown) and, optionally, may have a removable foil seal over its opening to protect the contents from unwanted air that may otherwise enter the bag 315 when in storage. The bag connector 351 is configured to receive a line 358 through which the component in the bag 315, such as, for example, a hair colorant component, may be delivered to a pump. The line 358 preferably is tubular and is constructed from a material that does not react with the component in the bag 315, and preferably, the line 358 is opaque or has a coating to minimize or block light from reaching the component that resides in or travels through the line 358, so as to eliminate or minimize the potential for light that may otherwise oxidize or adversely affect the components that are to be delivered through the lines. Some preferred materials from which the line may be constructed include silicone, polytetrafluoroethylene (PTFE) (also known as TEFLON®) or other inert or materials that are non-reactive with the component to be delivered therethrough. As shown in FIG. 3, according to a preferred embodiment, the line 358 has a first end 358a that includes the mating connector 358c that is sealingly connected to the bag 315, preferably, by a connection made with the bag connector 351, and a second end 358b which is connected to a delivery or dispensing nozzle of the apparatus 210. The other lines 359,360,361,362,363 also are shown having a first end 359a,360a,361a,362a, 363a, respectively, and a second end 359b,360b,361b,362b, 363b, respectively, which is connected to a delivery or dispensing nozzle. The bag connector 351 and mating connector 358c preferably are constructed with a mating interlock that automatically seals when the connectors are not connected together, and opens to provide a passageway between the connected connectors 351,358c when the connectors are connected together. The lines 359,360,361,362, 363, as described in connection with the line 358, preferably have mating connectors 359c,360c,361c,362c,363c similar to that mating connector 358c, which connect each of the respective lines with a bag connector of a respective bag 316,317,318,319,320.

According to one embodiment, the tubes or lines 358, 359,360,361,362,363 preferably may be replaced as needed by providing a new tube or line that preferably includes a mating connector and another end that is suitable for connection to a dispensing nozzle, or carries a dispensing nozzle thereon.

Figure 3A:
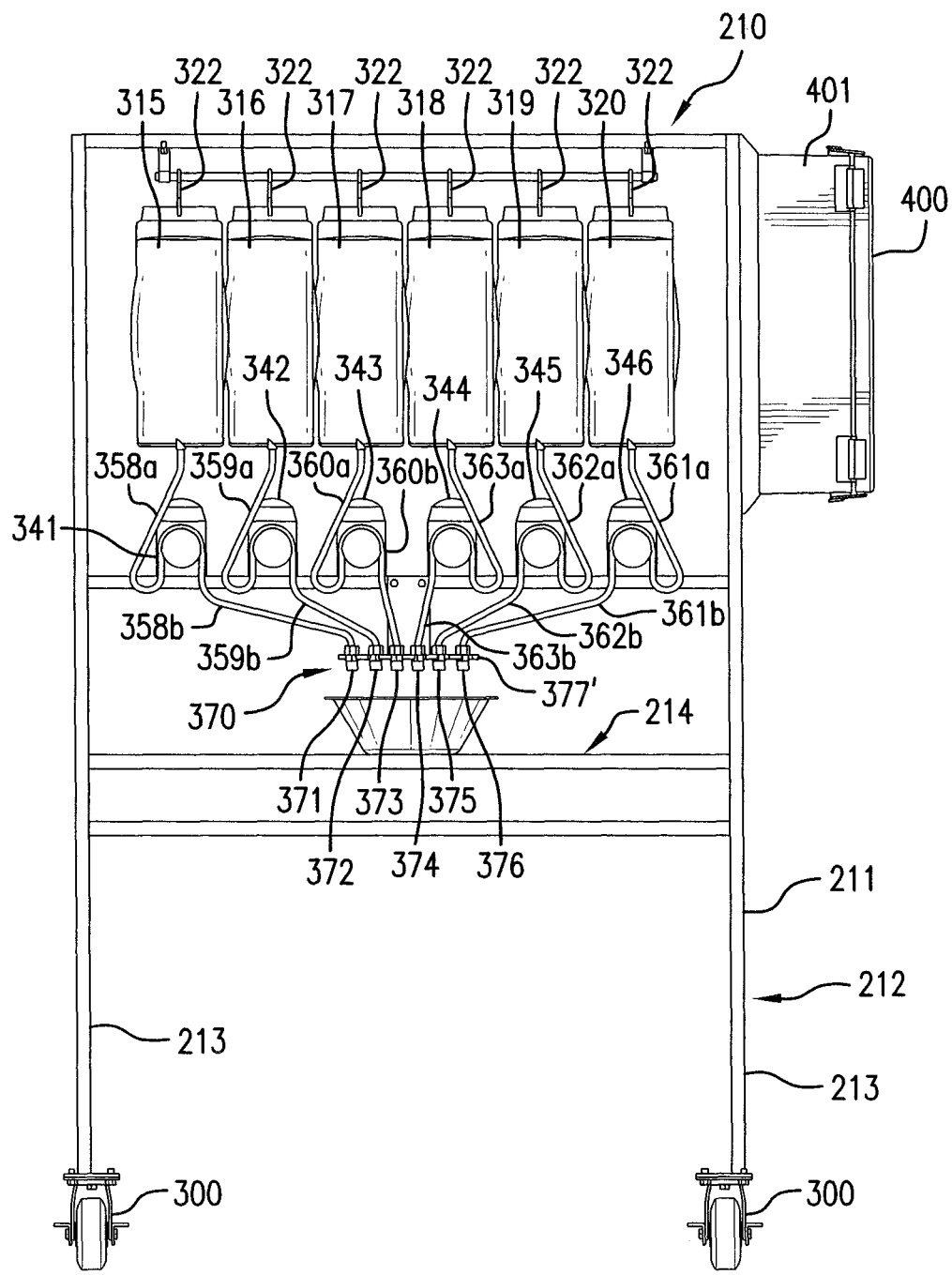
FIG. 3A is a front elevation view of the device of FIG. 3 depicted with an alternate mounting component for the nozzles.
Figure 3B:
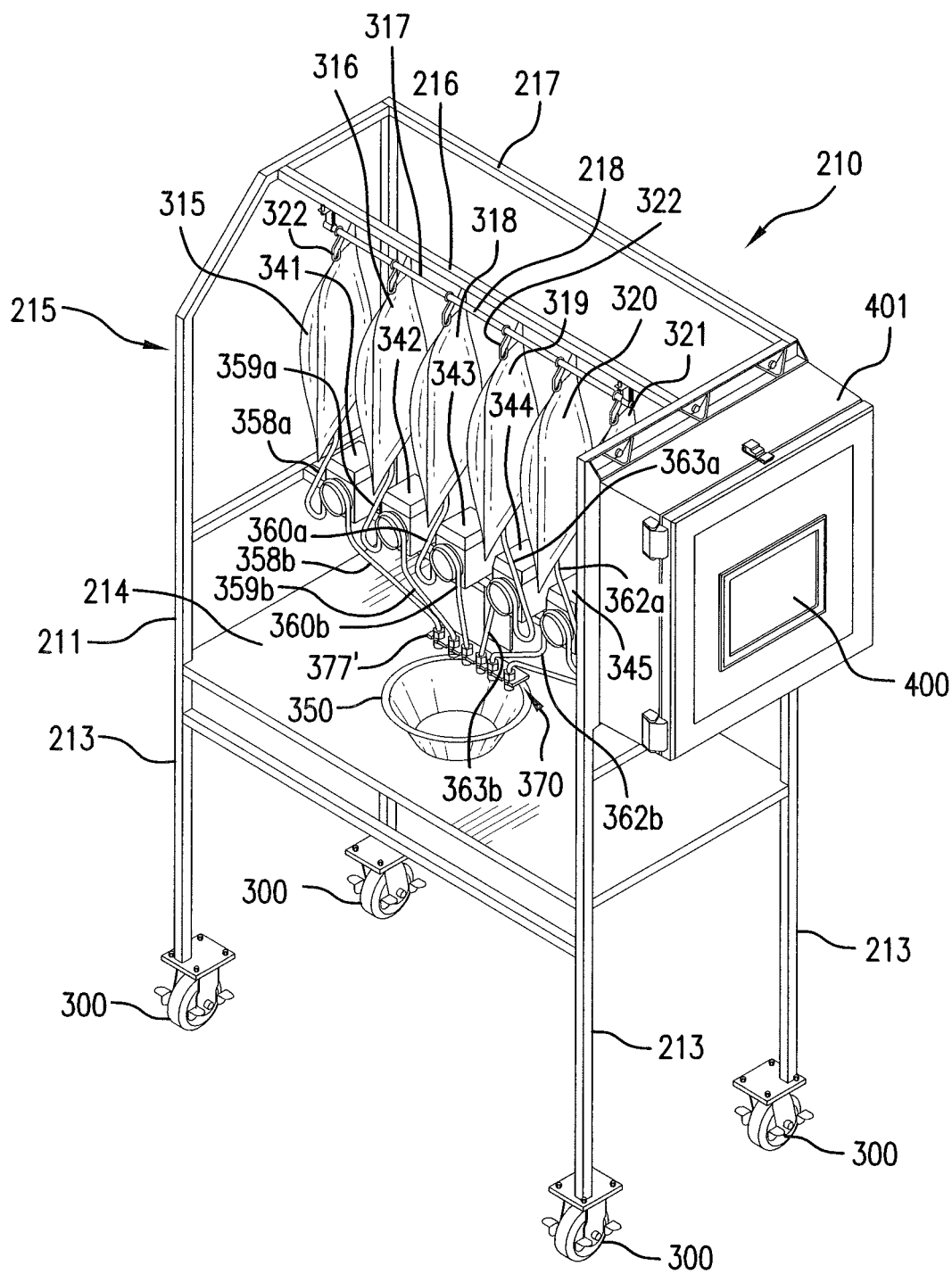
FIG. 3B is a perspective view of the device shown in FIG. 3A.

Referring to FIGS. 3, 3A, 3B and 6, the pumping mechanism 340 is shown including a plurality of pumps 341,342, 343,344,345,346, which preferably may be peristaltic pumps and may be configured to operate to deliver a dosage of an amount of component based on the duration of the pump operation. Each pump 341,342,343,344,345,346 preferably is calibrated by running the pump for a predetermined time interval, such as, for example, one minute, and determining the amount of component delivered during that interval. The pumps 341,342,343,344,345,346 preferably are mounted on the frame upper supporting structure 215, and are shown mounted to a horizontal support member 219. As depicted in FIG. 6, the pump 341 is shown with the line 358 passing through the pump. The tube or line 358 preferably is flexible, and passes through the circular pump casing 341a (and see 342b FIG. 6). The pump 341 preferably has a rotor 341b with a plurality of rollers 341c circumferentially arranged on the rotor 341b. The rollers 341c compress the flexible tubes or lines at their respective engaging locations, wherein a roller 341c pinches the tube or line 358 closed and forces the component contained within the bag 315 to move through the line 358 and beyond the pump 341 to a dispensing location 370 of the apparatus 210. In this manner, according to a preferred embodiment, the pumps 341,342,343,344,345,346 of the pumping mechanism alternate between compression and relaxation of a respectively associated line 358,359,360,361,362,363 to regulate the delivery of the respective beauty product components from their respective bags. The compression of the line respectively, seals that line closed at the location of compression. According to a preferred embodiment, each component that is available for delivery to the dispensing bowl 350 preferably has a respective line and an associated pump, so that each line and each pump delivers a single component to the dispensing location 370. The pumps 341,342,343,344,345, 346 are provided to deliver the respective components from the bags 315,316,317,318,319,320 through the respectively associated lines 358,359,360,361,362,363 to the dispensing location 370 (FIG. 3). A dispensing outlet is provided at the dispensing location 370. Each line 358,359,360,361,362,363 has a passageway therethrough through which the respective beauty product components may pass. In addition, each line 358,359,360,361,362,363 communicatively links one of the respective containers with the dispensing outlet for delivery of a respective beauty product component. The pumps 341,342,343,344,345,346 are shown having a casing or covering on the front thereof in FIGS. 3 and 6, and, the pumps in FIGS. 3A and 3B are represented to illustrate one example of installation of the respective lines 358,359,360, 361,362,363.

Figure 7:
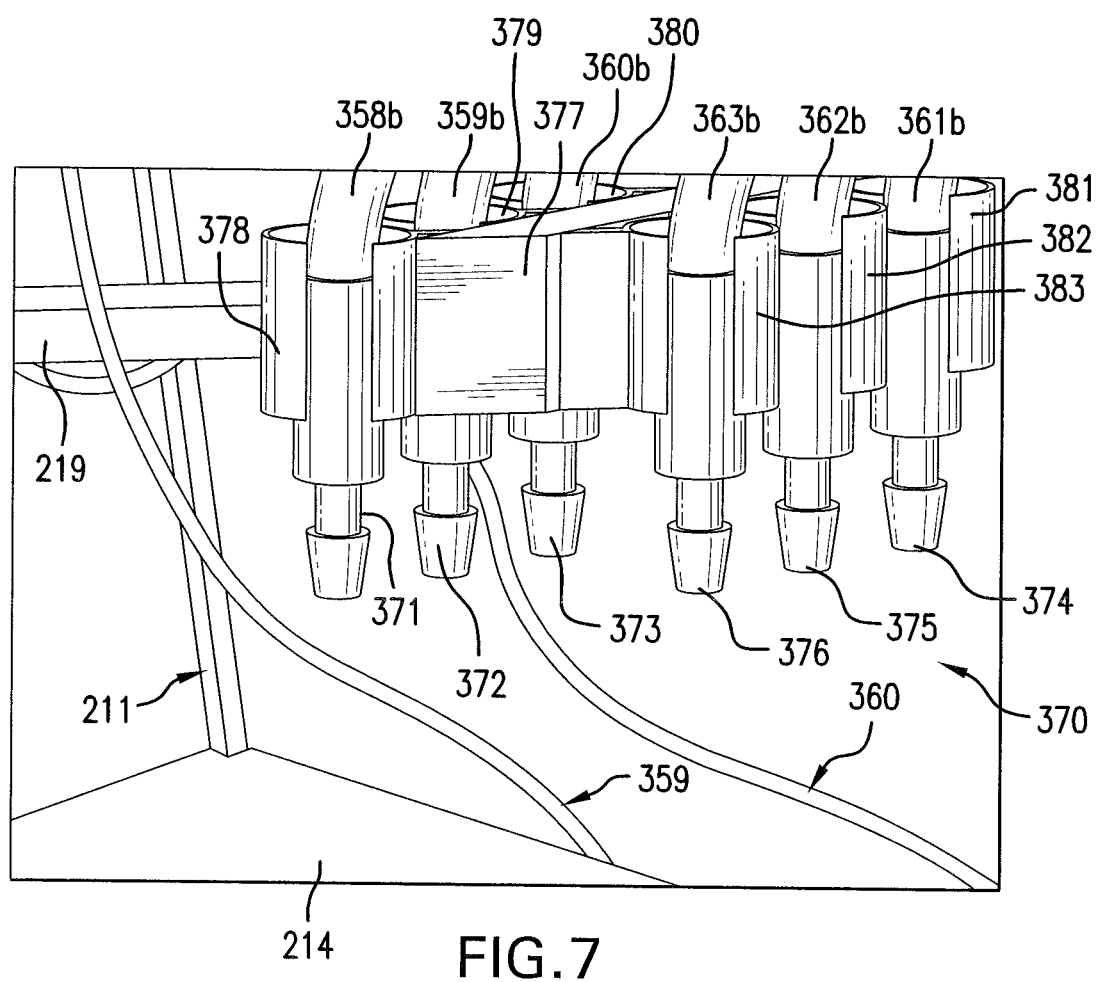
FIG. 7 is an enlarged perspective view of the dispensing area of the dispensing device of FIG. 3, showing the dispensing nozzles.

As shown in FIG. 7, located at the dispensing location 370 are a plurality of respectively associated dispensing nozzles 371,372,373,374,375,376, which are associated with the lines 358,359,360,361,362,363. The dispensing end of each line, 358b,359b,360b,361b,362b,363b, which is downstream of each respective pump, respectively, preferably has a dispensing nozzle, respectively, 371,372,373,374,375,376, mounted thereon. The dispensing nozzles 371,372,373,374, 375,376 preferably may be angled in a direction toward the center of the bowl 350 into which the components are delivered. According to one preferred embodiment, each dispensing nozzle 371,372,373,374,375,376 may be configured having a tapered bore, and preferably with a flow path diameter that is narrower than the respective line feeding the component to the nozzle. A mounting bracket may be used to removably mount the nozzles on the dispensing device 210. Referring to FIGS. 3 and 7, a first embodiment of a mounting bracket 377 is shown supported on the upper supporting structure 215. A respective plurality of mounts 378,379,380,381,382,383 are provided on the mounting bracket 377 and securing the respective dispensing nozzles 371,372,373,374,375,376 on the apparatus 210. According to a preferred embodiment, the dispensing nozzles 371,372, 373,374,375,376 are removably secured on the mounting bracket 377 with the respective mounts so that the nozzles may be removed and cleaned, as desired. According to a preferred embodiment, the dispensing nozzles 371,372,373, 374,375,376 are fixedly secured to the respective ends of the lines 358b,359b,360b,361b,362b,363b. According to an alternate embodiment, the dispensing nozzles are removably mounted on the line ends. The removable mounting may be accomplished by providing the nozzle with a stepped or circumferential fitting that may be press fit into the end of the respective line. Alternatively, a nozzle may be bonded to the line end. Though not shown, preferably end caps or covers are provided to seal off the dispensing nozzles when not in use. An alternate embodiment of a mounting bracket 377' is shown in FIGS. 3A and 3B, where the bracket 377' is attached to the upper frame portion 215, and where the dispensing nozzles 371,372,373,374,375,376 are held by the bracket 377'.

According to an alternate embodiment, a dispensing valve, such as, for example, a pinch valve or duckbill valve (not shown), may be installed along each line 358,359,360, 361,362,363, preferably, downstream from the respective pumps 341,342,343,344,345,346, and preferably as part of a respective dispensing nozzle 371,372,373,374,375,376. The valve remains open when the pump produces a positive pressure or flow of component through the line and closes off when the pump ceases to exert a positive pressure or flow. According to one embodiment, the valve closes to provide a seal against back flow of air through the line, as well as potential drips.

According to a preferred embodiment, the bag and line are supplied as a single item, forming a unit, with a connector provided at the line end (opposite the bag end) for connection with a dispensing nozzle of the device. Preferably, the unit is sealed at the line end opposite the bag end so air and light do not infiltrate the bag or line contents. According to alternate embodiments, the bag is provided at one end of the line and a nozzle is mounted to the other end of the line. In this latter embodiment, the bag, line and nozzle are provided together as a unit. According to these embodiments, the line may be installed on the pumping mechanism even with the bag or the nozzle, or both, preattached to the line. For example, the container or bag containing a beauty product component may be sealingly connected to a first end of a line to form a component unit. The component unit (which includes the bag containing a supply of the component, e.g., such as a hair dye component, and line sealingly connected thereto) is installed on the pumping mechanism. The installation preferably involves placing the line on the rotor of a pump so that the pump may deliver the component from the bag through the line to the dispensing nozzle or dispensing outlet of the device 210. According to an alternate embodiment, a nozzle is sealingly connected to a second end of a respective line, and the container bag, line connected thereto and nozzle form a component unit that may be installed on the device 210. The component unit may be installed so that the line is engaged by the pump (such as the pump rotor) when the pump is operated, and, so that the dispensing nozzle (supplied with the bag and line) is positioned (e.g., received in a mount 377, 377') at the dispensing location 370 of the device 210 so that the nozzle delivers component from the bag, through the line, into a receptacle. In these embodiments, the component unit (bag and line or bag, line and nozzle) preferably are disposable and are a consumable component that may be placed on the dispenser device 210 and discarded after the component has been exhausted (or alternatively, and more preferably, recycled and/or recharged after use). Optionally, a pinch valve (not shown), as referred to herein, may be included as part of a component unit.

According to some embodiments, the tube or line may be preprimed, and the component is contained in the bag as well as in the passageway of the line or tube. According to an alternate embodiment, a releasable valve or stop is provided at the connection between the bag and the line or tube, and is released to allow the component to flow from the bag into the tube. The release of the valve or stop preferably opens communication from the bag to the line or tube.

The pumping mechanism arrangement shown provides respectively associated pumps for delivery of each component to the dispensing location 370 of the apparatus 210. The amount of each dosage to be dispensed from a bag 315,316, 317,318,319,320 preferably is controlled by providing an input to a respectively associated pump that corresponds with the amount of resultant product desired, and the type of product desired. Each pump 341,342,343,344,345,346 receives a respective input directing the operation, such as, to operate the first pump 341 for a specific length of time. The time interval corresponds with a desired dosage for the component to be delivered from the bag 315 by its respectively associated pump 341. The other pumps 342,343,344, 345,346 also are operated in a similar manner to dispense the components from their respectively associated bags 316, 317,318,319,320. The input sent to the pump 341 may be electrical signals that power the pump 341 to operate for a particular interval of time. Preferably, the pump 341 is operated to be driven at a speed that may consistently deliver the desired quantities from the bag 315 to the bowl 350. Preferably, the pumps are uniformly provided to deliver a desired quantity when operated for a predetermined length of time, although each pump may be adjusted (independently of another), if desired or necessary.

According to preferred embodiments, the beauty product components that are supplied in the containers, such as the bags 315,316,317,318,319,320, are in a form having a preferred viscosity for delivery through the respectively associated lines 358,359,360,361,362,363 with the respectively associated peristaltic pumps 341,342,343,344,345, 346. According to one embodiment, the components may be viscous liquids. Components may have viscosities from about 1 to 10,000 cP (centipoise), and preferably from about 20 to 5,000 cP. According to some embodiments, the component viscosities may have a range from about 1 to 50 cP, with an alternate range being from about 20 to 50 cP. According to an alternate embodiment, the components are supplied as creme (or creams) and have a viscosity of that associated with a creme (or cream), for example, up to about 15,000 cP, and in a range of from about 5,000 to 15,000 cP. The beauty product components that are installed for delivery on the device 210 preferably include component products that may be mixed together to form a beauty product. A preferred beauty product produced by the device 210 is a hair dye. The components installed in the device 210 include the colorants as well as other components that are customarily used for formulating hair dyes, such as, for example, a developer and/or bleach, so that a fully functional resultant product may be dispensed from the device 210.

A self-cleaning mechanism is provided. Each pump 341, 342,343,344,345,346 is associated with a respective bag that contains a component to be delivered. The self-cleaning mechanism operates the pump to dispense a ribbon or amount of product that corresponds with at least the volume capacity (and possibly slightly more) of the portion of the flowpath after the pump 341. The volume is equal to or slightly greater than the volume capacity of the tube between the pump 341 and the dispensing nozzle plus the volume through the dispensing nozzle. Therefore, upon startup of the dispensing apparatus 210, such as, for example, when making the first dispensation of product for a day, e.g., where the apparatus 210 has sat overnight, or for some other prolonged period of time, without use, then the self-cleaning mechanism is actuated to operate the pumps to deliver those components that are sitting in the end of each of the respective lines 358,359,360,361,362,363, and preferably, to deliver the components that have sat in a dispensing end of each respective line, 358*b*,359*b*,360*b*,361*b*,362*b*,363*b*, and in a respective dispensing nozzle 371,372,373,374,375,376. The self-cleaning mechanism also keeps track of the usage of the components being delivered, and the time interval between component deliveries, for each respective component. In the event that a designated time has passed, and a particular component (such as, for example, a particular color) has not been used, and is being called for as a component needed for a beauty product to be dispensed from the apparatus 210, the self-cleaning mechanism is programmed to instruct the processor to implement the operation of the pump assigned to deliver that prolonged sitting component, and to dispense the material out from the dispensing end of the respective line. The self-cleaning mechanism evacuates the product from the dispensing end of the line, and as the product is dispensed it is replaced with fresh product which is drawn into the line by the pump. The self-cleaning mechanism prevents or minimizes the chance of using an oxidized product. According to one embodiment, the self-cleaning mechanism, when implementing a cleaning operation to force component through a line to provide a supply of fresh component in the line, may implement a cleaning cycle where those components that have not been used for a predetermined period (e.g., 15 hours, or whatever the time interval is) may be dispensed by operating their respective pumps simultaneously to dispense material into a receptacle that may be discarded (such as, a disposable receptacle) or may be emptied from the receptacle into which they were dispensed. The control mechanism preferably is programmed with instructions to monitor usage so that if a component has sat in a line for a prolonged period (e.g., a predetermined time), then the dispensing device 210 does not dispense a beauty product until the cleaning cycle has been completed.

The apparatus 210 preferably may be operated using a user interface, and more preferably a user interface that is graphical. Referring to FIG. 3*b*, a graphic display 400 is shown provided in association with the apparatus 210 (for example, as shown and described herein by the use of a tablet or other remote device). The graphic display 400 may be mounted on the frame 211, or alternately may be located remote from the dispensing portion of the apparatus 210, including, for example, at a location in the salon where the dispensing apparatus 210 is located. Alternatively, the dispensing apparatus 210 may be configured to receive instructions for dispensing a product that are communicated from a location remote from the salon. According to a preferred embodiment, the apparatus 210 includes computing components, such as a processor, a storage component, which, for example, may be a hard drive or other memory media. The apparatus 210 preferably includes a control mechanism which displays input on the display 400 and regulates the operation of the pumps to deliver appropriate amounts of components into the bowl 350. The control mechanism preferably is housed within the housing 401. The control mechanism includes software with instructions for instructing the hardware processor to act upon the input of a selection. The control mechanism may be linked with one or more remote input devices to be operated by the receipt of inputs from a remote device. The software preferably is instructed to provide the instructions to control the pumps and the respective delivery of components from the bags to the bowl 350. Preferably, a database of recipes for hair products, such as, for example, hair colorants, is provided. The database may be stored on a memory, such as a hard drive, or other storage media, and, according to preferred embodiments may be linked with or updated with downloadable content through a communication link to a remote database or server, or through a removable media that may be installed thereon. The database of hair colorant recipes preferably is associated with the selection and styling of a person's hair, and may be linked with one or more selection options from a selection menu of the dynamic display discussed herein that may be used by a hair technician or stylist and/or client to arrive at a desired selection for a hair treatment (e.g., a cut, coloring, styling and the like). The database of hair colorant recipes, however, is not the exclusive selection for a color, as according to preferred embodiments, a user, such as, for example, a salon stylist or technician, may utilize slide and/or dial levels to provide attenuation of colors, including shade and tone levels, and intermediate levels. The selections may or may not correspond to an existing recipe, and, according to preferred embodiments, the software is provided with instructions for receiving a selection of a color, tone or shade that the user (such as a salon technician) has selected, and utilizing the recipe database, but applying the modification so, even where the shade has not been used previously, and is not part of the database of recipes, it may be formulated and dispensed. The new shade or formulation also may be saved to a database for future reference and use. In addition, the shade may be evaluated in terms of the evaluation component of the salon network provider, to determine trends and preferences of customers/clients, and utilize that information for marketing and awareness, including in connection with the system discussed herein.

The components of the system preferably are constructed so replacement parts may be stored, delivered or otherwise shipped to a location where the machine is being used, so that any down time is minimized. The design of the system and apparatus, although shown as the dispensing device 210 depicted in a preferred orientation, may be configured in one or more alternate configurations, for example, to dispense components in a circular configuration, or, in a linear conveyed arrangement. According to one preferred embodiments, a circular dispensing point is utilized. Preferably, the apparatus or dispensing device 210 is configured so that it may dispense hair care products, such as, hair color products in the same area in which the home hair care products are dispensed. The dispensing device 210 according to embodiments of the invention may be configured to dispense hair care products, including hair color products, for the salon use, as well as hair care products for home use. According to one embodiment, the home use products may be dispensed and purchased at the salon location for home use by the consumer. The hair care products for home use may be dispensed in suitable packaging at the salon location. According to some embodiments, the hair care products may be dispensed for home use and for salon use, but packaging may be different for the home use, so that the consumer may store the hair care product in the packaging, whereas the product may be dispensed for salon use in a portable, disposable or reusable container (such as, for example, the bowl 350). Product dispensed for the consumer for home use may be dispensed into a package that fits onto the nozzles and that may be sealed to prevent air from entering or the contents from drying. The home use packaging also may include a label that is printed and identifies the product by name and color, the date dispensed, an expiration date, as well as the formulation or a code by which the formulation may be derived by the dispensing operator. Apparatus according to the invention may be constructed to dispense hair coloring, as well as treatments, shampoo, conditioners, lotions and creams. The invention allows for customers to obtain a custom blend from the device, and, the customer may continue to have the custom blend parameters available for subsequent purchase of the same custom blend. In addition, alternative blends may be made to adjust the custom blend, such as, for time of year, other treatment applied, and the like.

Currently, in the industry, the area behind a shampoo area is known as a "backbar". The present invention provides a solution that automates the salon hair care products, so the task may became automated, and therefore, a benefit is that salons may greatly reduce or eliminate potential waste and theft by having what were previously the "backbar" products dispensed in the same or similar way for each individual hair salon client. According to one preferred embodiment, the hair products (e.g., shampoos, conditioners, treatments and the like) may be dispensed onto a biodegradable "dose cup" and then carried to the sink.

According to another embodiment, a warehouse location may be implemented to serve as a fulfillment center where customers may order hair care products on-line and have the order filled and shipped from the fulfillment center. Alternately, the client/customer orders may be automatically refilled per client/customer's request. The warehouse or fulfillment location preferably also warehouses bulk product for locations as well as performing the fill and ship operations for consumers that place on-line orders. Preferably, the warehouse location has a communication network that communicates with the locations that it serves. Accordingly, the apparatus for dispensing products (hair coloring, treatments, shampoo and conditioners), preferably has a communication component that communicates with the warehouse network. The apparatus is configured with a sensing mechanism that senses the number of dispenses (of a particular product), and/or the amount of product dispensed, and/or levels of product remaining, so that when the product level is low (or at a predetermined threshold or level) a communication is made from the apparatus to the warehouse, and products may be shipped automatically from the warehouse to the location where the apparatus is located. According to a preferred embodiment, the control mechanism may be configured with software having instructions to record the installation of a product bag on the machine. The dispensings from the pump, which may be the total duration of the pump operation, may be determinative of the need to replace a bag. For example, the control mechanism may be programmed with instructions to implement an inventory search or reorder routine when the pump has operated for a particular duration that corresponds with an amount of product dispensed from its respective product bag. An identification tag may be provided on each product bag. According to preferred embodiments, the identification tag preferably is a communicative tag that contains information that may be electronically read and communicated. According to an alternate embodiment, the component container, such as a bag or a box in which the bag is contained, has an RFID element (e.g., such as, an RFID chip or tag) associated with it that identifies information about the product component in the bag, which may, for example, include the product name, manufacturer, batch and lot numbers, expiration date, shipment date, quantity, as well as temperature changes. As used herein RFID tag or chip refers to an RFID component that may be provided with information that may be read with a reader through interrogation of the RFID component. The reader or interrogator is generally used with or includes a transponder that decodes the information read from the RFID tag.

RFID components generally involve the use of an interrogator that includes an interrogator antenna or coil, and a transceiver (with decoder). A transponder is provided with a transponder antenna or coil, and is generally referred to as the RFID tag. The RFID tag may be programmed with a unique serial number or other identifying data, uniquely identifying that particular tag from other tags (in addition to other information about the component in the container, such as the product name, manufacturer, batch and lot numbers, expiration date, shipment date, quantity, as well as temperature changes that the product may have gone through). The RFID tag is read with an interrogator antenna which emits signals, which preferably are radio signals. Interrogators may read and write data to the RFID tag. Generally, the antenna may be used to relay the information between the RFID tag and the transceiver (which decodes the information transmitted). The sensing and monitoring mechanism of the invention preferably employ RFID components, including RFID tags that are placed on the containers, and, in some embodiments on the pumps and lines, antennae (which are preferably short range antennae or interrogators with limited field) that are respectively placed on the dispensing device to read the RFID tag of a respectively placed container, and wider range antennae used to detect the presence of the containers in a broader area (e.g., at the salon or location of the dispensing device, to keep track of product component inventory). According to preferred embodiments, the information obtained from the interrogation of the RFID tags is communicated to a server or other data handling component or computing device. Preferably, the system is configured to distinguish inventory of component containers present in the salon from components that are at the salon but already in use on the dispensing device. Although the RFID tags of the respective containers installed on the device and in use may be sensed by the wide range interrogator or antenna (if they may be read by the same frequency), the information sensed and relayed by the limited range antenna may be used to identify the in use component (based on the unique identification) as a component already in use, and therefore separate from the supply inventory. According to preferred embodiments, the RFID tags are passive tags. Alternatively, active tags may be used, but generally, they are more expensive due to the inclusion of a power source, such as, for example a battery.

According to preferred embodiments, an RFID tag or chip may be positioned at a location on the container (such as the box) as part of a sensing and monitoring mechanism for providing an indication of product level in the bag, or preferably, determining a threshold level (e.g., such as, for example, a low level of product). The control mechanism may monitor the information about the component container, including information obtained in connection with the reading of the respective RFID tag, as well as RFID generated or sensed information (e.g., temperature). A sensing and monitoring mechanism is employed to sense the presence of beauty product components and monitor their presence and usage. The sensing and monitoring mechanism preferably may include one or more RFID tags for sensing product presence (as discussed herein), and processing components, such as, for example, a computing component (e.g., computer or server) to record the sensing data and store that data, as well as evaluate the information provided from the RFID components to determine the usage of beauty product components, the availability of beauty product components installed on the device 210, as well as beauty product components that may be available in inventory, including at the location where the device 210 is present or being used.

According to one embodiment, the sensing and monitoring mechanism for sensing and monitoring the usage of the beauty component in the container or bag, such as, for example, a hair colorant component, is configured to provide an output that corresponds to a condition. One condition is when the amount of the hair colorant in the container reaches a low level. The sensing of a low level indication preferably generates an output, where the preferred output may be to generate at least one instruction to check the supply of that component on hand and another instruction to reorder the component. The component containers in inventory, which may be present at the hair salon location (e.g., where the dispensing apparatus 210 is deployed and operated), preferably each include an RFID tag that includes the identity of the product component, as well as other information about the product component. The apparatus 210 is therefore able to make a determination whether there exists inventory at the apparatus location. The RFID tags preferably may be interrogated by a signal generated or issued by a signal-issuing component, which may include, for example, an interrogator or antenna configured to read the RFID tag and a transponder, as well as including through a Wi-Fi access point or router, or other communication component that may be used to transmit signals (encoded or decoded). For example, the control mechanism of the device 210 may be configured to receive information from the interrogator/reader and/or transponder. The control mechanism may include one or more components for receiving and decoding information from the RFID tags.

According to one embodiment, the interrogator component may be provided on the apparatus 210, preferably as part of the control mechanism. According to other embodiments, the existing Wi-Fi or other wireless networking component, such as the salon's wireless modem, router, switch or other device, may be configured (through a remote means, such as a computer or server) to issue an instruction to have a reader generate an interrogation signal to obtain a response from the RFID tag on a component container. In this manner, for example, the apparatus 210 may proceed to ascertain whether there is a supply of the beauty product component in inventory (and the number of units in inventory), and, may also generate an order for the beauty product component (which may be automated or require a user to approve).

The inventory control system preferably includes a sensor, such as, for example, an RFID tag, associated with each respective container. Each RFID tag preferably includes RFID information data that identifies the product in the container, as well information about the product, such as, product properties, e.g., contents, manufacturer, expiration date, date produced, and date ordered. The inventory control system is configured to account for inventory based on the sensed information (e.g., from interrogating RFID tags) and generate alerts based on the actual or a perceived content levels of the respective beauty product components in their respective containers. An interrogator is configured to generate a signal and read the RFID tags that are respectively associated with the respective containers. The inventory control system preferably is used in conjunction with a computing component, including, for example, the control system or remote computer that includes software with instructions for implementing captures of the RFID information data from containers on the device 210, as well as containers located at the dispensing location. In addition, the inventory control system may include a communication link between the dispenser 210 and a remote computing component through which supplies may be ordered.

The inventory control system also facilitates guarding against product waste (through theft or misplacement of items). The RFID tag also may be configured to provide a location of where a product bag has been sensed. For example, where theft is a concern, according to some embodiments, the RFID tag is configured so that it may be interrogated through a signal to provide its location. According to a preferred embodiment, the RFID tag of each container may be utilized to monitor the beauty product component prior to its installation and use, as well as during its use on the device 210, and after it has been consumed. Monitoring may be implemented by keeping track of the pump operation of each respective pump and respective dispensings for each component. The information regarding the usage of components preferably is stored on a storage component of the device or server. The usage information preferably is communicated to a monitoring mechanism, such as, for example a computing component configured with software to receive and store information relating to the usage of the component product (and container) based on pump dispensings and component install date, evaluate the level of content, and generate an output that may be a reorder of the product, or a check on inventory, or both (if there is none, or a low level of inventory of product). For example, the output generated may correspond to a condition where the amount of said beauty product component in a bag has reached a low level. The output may be an instruction that is issued or generated (to the salon device, text message, or other notification mechanism) to check the supply on hand of the beauty product component whose condition was sensed to be at a low level. The output also may generate an automatic reorder of the low level component, which may be done when the level is sensed to be low, or after the inventory level of that component at the dispensing location has been checked for the presence of additional inventory.

According to a preferred embodiment, as shown in FIG. 4A, a sensor, such as, for example, an RFID tag 860 is provided on the container 305, and is shown positioned at a location on the container 305 so that when the container 305 is placed on the dispensing apparatus 210, the tag 860 aligns with a reader antenna 861. The reader antenna 861 is secured on the frame 211 of the apparatus 210, and preferably may be linked to communicate with the control mechanism or with a wired or wireless network for communication of information read from the RFID tag 860 to a computing component, such as, for example, a network server or salon computer or server. A transponder or decoder may be provided to decode the information retrieved from the RFID tag. According to one preferred embodiment, the device 210 includes a programmable logic controller (PLC), a reader and a secondary controller or component (such as a controller) to link the PLC with an Ethernet or Wi-Fi component for communication with one or more components, such as a remotely linked component, e.g., an OPC server, SQL server and/or cloud server. A decoding component may be provided or linked with a remote server to decode information relayed from the antenna 861 reading an RFID tag 860. Preferably, as with the tag 860, an RFID tag is provided on each one of the respective containers installed on the device 210. The reader antenna 861 is disposed at a reading distance to interrogate the RFID tag 860. The antenna 861, for example, may be a near field/short range UHF antenna, and a plurality of antenna may be provided so that for each slot or space on the apparatus 210 for a container, there is a corresponding respective antenna to read the container RFID tag. The RFID tags preferably are provided with identification data that identifies each beauty product component bag (and its contents) independent of any other beauty product component bag (e.g., though a unique serial number assigned to the RFID tag). A reader is provided on the device 210 at each location where a container is to be installed so it is able to interrogate the RFID tag of a container that is installed in the device at the reader location. A temperature sensor for sensing temperature may be provided in conjunction with the RFID tag, so that temperature information also is included as part of the RFID data or information relayed. Where the temperature sensor or component also is associated with a container or bag, the temperature component also may provide information, and the sensed information may include the RFID information about the container as well as the temperature or temperature change that the container and its contents have undergone. According to a preferred embodiment, the temperature sensor or component senses the temperature of a component bag in regard to its respective RFID identification data, and the temperature sensor in connection with the reader communicates the RFID identification data and usage information to a computing component where the information may be processed to determine the stability of beauty product component in the bag. The computing component designated to receive the information may be on the dispenser 210 itself (such as the control mechanism) or may be remote from the dispenser 210 and dispensing location, and linked through a communication network (e.g., Internet, VPN, or the like).

According to one preferred embodiment, communication with an RFID tag provided on the beauty component bag may be carried out using an open wireless standard that provides the ability for exchanging data between another component, such as a server or base station and other machines using radio transmissions or other network or communication transmission, such as, through the Internet, a VPN and the like. The sensing and monitoring mechanism determines an amount of beauty product component present within the container, such as, for example, the bag 315, or container 305 (FIG. 4A). The sensing and monitoring mechanism preferably includes a sensor chip, such as an RFID tag that is mounted on the container. The sensing and monitoring mechanism also may be used for sensing a component level at the location of use, such as a salon. Although the sensing and monitoring mechanism may be used to determine the level of component in a container or bag and potential available inventory on hand of a component for use in the apparatus 210 (e.g., at a salon), the sensing and monitoring mechanism also may be implemented to monitor beauty products purchased by the consumer for use at home. This is done preferably through user data, such as, anticipated need and usage, previous orders, and expected usage. For example, the user may purchase beauty products, such as, for example shampoo. According to some embodiments, the shampoo may be specially formulated and customized for that user. According to a preferred embodiment, the server may be configured with instructions to monitor the user's use or expected usage of product based on historic usage by that user (frequency of reorders), information from the user profile and anticipated or expected use, or combinations of these. The system software also may include instructions that provide the user, such as the consumer, with an option that automatically places an order for more inventory of the product that is low (such as a shampoo) or, alternatively or in addition, provides the user with an option or reminder to place an order. According to a preferred embodiment, as discussed herein, the consumer may be introduced to products at a salon, where the product is used on, and even formulated specially for the consumer, and the consumer may have the ability to purchase the same product. The product may be made available through a distribution center that is linked to the consumer information that the salon uses and may store. The consumer therefore may purchase the same formulation, even if a custom formulation. The formulation also, if desired, may remain proprietary, so the consumer may not have the ability to purchase the product other than at the salon where it is used on or sold to the consumer, or from a distribution location (e.g., online order that is prepared and shipped to the consumer from a distribution location). The apparatus 210 may be used at a salon location, or may also be used at a central distribution location so products may be produced packaged and shipped to the consumer. The apparatus 210 may be provided in multiple units where a distribution location required more demand than a salon. Alternatively, the apparatus 210 may be scaled to be larger to produce multiple containers of customized product at a time. A label or bar code associating the consumer identification with the container in which it is dispensed. Alternatively, or in addition thereto, the information may be provided on a chip or tag, such as, for example, an RFID tag. According to preferred embodiments of the invention, the communication between sensor-enabled devices, such as, for example, product containers, may take place through the use of components, including those associated for use with machine to machine communications, which may include sensors, RFID elements, Wi-Fi and/or other communications links, such as cellular. In addition, the control mechanism of the invention may include software with instructions to instruct a hardware processor to aid a networked device to store and interpret data, and make decisions, such as whether to reorder product or generate an alert of a product expiration or other condition. The product usage for the apparatus 210, as well as home use of a product, may be monitored with the control mechanism, which may be part of the apparatus 210, or through communications links to a server that may be remote from the control mechanism of the apparatus 210, which may be provided to link through a communications network, preferably thorough one or more communicating devices.

The apparatus 210 may be configured with a control mechanism that includes a timer. The timer may be alternatively or additionally includes as part of a sensing and monitoring mechanism. According to a preferred embodiment, the timer may be associated with the sensing and monitoring mechanism and be configured to operate so that when product is dispensed, the time of dispensing is recorded and considered. For example, for some component products that are used more frequently than other components, the level for reorder may be different (versus the level of reorder for product components that are not consumed as rapidly).

Information relayed from the sensing and monitoring mechanism, including RFID sensed information relating to usage and inventory, as well as timed usage information may be provided to a computing component that is linked with the distribution and or warehousing of the product and product components used by the apparatus 210. According to a preferred embodiment, information may be relayed from the apparatus 210 to a warehouse ordering component, which may comprise a computer with a network connection that is linked for communication with the dispensing apparatus 210. The ordering component may be programmed to receive information communicated by the apparatus 210. The information communicated by the apparatus 210 may include the levels of product. According to some embodiments, the ordering component also is linked to an order database, which preferably includes the product shipments, and the product levels as well as product to be ordered may also take into account product shipped from the warehouse to the apparatus location. For example, where an apparatus sensing and monitoring mechanism includes a component that senses and communicates that the level of a product is low, the warehouse ordering component may receive that information, but may not ship a product if the warehouse ordering component already has information that the apparatus location has product stock on hand (e.g., of the component or product associated with that low level value), and that product stock on hand is suitable. Alternatively, according to some embodiments, the warehouse component may receive information or interrogate the apparatus location, through issuance of instructions to activate one or more readers or interrogators to scan for the existence of component at that location. According to some embodiments, the warehouse ordering component may be configured to determine when stock is insufficient, and when levels of product being used by the apparatus 210 are low so that a timely shipment of product may be provided to the apparatus location before depletion of the current supply that the apparatus 210 already has immediately available to it.

According to a preferred embodiment, the warehouse location preferably includes an apparatus for filling shampoo, treatment and conditioner for internet sales. The warehouse location preferably also has an apparatus, which may be similar to the apparatus 210, but designed for larger, multiple orders and for packaging an already dispensed and mixed product.

Although the apparatus 210 includes a stage on which a container such as the bowl 350 is placed to receive components dispensed from the dispensing nozzles, according to an alternate embodiment, a conveyor type arrangement of dispensing nozzles may be provided as an alternative. For example, according to a one alternate embodiment, a conveyor belt countertop is provided in place of or on the stage, and the nozzles are arranged in a linear arrangement, with dispensing of each component taking place through delivery to the container or bowl 350 when it has reached the location below where the nozzle is positioned along the conveyor path. For example, a durable, thick, rubber-like material for easy cleaning (which preferably is resistant to the hair care products) may be used to convey product. The conveyor may be encased and have an aesthetic quality to it. According to one embodiment, the conveyor is placed within a glass (or visible panel). Preferably a container is provided for receiving the product. The container is moved along the conveyor. For example, according to one embodiment, the conveyor has notches or another type of means for securing the container as the product is being dispensed from the dispensing apparatus. The container may make stops, so the conveyor may stop at one or more locations along the apparatus as the products, or product components, are dispensed. According to one embodiment, a sensor, such as for example, an object detecting device, is provided to detect whether a container is in the proper place. This facilitates reduction of both accidents and product waste, as the sensor preferably is linked for communication to the apparatus controls (e.g., such as a control mechanism), so that when an out of place container is sensed, then the apparatus ceases dispensing, and sends an alert signal to the operator or other appropriate individual or component designated to receive the alert. According to this alternate embodiment, the product is dispensed in a linear fashion, and the apparatus includes a processor and media (such as a chip, flash memory or a hard drive) that contains instructions for instructing the processor to control the distance of travel of the conveyor or belt in order to position the container under the appropriate dispensing tube or nozzle of the dispensing apparatus. The container may move along the path of travel or conveying path to each necessary fill point and then move on to the next point. The apparatus also may include an alerting mechanism that emits a sound to alert that the fill is starting and finishing or even to announce the number being filled (the number corresponding to the order number of the order for the hair product desired to be dispensed from the apparatus). According to some preferred embodiments, the panel or a voice alert may be provides to provide an ingredient count such as, "blending begins now", or such as "filling 1,4,7,12, . . . " or "blend complete."

According to embodiments of the invention, the dispensing apparatus includes a plurality of tubes or lines (such as the lines 358,359,360,361,362,363 shown and described herein) that connect with a respective product containers or component bags (such as a bag contained in a box). According to a preferred embodiment, as shown and discussed herein, the beauty product component is a hair color component provided in a bag housed within a cardboard box. The product component bag preferably has a port with a connector that connects with the product container or bag. According to the alternate embodiment, where the apparatus is configured to dispense along a linear path, the lines or tubes used to deliver product from the bag to the container may be uniform, so that the tube may be made a consistent measurable length (making the apparatus more economical, and reducing the supply of parts required to maintain the apparatus). In addition, the apparatus 210 may be configured with the display and/or control mechanism separately located from the pumps, bags and other parts of the apparatus 210. The control mechanism and/or display may communicate to the remotely situated pump mechanism through a secondary control provided on the apparatus 210 that receives the instruction from the remotely situated control mechanism component and/or associated display, and operates the apparatus 210 pump mechanism to deliver appropriate amounts of components to the desired receptacle, such as the bowl 350. According to preferred embodiments, the control mechanism regulates the operation of the pumping mechanism to deliver dosages of the respective beauty product components to the dispensing outlet of the device 210 to provide a beauty product. The control mechanism also receives instructions, which may be from a salon application operating on a salon computing device, or from a local or remote server, e.g., the salon network operator server, to produce a beauty product by regulating the operation of the respective plurality of peristaltic pumps of the device 210 to deliver dosages of beauty product components from the respective bags containing the respective beauty product components.

According to some embodiments, the devices according to the invention may be configured to include the dispensing features in one room, and the product containers in another room or location, which is out of the sight of the area where the dispensing apparatus is used. According to some embodiments, the apparatus may be configured to be installed as an "over-the-counter" concept, or alternatively, may be installed as a locked room and "load from behind" concept. According to one embodiment, the apparatus may be configured to allow the installer to determine the most suitable way for the application (e.g., "over the counter", or "load from behind").

The dispensing apparatus 210 may be configured to dispense hair coloring, hair care products, as well as other personal care products, such as, for example, shampoos, hair conditioners, lotions and creams.

According to one exemplary embodiment, the dispensing apparatus is configured to dispense components required for hair coloring, and dispenses a hair dye formed from the dispensed components. One preferred embodiment is configured to dispense colors (such as, for example, three primary colors), an oxidant (which may involve multiple levels of oxidant, and hence two separate components), and a viscosity regulating agent. According to this latter embodiment, up to sixty-four dispensing lines are connected with at least sixty-four pumps to dispense the components to a container. Preferably, the components may be supplied in bags with a port or connector for connecting to one of the designated lines or tubes of the apparatus that has been designated for that component. Colors, keyed connectors, or other identifying elements may be used to ensure the proper component containers or bags are connected to the appropriate tube or line. Although three colors, two oxidants and one viscosity regulating agent are described, there may be greater or fewer colorant components, including, for example, more colors, or other components for regulating and stabilizing the hair colorant to be dispensed from the apparatus. According to one preferred embodiment, sensors, such as, for example, RFID tags, may be implemented for identifying and certifying that the appropriate colors or components are installed in the correct location on the dispensing device 210. According to a preferred embodiment, as shown in FIG. 4A, a small range or limited field antenna 861 is mounted at a location on the dispensing device 210 to align with the RFID tag 860 of a component container 305 that is installed on the device 210, so that while the component (such as a container 305 or bag 315) is in place on the device 210, the RFID tag is read. The antenna 861 is shown mounted on the rear wall of the shelf 218'. The antenna range is limited so as not to read RFID tags from adjacent containers also installed on the device 210. Upon installation of the component, the component's RFID tag 860 passes or aligns with the antenna 861, and the antenna 861 provides a first reading of the RFID tag 860 identifying the component container 305. The container 305 in which the product component is supplied includes a bag 315' that is encased within a casing, such as, for example, the cardboard box 315". In this alternate configuration, the container 305 is installed on a shelf 218' of the dispensing device 210. The dispensing device depicted in FIG. 4A is constructed similar to the device 210 shown and described herein but with a shelf 218' on the frame 211' (in place of the hooks 322 and support 218). A tube 358' preferably connects with the bag 315", and may either make a connection within the box 315' or alternatively, extend through an opening 315b' the box lower panel 315a'. As discussed herein in connection with the bag 315 and tube 358, the line or tube 358' may be preattached to the bag 315" and, according to another option, a nozzle (not shown in FIG. 4A) may be preattached to the opposite end of the line or tube 358'. The casing, such as the box 315' protects the bag 315" and contents held therein during storage, shipping and handling. The shelf 218' may be provided with slots formed thereon to provide bays within which the containers, such as the container 305, may be seated. The shelf 218' preferably has at least an opening in a wall thereof, such as the lower wall 218" to provide a space for the line or tube to extend. The bays or slots formed by the shelf 218' preferably are provided for each container 305 and are formed at a location proximate to the pump serving to deliver the component from the bag 315'. The RFID tag preferably may store bits of information, including for example in code or other form, information that identifies, for example, the manufacturer, expiration date, product serial number (unique product identification number), product content, and other information. One preferred example is an RFID tag or chip that stores 96 bits which are embedded into the tag. The bits of information may employ naming convention or code to make use of the storage capability to maximize the information embedded, such as a code representing a manufacturer of the component. The antenna 861 preferably is coupled with a transceiver or other component that receives the information from interrogation of the RFID tag 860 and stores or communicates that information over a network or on or to a server. The information also may be processed to determine whether a replacement of that component needs to be shipped to the location of the dispensing device 210.

The device 210 also may have a mechanism to make sure that the proper component is dispensed when called for. For example, in the case that the RFID tag is read, and the information communicated and processed (for example, with the device control mechanism, or to a remote server that receives the information and processes it), and the component RFID tag identifies the component as the wrong component for that position or location in the dispensing device 210, then a signal or alert is sent. The signal or alert also may be coupled with an instruction that prevents further dispensing of the components from the machine, until the proper component is installed in its proper location, or until an override of the alert or instruction is made. Similarly, if an empty component container or bag is installed (for example, a previously used component container), then the RFID tag may be read and the processing of the information is able to identify the component through its RFID tag as signifying an empty component container. An alert or shut down of further dispensing may be implemented until the situation is remedied. In a preferred embodiment, the antenna 861 may be about a 4 inch by 4 inch size and may face a 2 to 3 inch area on the dispensing device 210 where the component container 305 is to be seated. Consequently, when the component container is removed from the device (or its slot position on the device 210), then the antenna 861 also senses the removal, by the lack of RFID tag readable signal. The removal may be processed as an event, signifying the component container has been removed (or may have been consumed). The RFID removal event may be processed to correspond with the component dispensing information (based on the record of pump dispensing of that component from its container). If the information matches, then no instructions may be provided, but where the dispensing expected usage does not correspond with the depletion of the use of the component in that bag, then an alert may be generated and provided to an appropriate person or device (e.g., such as the salon network operator, or operator of the salon using the dispensing device 210). Although the limited range antenna 861 is implemented for use in connection with reading of component containers on the device 210, a broader range interrogator may be utilized at one or more locations throughout the dispensing device location (e.g., such as the premises of the salon) to detect the presence of inventory that may be present at the salon (or location of the dispensing device). The information may be processed to provide information on components that have not been depleted (e.g., exclude empty containers that may be in waste disposal) or to exclude components already installed on the device 210), so that a true inventory may be read. This may be done by processing the information determined to identify through the RFID tags on the component containers sensed, and excluding component containers whose RFID tag or unique identifier (code or bits) were recoded as already having been previously installed and consumed, and also excluding those component containers that are indicated to be in use on the device. Alternatively, the reader or other component designed to read RFID tags of the containers to identify inventory may be assigned or limited to select locations of the salon premises where inventory is stored, away from disposal and the device 210.

According to a preferred embodiment, the device 210 preferably is configured so that the containers that contain the beauty product components may be placed in locations on the device, such as, for example, as shown in the alternate shelf depiction of FIG. 4A, where a container 305 is positioned on a shelf or slot 218'. When placed at a designated location on the device, the RFID tag 860 of the container 305 is read with the antenna 861 positioned at that slot. (See FIG. 4A) The device 210, and preferably the control mechanism, identifies the component in the slot. The slot or container location on the device corresponds with a particular pump of the device 210. The control mechanism or software that is provided on a local or remote server designates that pump to correspond with the component whose tag is read and the contents identified. For example, a recognition feature or mechanism correlates the pumps and respective component associated with a particular pump (e.g., through the RFID tag and slot identification, as well as possibly, the pump identification or position and line coming into the pump). According to a preferred embodiment, the device 210 is configured to identify the slot location of the component, so that when that component is called for by a formula or instruction to provide a dosage of that component, the dispensing is done by that corresponding pump. Therefore, in the event that a container is placed in the "wrong" slot, the pumping mechanism will be operated to deliver the proper component, or, if it is not present, then it will not dispense the component merely because there is a container in the slot. In addition, in the event that the container is installed on the device 210 but is not in a designated slot, the device 210 automatically adapts to the new configuration based on where the component container is placed on the device 210 (e.g., which slot it is placed). Instructions preferably are provided in software that is stored on the control mechanism of the device, a remote or local server, or multiple locations (e.g., the device 210 and a server). The pumping mechanism therefore preferably is controlled to deliver the proper component that corresponds with the pump that the component is associated. According to preferred embodiments, the container containing a component may be placed anywhere in the machine (e.g., at any slot, and to be delivered by any pump) and the control mechanism is configured with software containing instructions to detect and identify what the product component is based on the RFID reading.

According to an alternate embodiment, the mechanism for identifying the container to deliver the respective dosage preferably may include positioning an RFID reader or tag on a pump, and, alternately, an RFID tag on the line or tube so that the RFID tag of the line may be read to identify the line passing through the pump as corresponding with a component container. The component container RFID tag and line RFID tag preferably may be the same in the embodiments where the component is supplied as a component unit, with a bag containing a content of a product component and a line attached to the bag (as well as in some embodiments, a nozzle attached to the line at the line end opposite the bag end). The line and container (including the bag) may be recycled, and, according to some embodiments, the RFID tag is removed and replaced. According to alternate embodiments, an RFID is provided that is readdressable, so that the same RFID tag is reinitialized with alternate information.

The dispensing apparatus and warehouse component preferably are networked and a server may be provided at the warehouse for communication with the apparatus served by that warehouse, or other dispensing apparatus that require supplies.

Although the device 210 may be operated remotely, through a tablet or other remote computing device, or may be operated through a local or remotely linked server, preferably, the control mechanism on the device itself may be used to dispense products from the device 210. For example, preferably multiple failsafe solutions are built into the device 210. According to preferred embodiments, critical data to operate the machine is stored on the PLC (or control mechanism) in the event of a complete internet or other communication interruption. The device 210 also may be configured with a built-in hotspot to insure communication continues with the device 210 and remote computing components and/or a server in the event of an internet failure. According to preferred embodiments, the device 210 includes a power supply back up to provide for suitable time of operation, such as, for example, an hour of operating time, in the event of a power failure. In addition, the device 210 preferably is programmable to designate alternate products for association with a particular pump. For example, in the event of a specific pump failure, according to some embodiments, a product component may be moved to another pump. According to alternate embodiments, the device 210 may be configured with an alternate "empty" pump space, and may have a pump that is provided in the space but which is not connected to deliver a component. The alternate pump may be assigned a location and may be activated should one of the other pumps fail. In the case of a failure of one of the other pumps, the line may be switched over to the alternate pump and the alternate pump may be designated in place of the pump it is replacing.

As discussed herein one preferred embodiment for providing components is in a container configured as a bag. The bag is configured to allow dispensing of content therefrom, while minimizing the empty space in the bag that would otherwise be taken up by air and potentially oxidize or ruin the component.

The system, apparatus and method, preferably include or are integrated for use with a beauty treatment preview and selection component. As discussed herein, the individual may tailor the beauty treatment, such as a haircut, color, style or effects by preselecting and participating in a preview process. The preview process preferably includes a dynamic selection process by which the user, or preferably a user and a technician that is to apply the treatment, may go through a simulated application of the desired treatment through selection menus and options. In addition, the system, method and apparatus provide the user and technician with the ability to display the hair of an individual on a display screen. This may be done by taking a photographic image of an individual on a white, black, blue or green screen for display, and capturing and storing the image. The image may be manipulated to remove background that is not the hair of the individual. A representation of hair treatment selection and effects, including stages of a haircut to be done, may be carried out by manipulating the image presented on the screen. The image is presented on the display utilizing a filtered translucent overlay that is generated in conjunction with the proposed or selected manipulation to be applied to the user's hair image. In this manner, there is not merely an overlay of a hair style that is superimposed on the individual's image, but rather, the technician or individual, may go through steps of cutting, on the representative screen display, to remove portions of hair in particular areas thereof. The ability to undo a cut portion also is provided, as is the ability to start over with all or some of the selections made. For example, if the color is correct and the cut is not, the color may be saved as an option, while the cut may be redone. Effects also may be saved or redone. The final image may be saved. Preferably, the corresponding components are associated with the inputs entered for the individual client/user as well as the selection options so as to provide the solution in terms of products that may be dispensed and/or formulated to achieve the desired result and effects.

According to a preferred embodiment of the invention, the selection options and controls for controlling the apparatus 210 preferably may be presented through an application, or app. The application is designed to operate in connection with a processor and preferably the application is comprised of stored instructions for instructing the processor to implement operations, such as communications with the apparatus 210, with a server, or with other devices, including other applications on the user's device or other device. According to a preferred embodiment, the application includes a communication component, which preferably is software configured to facilitate communications, which according to a preferred embodiment, as depicted in the schematic illustration of FIG. 8, takes place through or using a web service 700 that is hosted on the cloud server 701. The communication preferably takes place through the Internet 702 (though other communication links may be utilized for communication). The consumer application preferably is installed on a computing device 704 of the consumer, which, for example may be a tablet, personal computer, phone, PDA or other electronic communication device. The computing device 704 preferably has, or has linked with it, a camera, or has a capability to store a photograph thereon from a camera. The consumer application may record and store data, including consumer generated or provided data. This data may then be sent to a server 701, and preferably from the server to the machine or device 210. Preferably, Modbus to PLC communication (object linking and embedding (OLE) for process control), may be used to provide control operations for the device 210 that is located at the salon. In addition to communicating with and exchanging data with the consumer device and application, the programmable logic controller preferably is programmed with instructions to deliver or to receive instructions from the control mechanism of the machine or apparatus 210. The PLC, for example, may provide instructions to perform one or more tasks, including, producing a custom formulation, making an appointment for the customer/user. A consumer application or app preferably is provides for use in conjunction with smartphones, and preferably for smartphone, e.g., i-phone and android type, operating systems. According to a preferred embodiment the user uses the app by first downloading the app. Once downloaded, consumer/user selects option of location finder, selects the language desired, and next completes a user profile (for example, including name, age, gender, ethnic heritage, environmental factors-body composition and other useful information that a technician or stylist may utilize to provide customization of beauty products, including hair coloring products). Preferably, the profile also includes hair condition information, such as density, shine, suppleness, strength and elasticity, as well as scalp condition or conditions (e.g., normal, tight, dry, flaky, irritated, itchy, sore). The consumer app preferably is provided with information that allows the user to make an at-home comparison of what they see in a mirror to that of a healthy hair and scalp of a person of the same age. These depictions may be generated for display on the user's computing device. The user also proceeds by determining hair color (e.g., natural level, current level, desired level, desired tone, previous chemical services, solid or dimensional). Preferably, the user uploads a photo showing the user's head and hair.

With the user information provided to the app, the user may then use the manipulation tools provided with the application in order to modify the user's own hair shape or select another style, determining to skip or make saves of these selections for later use or consideration. The user may be presented with a menu and may scroll through the menu choices and options, discarding or skipping some, while selecting or saving others. The user may elect to "try on" the desired selected color, and accordingly, may make adjustments to the presentation to the user by a refinement selection options, which according to preferred embodiments, may include a slide level or dial option that the user may manipulate on the screen using the user's computing component (e.g., such as the touch screen of a tablet). For example, a slide level selection option bar may be presented to the user to make changes to the color level by sliding a lever to affect the level of color shown. In addition, the user make may adjustments to the tone presented by making a manipulation of an input option, such as, by dialing a level to affect the tone. Other selection options appearing on the display, preferably, a touch screen display, may include a side level, dial/wheel or other suitable input and selection graphic or element. The manipulation preferably is received as an input and is processed with a processor of one of the computing devices (e.g., salon server, or salon network operator server, e.g., OPC server or cc server) to provide a corresponding formulation (preferably using the components of the dispensing device). The user therefore has gone through the app and makes selections and options to provide s resultant haircut, color, style or effect, or combinations of these in a saved location of the app, or the user's device, and preferably, also transmits the information to the OPC server. In addition, the app preferably provides the user with the ability to make a selection of a salon destination locator (and to request an appointment). The salon destination locator preferably identifies salons that are subscribers or participants in the app program (e.g., a salon that is part of the network of salons). In addition, the app may consider the location of the client through the client's network usage, location-identifying chip on the client's computing device, information entered by the client (e.g., address) or other identifying element. The app may provide the client with the nearest salon that is part of the salon network using the app. The user may even locate a salon of the salon networks anywhere in the world and make an appointment. In addition, the app includes a translator, so, in the event the user is making selections, the selections and descriptions may be provided to salon personnel who is more familiar with a language other than that of the customer, or does not understand the language of the customer. The translator may be configured with software that resides as part of the app or alternatively, may be a translation engine where the software is remove from the app, and processing takes place through a transmission from the app to a processing location (such as a translation server or salon network server). Likewise, selections or recommendations from the salon personnel (such as a technician who does not understand the language of the customer) may be translated to the language of the customer (or a language that the customer may understand). The apparatus 210 preferably may be configured to receive information relating to a client, and provide the client or salon visited by the client with the appropriate formulations saved and associated with that client. The dispensing apparatus 210 may be utilized in salons in different parts of the world, or different locations within a country, so that a user, while traveling or staying at a different location, may receive the benefit of consistent product formulations. According to preferred embodiments, the client profile is stored for retrieval, and preferably on a cloud server so the salon, technician or operator of the dispensing and distribution system may retrieve the user's history in the salon app and work with that user.

According to a preferred embodiment, the app is used in conjunction with the dispensing apparatus 210, and the salons provided from which to make a selection for an appointment are those that utilize the apparatus 210. The app therefore, preferably is coordinated with the dispensing apparatus 210 to provide selections available to the consumer based on the hair color components that are utilized in conjunction with the apparatus 210. In addition, the app may be branded with a particular brand, and the salon may be designated for use of that brand, so the consumer/user selects based on branded components being represented for color and effects. The salon apparatus 210 preferably includes branded components that may correspond with the app selections presented to the consumer. Alternatively, the app may be unbranded with regard to component hair colorants (or products) available for selection, and the user makes selections without regard to what component product brand is to be used at the salon. In fact, the app may be programmed to generate one or more advertisements for one or more brands. The control mechanism of the apparatus 210 may be programmed to dispense a product that corresponds with the selection made by the user, and based on the user input. The control mechanism may include or be linked to operate with a programmable logic controller (PLC). The PLC may receive instructions from the dispensing device, or, alternatively, from a remote communication device, such as a server or computing device using an app, such as the salon app. The PLC may be programmed to dispense beauty product components from the respectively associated bags in accordance with communications of instructions received.

The app may further be configured with software that provides information to the user about hair care, and learning options for the user. This may be generated at a central server location and communicated or linked with the app for association with all app users, or in some instances, one or more appropriate users where the information is specific to that user or those select users. For example, the app may provide the user with information to learn about custom formulations. These custom formulation learning presentations or care information preferably are based on the consumer information, so, if a consumer with a particular type of hair or scalp is using the app, the consumer/user may be provided with pertinent information for that user. The custom formulations may relate to washing and treating hair, nourishing and rejuvenating the scalp, protecting and preserving hair and scalp, styling and finishing the hair. The app may also generate information regarding appointment confirmation (e.g., such as, for example, a map-drop pin, day, time, directions), which may be coordinated with a calendar application that is present on the user's computing device or is used by the consumer/user.

The application preferably continues to operate when the user reaches the salon. Preferably, at the time of the user visit or preferably prior to the user's arrival at the designated salon (a salon of the network location of the designated salons), once an appointment is confirmed, client profile data is downloaded into the salon database for the continuation of the consultation and completion of service.

Figure 14:
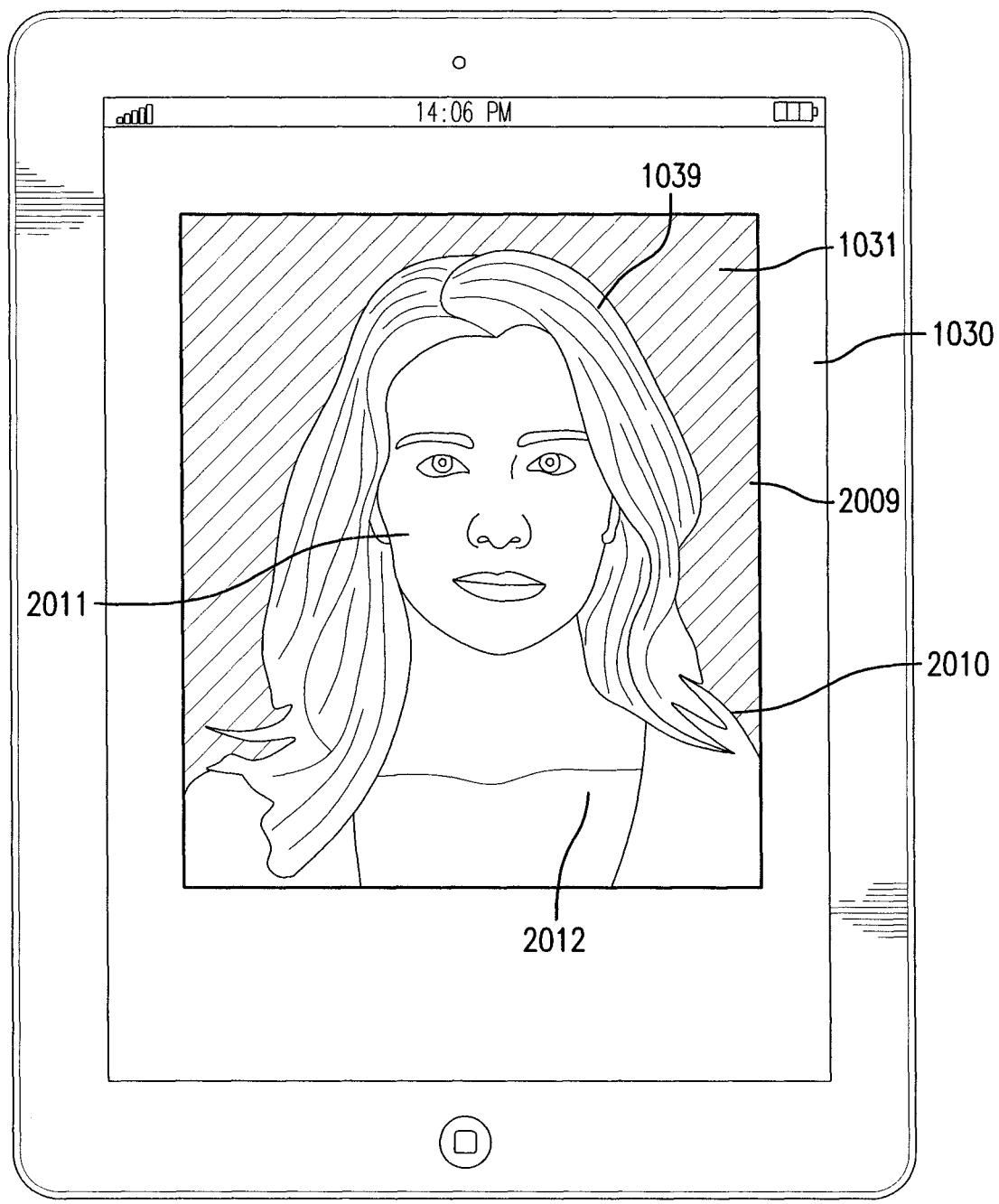
FIG. 14 is an exemplary embodiment of a screen display for the application or app, depicting a green screen showing the green background.
Figure 15:
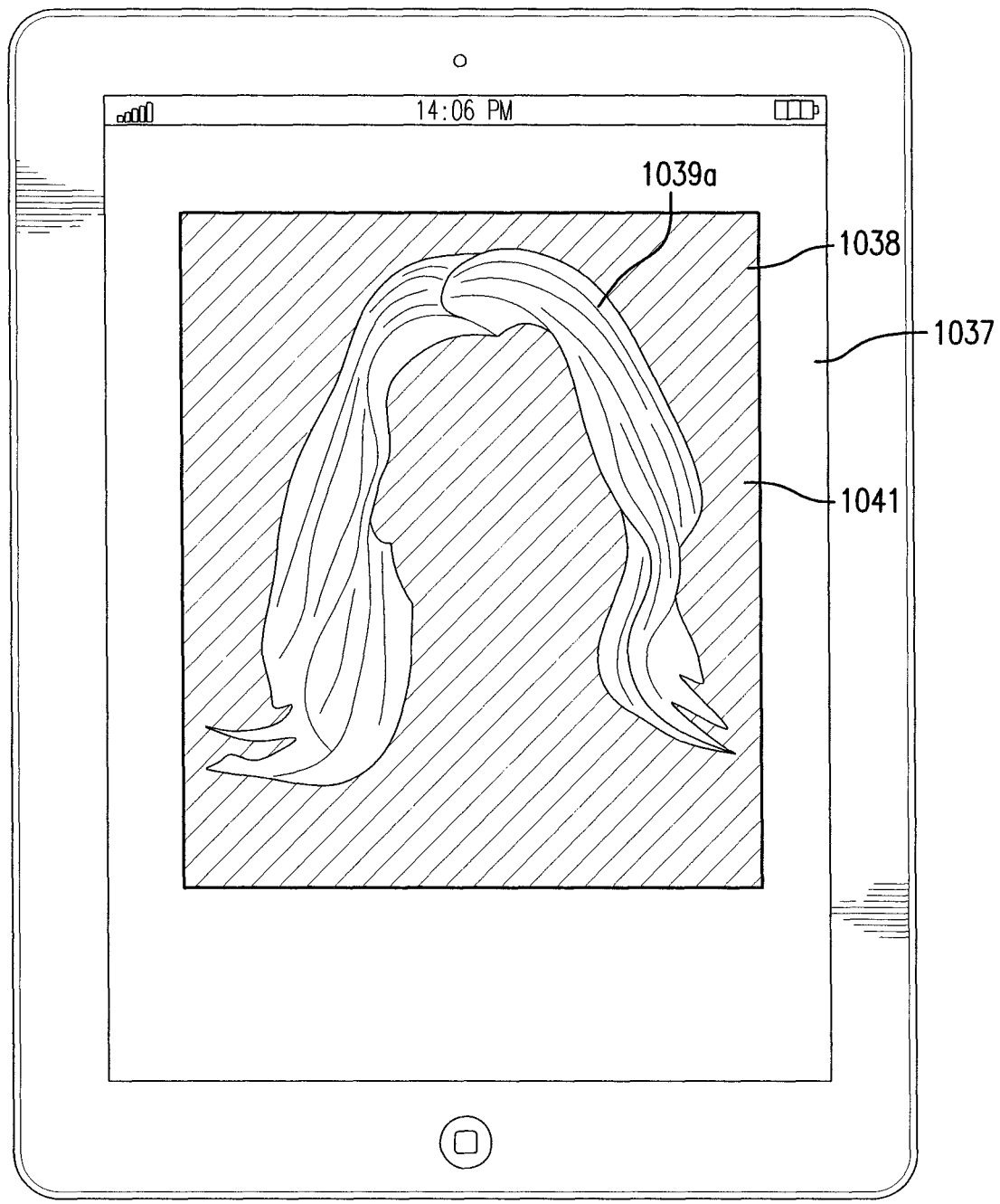
FIG. 15 is an exemplary embodiment of a screen display for the application or app, depicting a green screen showing the client's hair depicted apart from the client's face and body, and shown on a green background.

The salon preferably includes the app features that the user accesses, plus additional features provided in the preferred salon professional app or salon app. The salon app preferably includes software configured with instructions to record and process information, and preferably, is used with a communication component (e.g., Wi-Fi, Internet, VPN), and communicates to the OPC server (or other computer or server, such as the cc server 806, FIG. 9). According to a preferred embodiment, the salon app includes a consultation engine that generates a procedure through which the technician or salon operator may provide a virtual style, cut, color and/or effect to the individual. According to preferred embodiment, the salon application directs the salon user through a preferred consultation, which involves first, taking a green screen photograph of the individual client. A separation visual is then generated, as depicted in FIG. 15. The separation visual is a separate graphic image of the user's hair 1039a (FIG. 15), which may be manipulated apart from the other portions of the user, such as the user's face 2011 (FIG. 14). Therefore, the separation graphic provides for effects to be generated and viewed.

The salon app then provides tools so that the stylist, utilizing a computing component, and preferably a touch screen, manipulates the hair of an individual, for example, by playing with hair shape (e.g., bangs, length). The stylist may use the salon app tools to manipulate what client already selected or saved, or may keep the same selected by the user).

The salon professional app provides the capability for the technician to photograph the client's own hair and scalp and demonstrate visually how recommended products will restore a healthy and youthful appearance to the hair and scalp. For example, according to a preferred embodiment, the salon app generates a display of a side by side visual image representation (which may include the actual image of the client's scalp), focusing on the attributes of youthful hair. According to a preferred embodiment, the app provides the attributes in steps, such as in 5 steps to focus on desired attributes, such as, for example: density, diameter, luster, suppleness, strength and brilliant color. According to a preferred embodiment, the stylist may implement the salon app to further offer options to the client. For example, the stylist may offer option A and option B. There may be options that correspond to formula, and these may be referred to as formula options. The formula options may be provided on the screen and applied to the representation of the user for selection (with the differences being displayed on the hair of the image of the user). The formula options may provide an effect, color or other treatment. In addition, there may be techniques options provided on a techniques screen to display options for implementing a technique on the user's hair, skin or scalp. The salon app preferably provides the user, such as a stylist of the salon, with the ability to perform image manipulation. The stylist may cut and style hair on a computing device, such as, for example a tablet (e.g., an iPad®), which includes being able to apply a hair color application to the image. The stylist will be able to utilize the app in conjunction with a computing device to be able to determine color for a client hair with a recommended color or create a color from a color pallet. The app also may provide options for the salon stylist in the form of style recommendations, which may include demonstration and showing of new styles to stylists, as well as provide color recommendations, that may include demonstrations and showings of new trends in color and formulas. According to a preferred embodiment, the application or app includes software that instructs a processor to carry out manipulations to the displayed image (which may be the processor of the user device on which the user is viewing the displayed representations, or may be a processor of local or remove server). The manipulations, such as colors, attributes and other depictions appearing on the display and that the user or salon personnel may control through manipulation and selection, preferably are processed and displayed, and also are associated with a formulation that may be saved and provided to the dispensing apparatus. In addition, the saved selections may be associated with an instructional engine that includes software to provide instruction with graphics to the salon technician. In addition, features discussed herein in connection with viewing progressions of a hair manipulation, such as, a cut or style, also may be generated using the app software.

Figure 9:
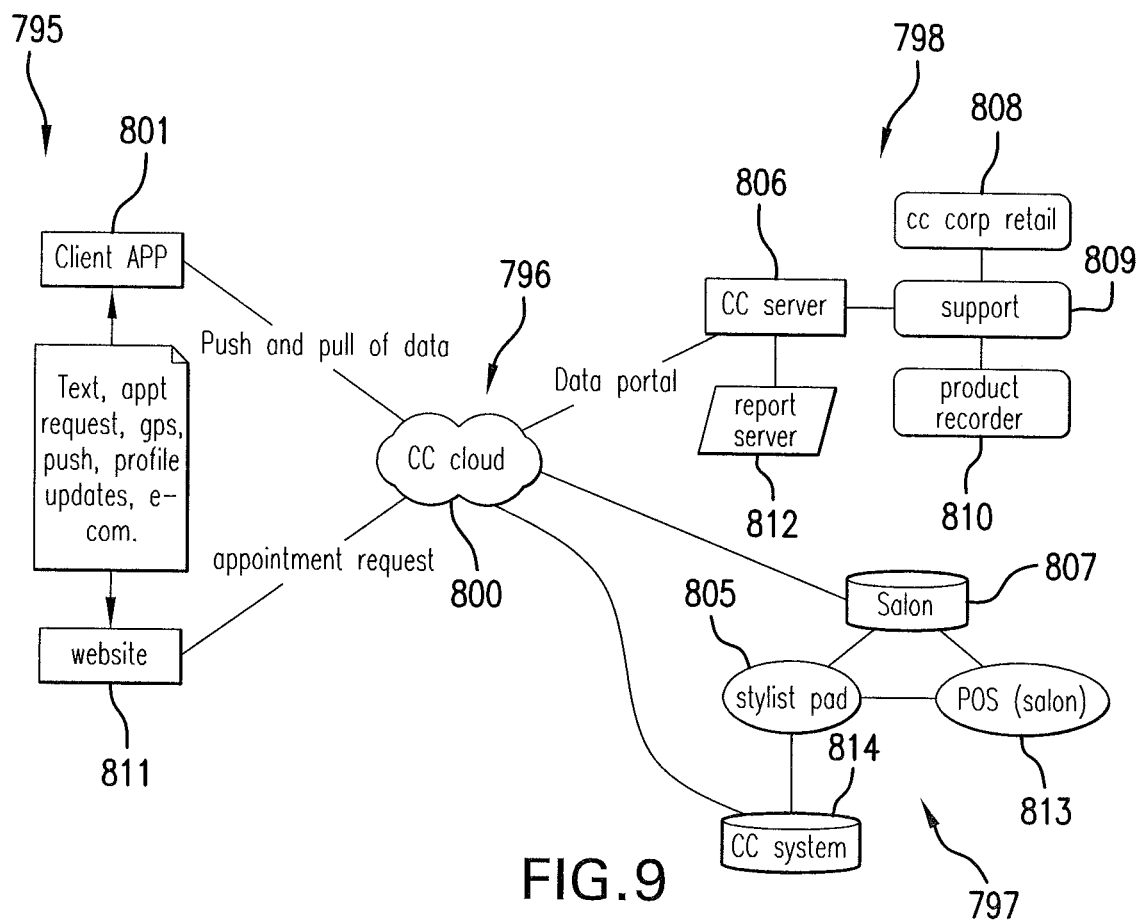
FIG. 9 is a schematic diagram of a preferred arrangement of the architecture for the system for providing customized hair treatment solutions, shown to incorporate individual client/users, salons and salon network operations.

Referring to FIG. 9, there is illustrated a schematic representation of a preferred implementation of a system according to the invention. According to a preferred embodiment, the system includes client feature component portion 795, data storage and communications component portion 796, salon component portion 797 and network salon system provider component portion 798. Preferably, applications are associated for use with each respective component portion 795,796,797,798, and communications across component portions 795,796,797,798 are done to provide the user and salon personnel (e.g., technicians, stylists and the like) with information that the consumer user/client may work with using the client app 801 and that the salon may work with using a salon app on a computing component used by the stylist, such as, for example, the stylist pad 805. According to a preferred embodiment depicted, the system may be implemented using a cloud server 800 for storage of information. The salon network operator may control the system through the data and communications component portion 796 and the cloud center or server 800. The salon network operator may be an organization or company separate from the salon and user (e.g., according to one embodiment, such as Colorculture™, represented as "cc" in FIG. 9). According to one embodiment, the salon network operator is a provider of products to the salon and products that may be used to implement styles, colors and effects in connection with the selections of users made by the user app, or by salon personnel using the salon app. The salon network operator may control the use of the by the users/clients as well as salons, for example, where the salons are subscribers or designated salons certified or otherwise permitted to use the network and associated applications. According to one preferred embodiment, the cloud center or server 800 may serve as a central repository and communication center that may be operated by a salon network provider. For example, the cc server 806 may be a salon network operator and may control the types of data that are relayed and provide instructions through software and selections so that the cloud server may push notifications to users of the client app 801 (which preferably is operated on a client device, e.g., a tablet). The communications also may be made to the salon 807 (e.g., such as a salon computer or server). For example, the salon may be advised of new trends and options available, and preferably, the options are consistent with the products, such as the beauty product components and the products that may be made by dispensing the beauty product components from a dispensing apparatus, such as the dispensing apparatus 210. According to preferred embodiments, the system is configured to provide options and implementations in conjunction with the dispensing device or apparatus 210. Preferably, the dispensing device or apparatus 210 may receive communications to dispense product for use consistent with selections and options of the user or salon personnel that are made using their respective applications or apps. For example, selections of hair color for the user/client hair may be translated to a beauty product dispensed by the dispensing apparatus 210, which, for example, may be located at a salon. Alternatively, the formulation may be made available to the user for purchase from the salon network operator through the "cc corp" retail component 808, which may also be associated with a support component 809 and product reorder component 810. Each component may include software configured with instructions to receive requests for products and/or solutions and support, as well as to generate orders for products. Preferably, each component also includes a computing component, such as, for example, a hardware processor, memory and storage media, through which the software instructions may be carried out. For example, where the client or user has been introduced to, or recommended to use a custom formulated shampoo, and that client desires to reorder the product, the product reorder component may implement reorder functions such as, for example, reminders or automatic reorder and fulfillment of product. This may be done through the cc server 806, preferably in association with the client app 801.

Figure 8:
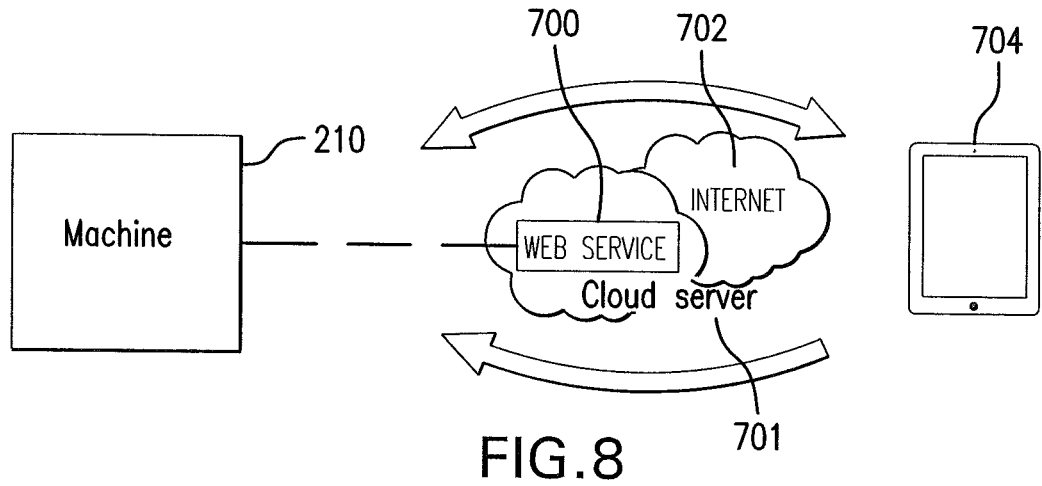
FIG. 8 is a schematic diagram of a first embodiment of a system for providing customized hair treatment solutions.

According to one embodiment, clients or users may utilize an app or application 801 through their own respective personal computing devices, such as, for example, a tablet 704 (see FIG. 8). The client or user app or application 801 preferably is configured with software containing instructions to receive information and push information to the cloud center 800. The information provided by the user through the user app 801 or indirectly by the user's use of the user app 801 is preferably made available to selective salons, such as for example stylists or technicians of the salon that the user may visit and/or engage to provide a hair treatment (or other beauty treatment). The salon, for example, desiring to use the applications and system, may purchase or lease a dispensing apparatus 210, and integrate the user app 801 and communications of data between the user and salon capabilities through the use of the salon app on the stylist pad 805. The management of the communications may be handled through a server, such as a cloud server or center 800 and/or the cc server 806. A website 811 may be provided for use by a client or customer. The website may be used to handle communications (similar to the client app or application) and may include features that allow the client to make appointments view promotions. Clients will also be able to book appointments, find a networked salon location and buy retail from the network salon operator, such as the "cc corp" retail 808 supported by the network salon system provider, as represented by the component portion 798. The website 811 also may serve as a portal to the cc server 805 and features associated with the network salon operator, such as purchase of retail products and support. The client app 801 preferably is configured to provide the user or client with the ability to make selections using the app 801 to buy retail, lookup salons, make appointments and update the client profile. For example, the client may utilize the app 801 to locate the nearest network salon operator system salon (e.g., such as a Color Culture™ system salon)

anywhere in the world where the salons are located, and make an appointment. The client app 801 also is configured to receive information and provide the client with the ability to see recommended products and new styles, which may be based on the client profile, and/or which may be based on data collected based on other clients and users, as well as salons, as to what are the trends, popular choices and currently desired styles, colors, effects. The client app 801 also may implement alerts, including through geo-fencing (where a client is in proximity to a salon). Social media sites (e.g., such as, for example, Facebook, Twitter, LinkedIn and others) may be integrated into the client app 801 to work in conjunction therewith, and may allow features the client has selected to be shared or communicated with others, as well as for the salon to social network with the user. According to one embodiment, the client app 801 may include an integrated client loyalty program feature, which accesses the data relating to client purchases and salon visits and provides a corresponding reward according to a reward system. The app 801 also may be configured to integrate with the salon appointment schedule or calendar to show availability of appointments and personnel and permit the client to make an appointment. The app 801 also may provide reviews of different colors, effects, styles as well as salons to provide the user with further information. The app 801 also may be used to generate text messages, such as, reminders for appointments, reordering of products, or to advise of a new feature or product that is available.

The salon that utilizes the system, preferably will be able to run reports, reorder products and make payments right from a salon portal associated with the salon component portion 797 of the system. The salon also will also be able to look at trends through data made available by a server that provides information based on data collected and reported for users of products and/or salons utilization of products, styles, and trends. According to a preferred embodiment, the cc server 806 processes data to generate reports on trends, which may include purchase and use trends for products, style trends, as well as other salon and user selected options. The cc server 806 may include as part of the cc server 806, or in association therewith, a report server 812 that generates reports which may be used by the salon network operator (cc in this example) to tailor advertising and promotions to what customers currently desire. The salon network operator also may communicate to the salon the trend information to alert the salon personnel as to more likely sales opportunities and suggestions that the customer may be more likely to accept. In addition, the salon also will have access to an education system to certify a stylist to use the cc system 814, which may be implemented as a salon app on the salon pad 805, or other computing devices of the salon 807. The salon 807 also may dispense from a dispensing device, such as, the dispensing apparatus 210, and/or sell products at the salon, where the salon serves as a point of sale 813 for products. The cc system 814 preferably provides the salon with the ability to receive instruction, demonstrate representative effects for applications of beauty products (such as hair colorants), styles, cuts and effects, and deliver the result through the implementation of custom formulations that correspond with the selected representative implementations. According to a preferred embodiment, a dispensing apparatus 210 is linked for communication to receive corresponding data from the salon app, for example, operating on the stylist pad 805, or from the client app 801. The mechanism utilized for communications between the selection source and the dispensing apparatus preferably may be a server, such as, for example, the cloud center or server 800, the cc server 806, or may take place through the cc system 814. Preferably, regardless of how the communication takes place, the client profile is updated to reflect the selections and applications, as well as formulation dispensed and/or applied to the client, as well as style, cut, effects and other information. The cc server 806 and report server 812 preferably also receive the information and may aggregate information to generate reports based on any variable, such as, most widely used color, or most widely used color by customers having a prior hair condition (e.g., blond hair), or customers located in a particular geographic region. The data may be stored locally on the cc server 806, or on a separate data repository, such as, for example a cloud server or center 800.

The salon app preferably is implemented on a stylist computing device, such as a stylist pad 805. The salon app provides the salon personnel with the ability to image the user and implement steps to provide a responsive representation that permits a haircut to be represented on an individual and allows the cut to be displayed by simulating the cut as if the stylist was using a tool, such as scissors on the person's actual hair. A depiction of a representative cut or styling by allowing the manipulation of the user's depicted hair to remove as much or as little hair as desired, and in locations desired, and to have the image depicted on the display represent the progression of a style or haircut being carried out on the person's hair depicted on the display. However, in accordance with the preferred embodiments, the depiction is carried out prior to manipulation of the persons' physical hair.

Figure 10:
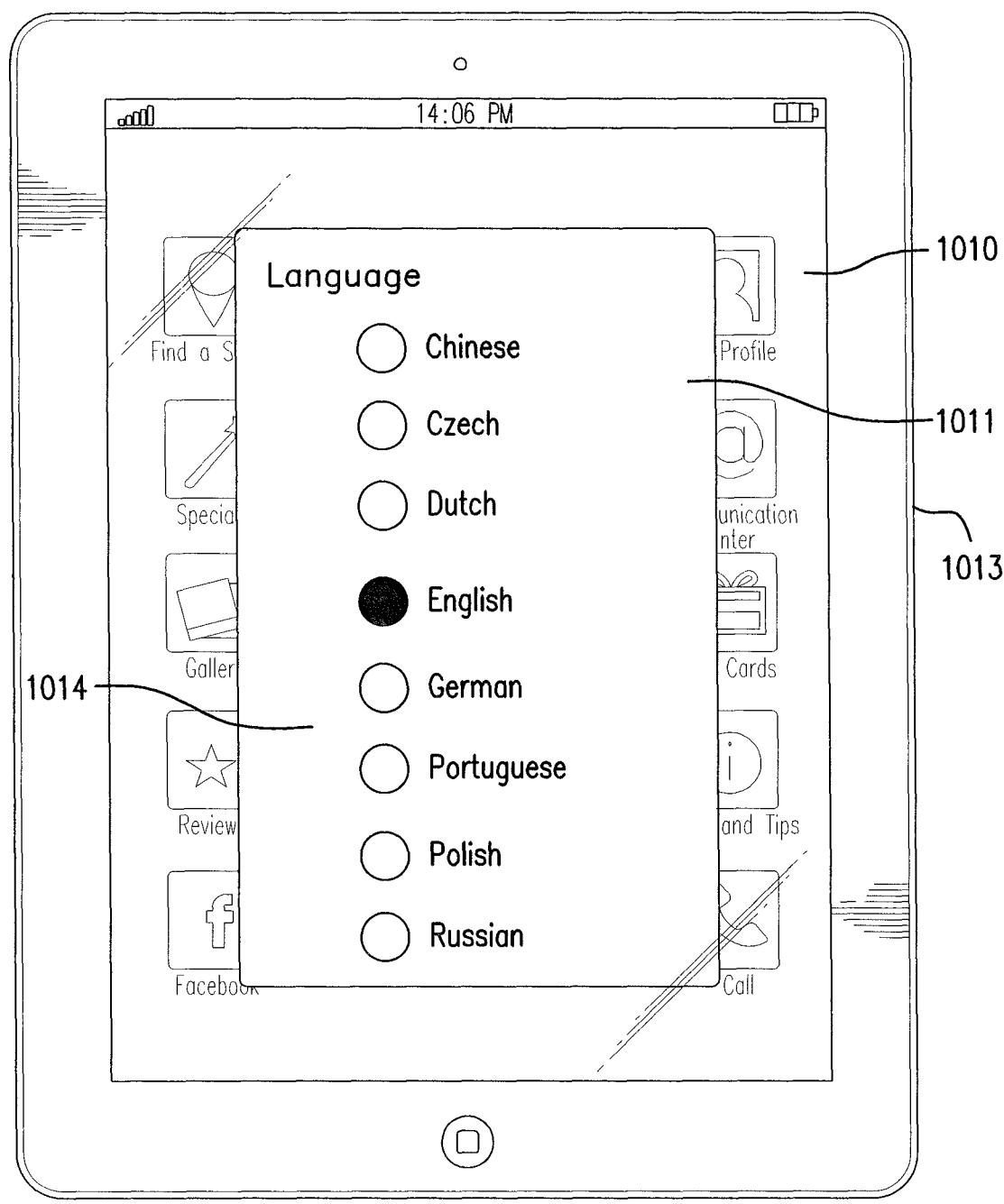
FIG. 10 is an exemplary embodiment of a screen display for the application or app, depicting a language selection screen.

According to a preferred embodiment, the app or application is depicted in use with a tablet computing device and screen displays are shown in FIGS. 10-25. The depictions may be on the tablet of a client or user, or alternately, may be on the stylist pad (such as the pad 805 depicted in FIG. 9). Although some portions of the app or application may not be suitable for initialization by the consumer user (such as imaging the user on a green screen background), the app generally is utilized in a similar manner, whether by the stylist or client. Referring to FIG. 10, there is illustrated an exemplary embodiment of a screen display 1010 for the application or app, depicting a language selection screen 1011. The screen display 1010 preferably is shown as part of a tablet 1013, though the screen display 1010 may be provided on another computing device, such as, for example, a phone 1110 (see e.g., FIG. 26). The language selection screen 1011 presents selection options 1014 for the user to choose a language for communications and displays conducted with the app. The app preferably is configured with a translation engine that relays the communications in the language selected by the user to discernable information (such as another language) that may be read and evaluated by the server and processor that processes and stores the information. Although English is shown as the language in which the language selection options 1014 appear, the language selection screen 1011 preferably is configured to depict languages in their respective characters (e.g., Chinese). According to some embodiments, upon making a language selection, the language selection options 1014 may appear in the already selected language, rather than the language characters or language represented by the selection options.

Figure 11:
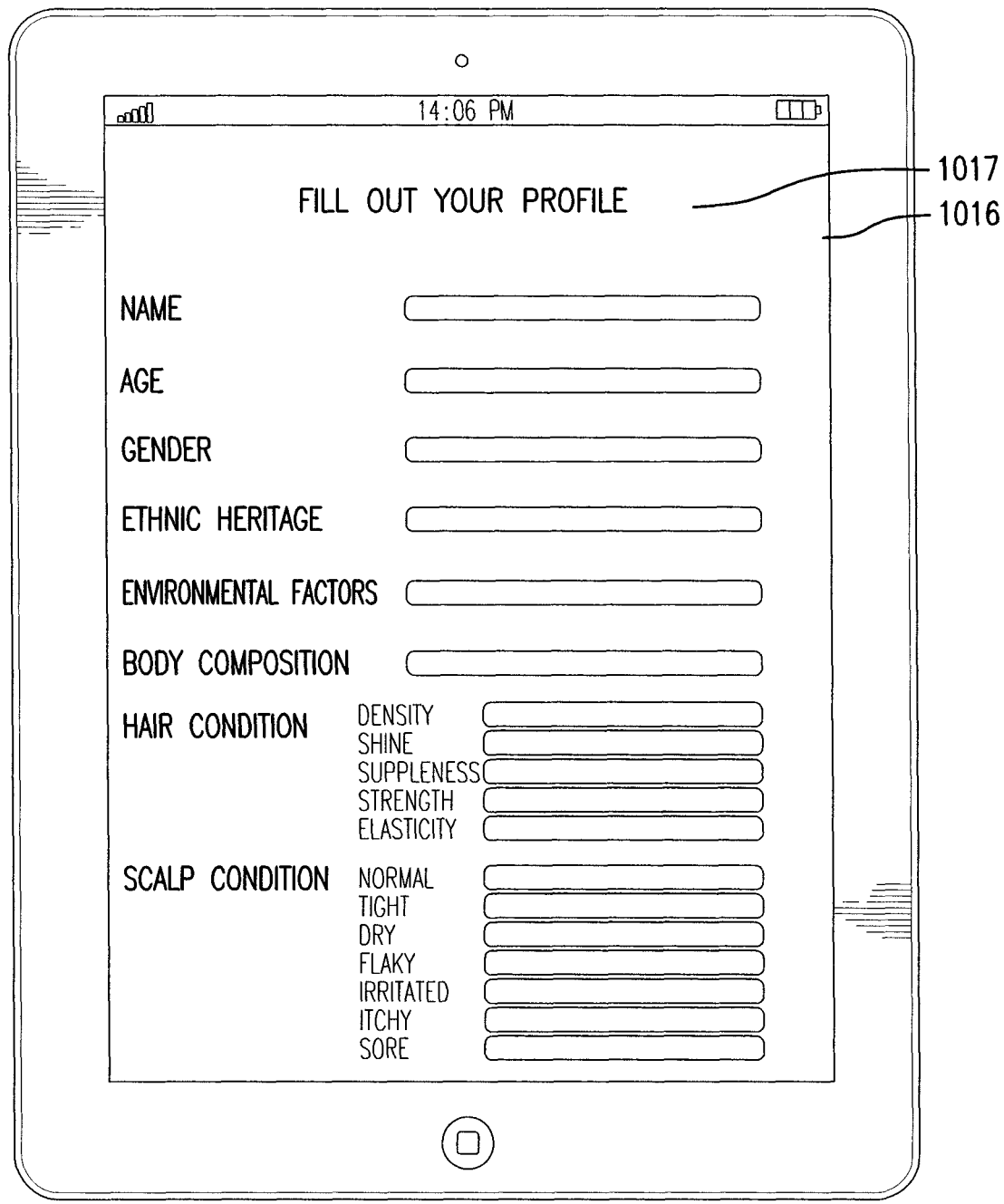
FIG. 11 is an exemplary embodiment of a screen display depicting a user profile entry display, through which a user may enter information.
Figure 12:
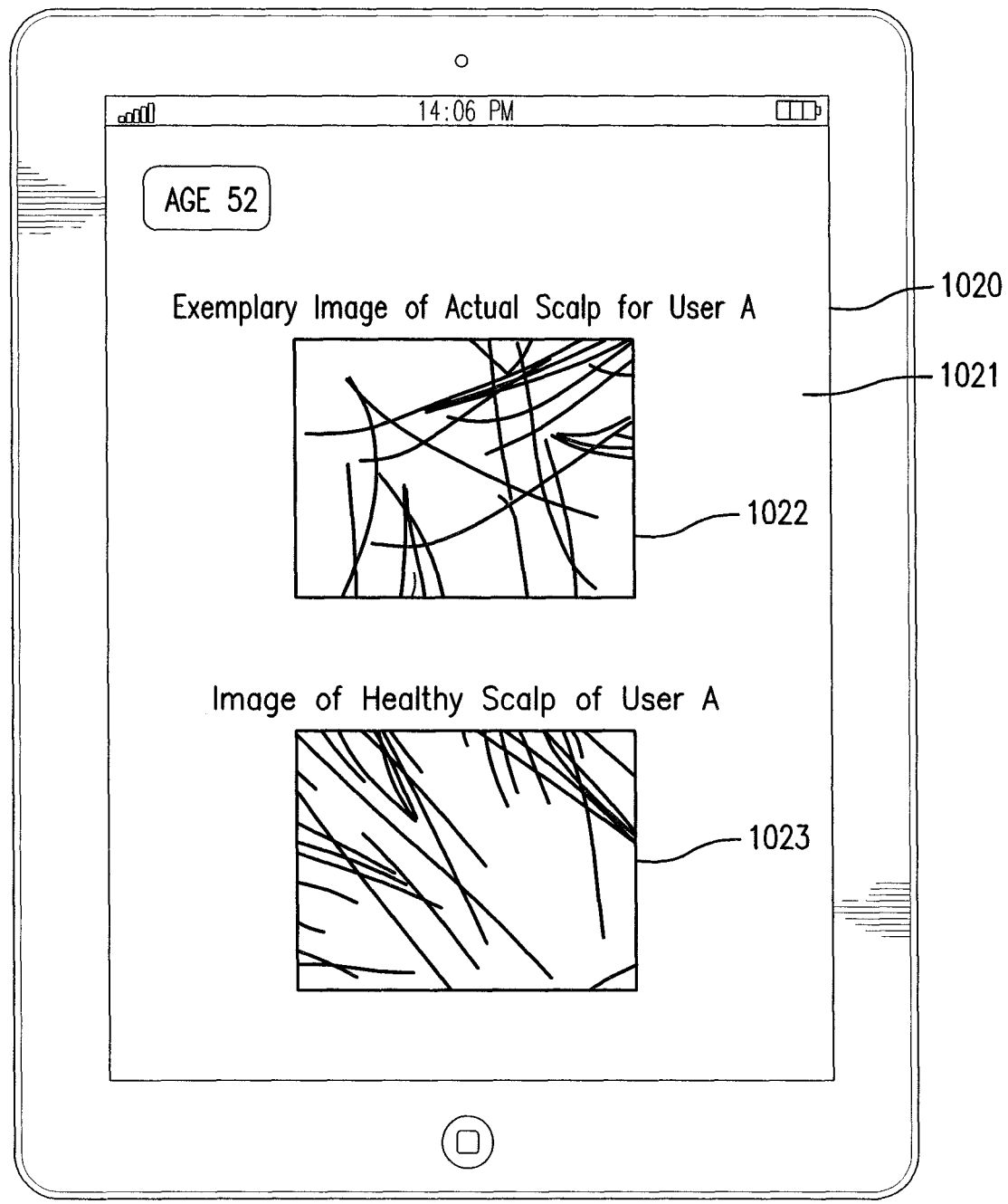
FIG. 12 is an exemplary screen display for the application or app depicting a scalp condition screen and showing an image of a healthy scalp and hair of a person of similar age, gender and ethnic background and a person's actual scalp and hair.

Referring to FIG. 11, an exemplary embodiment of a screen display 1016 depicting a user profile entry screen 1017 is shown. Fields are provided on the screen 1017 into which a user may enter information that the system uses to evaluate and present options for the user, including to provide appropriate formulations to achieve desired results, such as desired effects, colors, textures skin/scalp treatments, based on the user profile information. User profile information, optionally, may be entered at a salon, e.g., by a salon technician, and may be reviewed for conformation at the salon. (Screen 3) Referring to FIG. 12, there is shown an exemplary screen display 1020 depicting a scalp condition screen 1021. A first scalp image 1022 is depicted on the scalp condition screen 1021. The first scalp image 1022, preferably, is a representation of the scalp condition of a user. The scalp condition representation of the user's scalp may be assigned a category type and the image or type, or both, may be stored in the user profile. The first scalp image 1022 may be an actual photograph that the user has taken and uploaded of the user's actual scalp, or alternatively, the image 1022 may be a selection that the user has made based on a menu of options, or a selection of image options that may be generated to appear on the display of the user's computing device or tablet 1013. A second scalp image 1023 representing the desired scalp condition (e.g., a healthy scalp) of a person of similar age, gender and race, is depicted on the scalp condition screen 1021. The healthy scalp represents the target for the user's scalp condition, such as, for example, what the desired condition would look like after appropriate treatment has been applied to the user's scalp. The user or individual therefore may have the user profile stored, from which considerations of scalp condition, when appropriate for selection of products or components to use, or mix as part of a dispensed product, may be taken into account. For example, the example image of a healthy scalp 1023 may be generated in connection with the user information from the user profile, and the generation of the scalp image may be based on things such as user age, demographic, and other physical and/or genetic properties or characteristics of that user.

Figure 13:
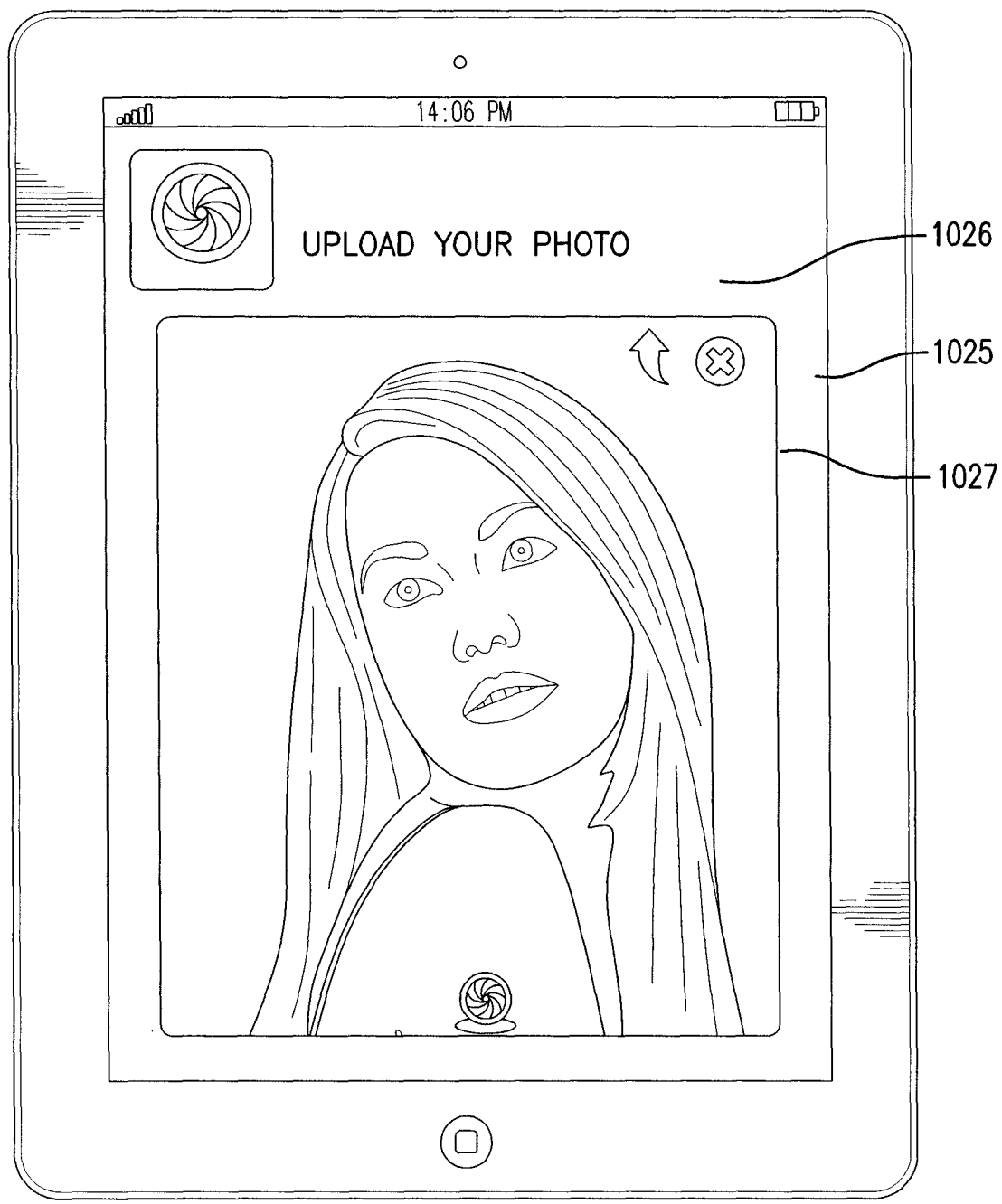
FIG. 13 is an exemplary embodiment of a screen display for the application or app, depicting a user photo upload screen.

Referring to FIG. 13, there is illustrated an exemplary embodiment of a screen display 1025 depicting a user photo upload screen 1026. Preferably, a user may take a photograph and upload the image 1027 to the system server (e.g., such as an OPC or cloud server 701 shown in FIG. 8, or cc server 806 shown in FIG. 9). The image 1027 preferably is stored as part of the user profile, and may be used by the system to manipulate the effects, colors, styles, cuts and treatments when using the app. The image 1027 preferably is made available to the user, through use of the app, and preferably also is available to the salon so the salon technician may use the image to manipulate it and apply a style, color, cut or other treatment or effect, and store the image. The salon personnel may manipulate and store a new version of the image that is a treated image depicting a hair treatment that the user may select.

According to a preferred embodiment, the process may be carried out in front of the individual or client user, at the salon, or may be done prior to the client user coming to the salon. As an alternate option, the salon technician may manipulate the image to apply particular modifications to the client user's hair and may make the proposed modified image available to the user as a recommendation. The user's application may include a link or message that the image has been posted for the user to access. Alternately, the client user may deselect the option, so only the client user may make manipulations (prior to coming into the salon for the user's appointment), or so that the salon may manipulate the image (so as to prepare for the user's visit or scheduled appointment) but not transmit it or make it available for access to the client user's application. The individual's user image is preferably manipulated to depict the user face and hair on a green screen background.

According to a preferred embodiment, the user's hair is manipulated so that it may be changed, and may be a manipulatable variable. According to one preferred embodiment, a green screen process may be utilized to generate the separate image portion (the user's hair) that may be manipulated apart from the user's face. FIG. 14 shows an exemplary embodiment of a screen display 1030 depicting an image 2009 of the individual 2010, where the individual 2010 is displayed on a green screen 1031 appearing as a green background. The image 2009 of the individual 2010 preferably is stored as data, which may be a local storage (on the computing device on which the image was input or taken), or may be uploaded to the salon network server (such as the cc server 806 shown in FIG. 9), or both. The individual's hair 1039 preferably is provided as a separate image, and, according to a preferred embodiment, may be depicted on a green screen background, separate and apart from the client's face and body. As illustrated in FIG. 15*a* screen display 1037 depicts an image 1038 on a green screen 1041 showing the individual user or client's hair 1039*a*, the hair 1039*a* being depicted apart from the client's face 2011 and body 2012 (see FIG. 14), the hair 1039*a* being provided on a green background 1041. One preferred process for producing the image of the hair separate from the client's face 2011 involves placing a green cape on the client (which preferably matches the green screen background 1031,1041) and positioning a green face mask (which also preferably matches the green screen background) in front of the client's face 2011. The image of the hair 1039 may then be taken, and that may be designated to serve as a manipulatable image. The manipulatable hair image 1039*a* preferably is joined together with the image of the client's face 2011. The resultant image therefore, includes an image of the client, but where the hair image 1039*a* is a manipulatable variable that may be modified to correspond with and display a desired treatment or other effect. One preferred embodiment stores the manipulatable hair image 1039*a* separately from the other image portion (i.e., the background 1041, the individual's face 2011 and body 2012). Manipulations may be made to the client's depicted hair 1039*a* to try on different colors, effects and cuts (as discussed herein). The hair image 1039*a* preferably is saved with the manipulations (which may be permanently to a file or in temporary storage as a computer file) and the image is combined with the face image of the individual to provide an image of the individual with the hair that is manipulated to display a representation of the desired effect, treatment, style or cut. In this manner, changes are made to the variable image portion while the client face, body and background may remain unchanged.

As discussed in connection with the preferred embodiment, the client's image is photographed on a green screen background (at the salon or by the user). The manipulation of the user image to separate the hair image 1039*a* preferably is carried out using the green screen background, and imaging the individual on the background with the face mask and cape, as discussed. Alternatively, the separation of the user hair image may be done through a computing application. The computing application may be configured to evaluate the pixels forming the image, and determine where pixels change densities or coloration, and may attempt to approximate the user's hair profile, and apply an instruction to change the pixels outside of the profile to green (or other color, e.g., gray or neutral). The app or application, such as, for example, the salon app used by a salon personnel, may be used to capture an image of an individual, such as a client, for manipulation of that image to apply a process to the individual's hair. The image is taken (see e.g., FIG. 13 and FIGS. 14 and 15). According to a preferred embodiment, an image adjustment may be applied to the image of the individual or the individual's hair image (e.g., 1039a). The application or app preferably includes an image adjustment mechanism with instructions to alter the image condition in order to provide a natural tonality. Preferably, the natural tonality corresponds with a predetermined color temperature, and more preferably, a color temperature of 3000 to 3500 degrees K. The image condition level may be presented on the screen and provide options for altering the image color level (or tonality of the color) to a natural condition (if the image color level is not already a natural condition). For example, where the image has been taken in incandescent room lighting, and has a generally yellow or warm cast to it (e.g., 2700 degrees K), the image may be adjusted with the image adjustment mechanism which the user may select (e.g., from a slide switch button on the screen) to alter the image from its initial color condition to a preferred natural condition (e.g., for example, from 2700K to 3500 degrees K). The adjusted image may then be saved and provide the image from which manipulations are made using the application software, as described and shown herein. Once the image is adjusted to a natural color or tone condition, then a level value is assigned to the person's hair. This is done by establishing a natural level for the natural hair of the individual, which is the individual or client's hair as it exists naturally, without any applied treatment (i.e., without even a previously applied treatment, so for example, if the individual has naturally blond hair, and the hair is colored to black in the image, then the natural level will be based on the blond hair (regardless of the existing present color, black). The level preferably is assigned a level value from a scale value, which in the United States, corresponds to a scale value of from between 1 to 10, and in Europe, corresponds to a scale value of from between 1 to 12 (although the values from 1 to 5, for both the U.S. and Europe may track one another, the end of the scale or higher values generally are different, and not correspondent). Preferably, the software is programmed with instructions to use one scale or the other and the information is processed to provide a result that corresponds with the use of either scale (which a user may preselect when making initial settings for the application software, or may alter based on the initial determinations and assignments for a particular client/individual). In addition, a level translation component may be provided for the software so that in the event a U.S. initiated client profile is called up for use at a salon in Europe, the software is able to make the adjustments. In addition to assigning the client hair a natural level (e.g., in the U.S. from 1 to 10), the actual level existing at the time of the photograph is assigned. The actual level is established based on the level of the client hair as imaged (preferably, after tonal correction or adjustment to a natural condition, as discussed herein). For example, the naturally blond client with black hair would have an actual level value assigned, using the same level scales 1 to 10 or 1 to 12, as discussed, based on the black hair. A color and level may be on the person's hair from a treatment (e.g., treatment prior to being imaged). The actual level value takes that into account. At this point, therefore, the system has received from selections and assignment of levels, a natural condition level and an actual condition level for the client/individual. The application preferably displays the hair image on the display screen, and provides the user, such as the salon personnel, with the ability to slide the level control, such as, for example, a slide bar displayed on the screen, to scroll up or down a selector graphic on the screen display to reach a desired level and have that desired level displayed on the screen. For example, the person's hair image may lighten or darken. Darkening is represented in a saturation of pigment to represent darker hair. Lightening is visually exposing the undertone that an observer would see if the hair were actually lightened. The tones go from red at lower levels, e.g., like 2-4, to orange, gold and yellow as the levels go lighter and higher, e.g., to 10 or 12. By manipulation of the image in this manner, the display of the image exposes the undertone of the hair at that desired level. The selection therefore may be made including the undertone at the desired level.

Figure 17:
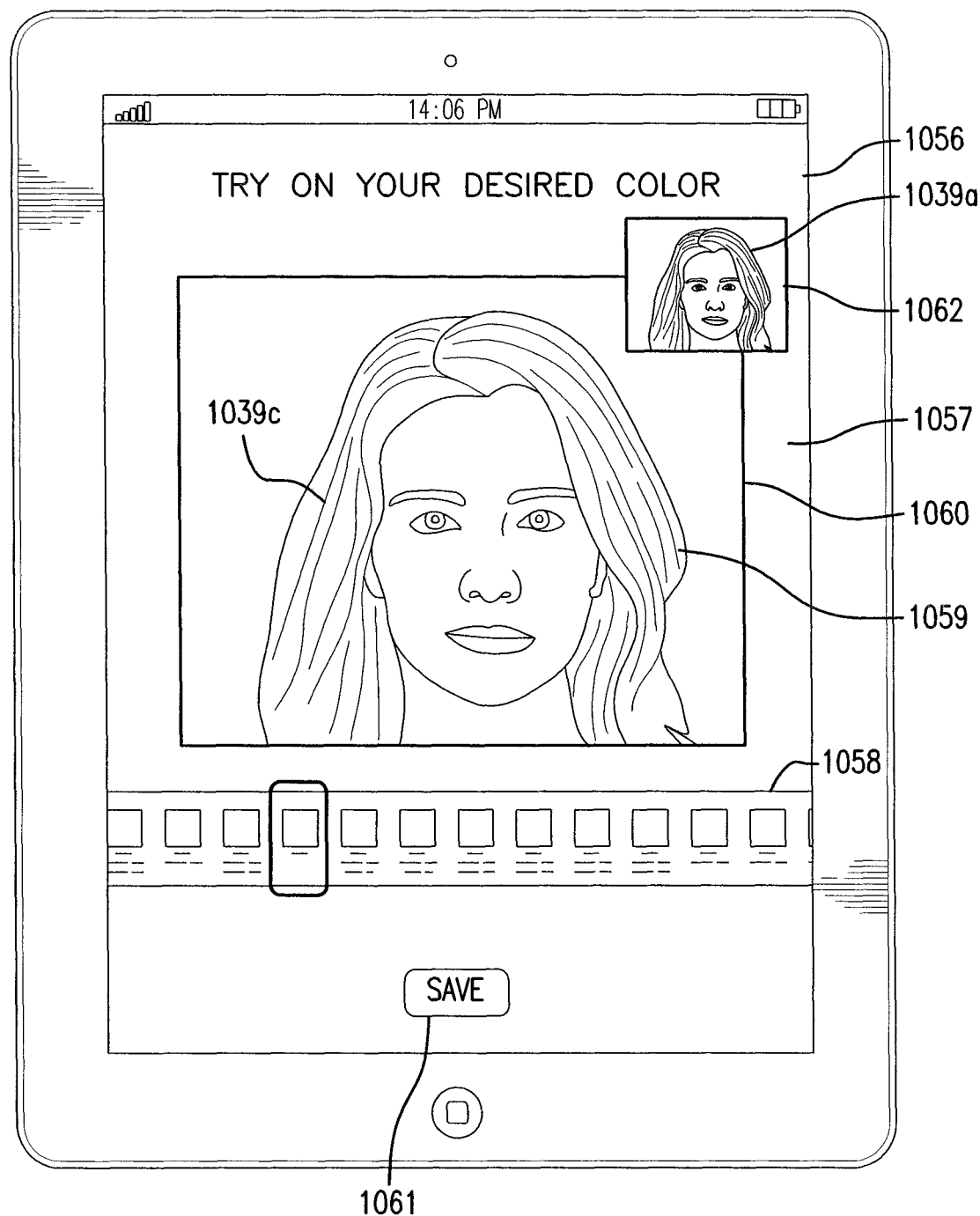
FIG. 17 is an exemplary embodiment of a screen display for the application or app, depicting a color selection screen.

According to a preferred embodiment, once any prior color adjustment has been made, and the levels (natural level value and actual level value) are selected and stored, the color selection may be made and applied to display color selections to the hair image to provide a display of an altered color hair image (see e.g., FIG. 17 and the color selection screen 1057). The user, such as, for example, the salon stylist, may manipulate the individual's hair image on the display screen by using a control on the screen display, such as a dial, to select or dial the desired enhancing or correcting tones to establish a desired visual end result (which may for example be to overlay color filters on the hair in order to balance and adjust visible undertones at a desired level, which may be done based on selections and manipulations on the screen display and through corresponding instructions provided in the software in connection with the processing of the inputs and selections). For example, if the stylist sees orange undertones and wants red, then the selections may be made to manipulate the hair image on the display screen to add red tones. Preferably, the application software is programmed with instructions to compare the levels assigned to the hair of a person, and compare the selection made as the desired or target hair color, and provide a formula solution that corresponds with the desired target. The software preferably is programmed with instructions to assign an expected undertone to a hair level based on the input information, such as the tonal levels for that person. The formula therefore, preferably produces the resultant selected image made on the display (e.g., at the color selection screen 1057). The dispensing device 210 may be instructed to dispense a corresponding formula, as needed or desired.

Figure 16:
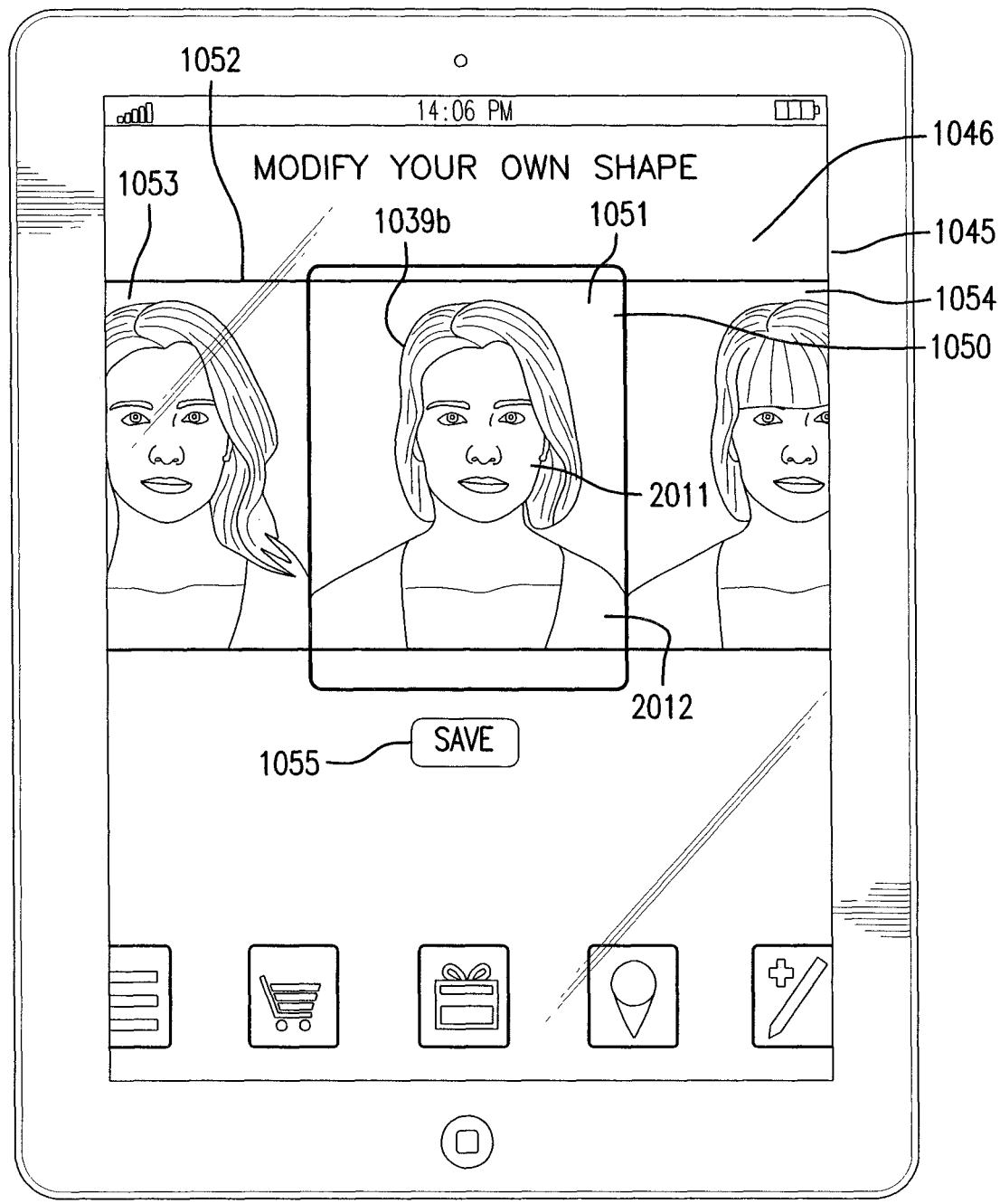
FIG. 16 is an exemplary embodiment of a screen display for the application or app, depicting a shape modification screen with a shape modification option.

The individual or client user as well as the salon technician may use the app to manipulate the hair 1039 displayed in the image 1039a, and preferably the manipulation is done with the user face 2011 and body portion 2012 present as part of the displayed representation, the hair image 1039a also being a part of the displayed representation. One example of a preferred manipulation involves applying a particular color to the hair. Referring to FIG. 16, there is illustrated an exemplary embodiment of a screen display 1045 depicting a shape modification screen 1046. Options for hair shape are presented to the user, and a selection menu 1052 is provided for providing alternative options for selection and application to depict the shape on the user, including on the user to show the user's face 2011 and body 2012 with the hair depicted as the selected hair shape option. The app preferably displays options based on the user image and the green screen segregation of the hair, as discussed herein, to produce on the display 1045 a manipulatable image or image portion of the user's hair 1039a (see e.g., FIG. 15). The shape modification screen 1046 shows a first selection option 1050 and associated shape image 1039b that appears in the center of the selection options menu 1052. Although three shape selection option images 1051,1053,1054 are shown on the shape modification screen 1046, there may be additional shapes that the user may select. These additional shapes may be presented to the user through a menu or scrolling option, such as, for example, scrolling right or left of the center shape image 1051 of the selection options menu 1052. The center shape image 1051 is shown as the first selection option 1050 which preferably is bordered by a selection box, and a save option is included for saving the selected image, which in the embodiment is depicted as the save button 1055. The selected shape may be saved, and the user may proceed to make further manipulations to the user hair image 1039b. For example, the user may apply a color change to the selection option image 1051 for which a shape has been selected.

As shown in FIG. 17, a screen display 1056 is illustrated depicting a color selection screen 1057. A color selection menu 1058 is provided and displays potential hair color selection options for the user, which preferably include a plurality of colors, which according to some embodiments may be depicted as a color wheel representing hair of a representative color. The user may make selections of the color options and may apply these options to the image 1059 in the main image window 1060. The user's hair image 1039c may be changed on the color selection screen 1057 as the user elects to apply a color option from the menu 1058. (Although the user's hair image 1039c is shown with the hair from the selection option image 1053 (FIG. 16), the selection of a selection option image 1051 and hair image 1039b, may be represented on the color selection screen 1057 when applying color manipulations, where the selection option image 1051 was selected prior to making selections on the color selection screen 1057.) The user may scroll through and make changes to the color of the hair image 1039c. A secondary image window 1062 is shown to depict the user's previous or current color, such as a hair image 1039a,1039b (with a cut applied, for example if the selection option image 1051 was made), to serve as a reference to the change being depicted in the main image window 1060. A user may designate a hair color selection and save that selection, using the save button 1061. According to an alternate embodiment, the user may select a plurality of options being considered, and save the options (e.g., such as, for example, three colors). The user may therefore manipulate the hair image 1039c so that the hair displayed represents the shape selected (as depicted in the image 1039b of FIG. 16) as well as the color desired selected at the color selection screen 1057.

Figure 18:
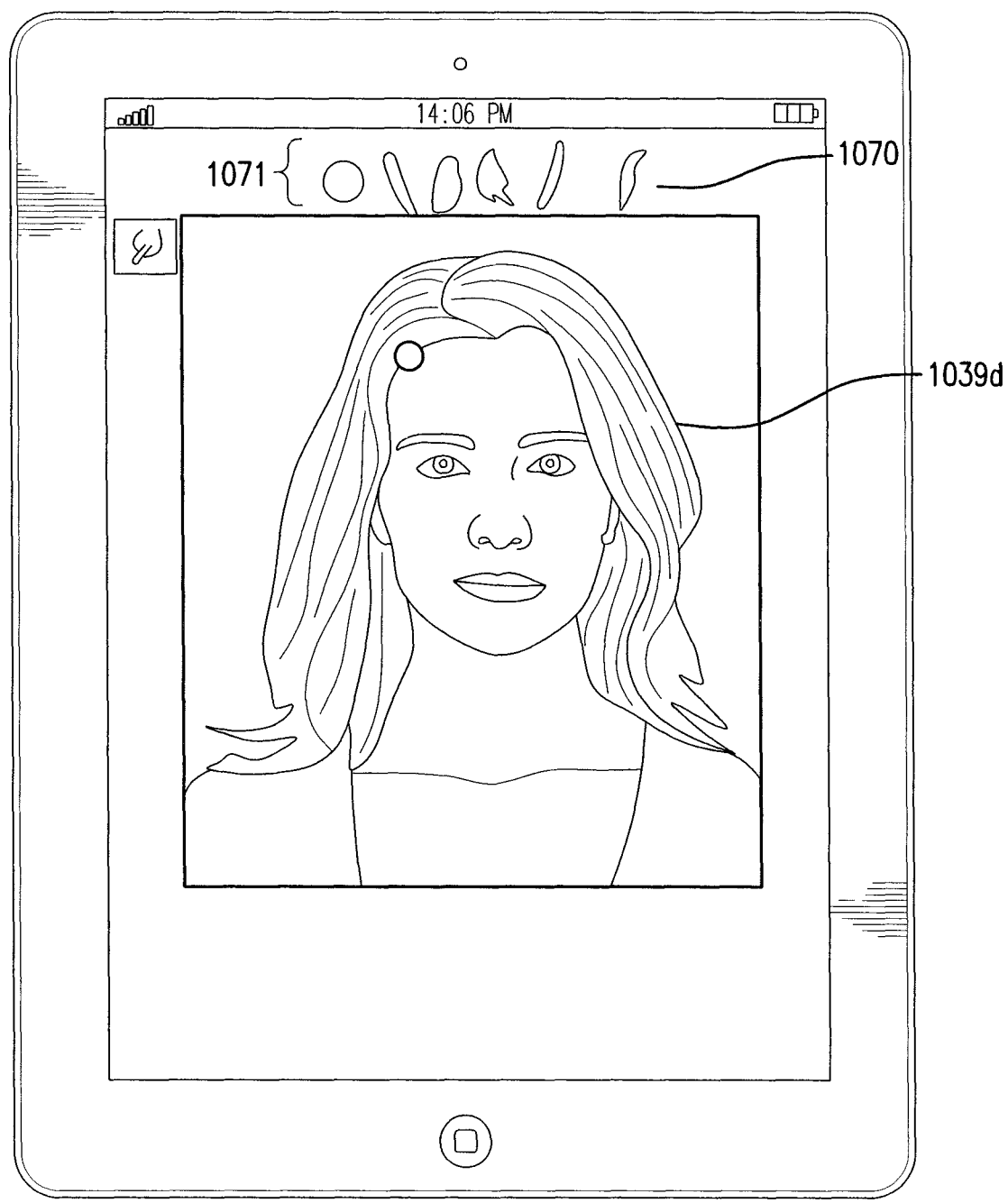
FIG. 18 is an exemplary embodiment of a screen display for the application or app, depicting tools for applying a representation of a cut process to the hair of the person depicted.
Figure 19:
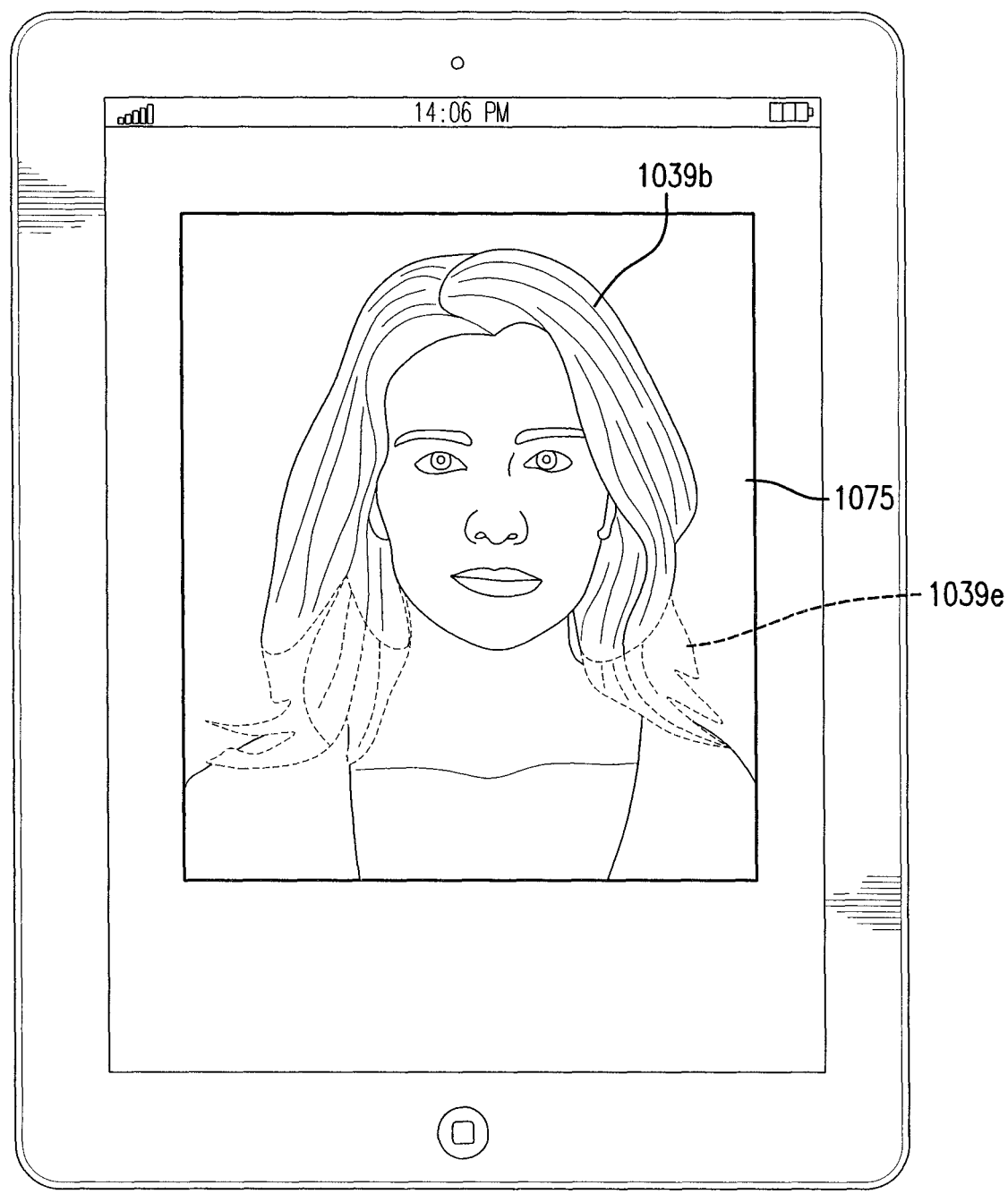
FIG. 19 is an exemplary embodiment of a screen display for the application or app, depicting an example of a representation of a cut process applied to the hair of the person depicted.

A cut option may be provided to the user, or may be provided only for the salon app (for the professional to use). The cut options provide a representation of the cut process and allows for dynamic manipulation of the user's hair through single cutting strokes to be made to the hair representation. The cut process may be simulated and displayed to depict the actual cut. At points along the cut process, the salon technician may receive user feedback, for example, where the user is viewing the image while the technician is carrying out the cutting process on the image on the display. The application provides for the ability to undo a change made to the hair, so that the cutting may be redone from any point previously. The application provides for the touch screen of a touch screen display to be manipulated by the salon technician by tracing a finger or stylus over the area of the touch screen showing the user's hair image that a modification is to be made. The cutting preferably corresponds to the area traced over, and the tracing applies cutting to that area. The cutting may be applied as a light cut, by a single tracing, and additional cutting may be shown corresponding with additional tracings of the area. Referring to FIG. 18, a cut selection tool menu 1070 is illustrated depicting a plurality of tools 1071 for applying a representation of a cut process to the hair 1039d of the person depicted in the image. The tools 1071 are provided for manipulation of the hair image, such as, for example, any of those images 1039a, 1039b,1039c (to which a prior manipulation has been made) to apply a cut to the image displayed as the user's hair 1039d. The cut is shown in FIG. 19 as depicting the hair image portion 1039e of the existing haircut or shape 1039a that has been removed (e.g., by cutting or applying a cutting tool) in an alternate rendition, shown in a ghost-like representation on the screen 1075. The cut is applied to the hair image 1039a to provide a new shape or cut 1039b to the hair. The image of the person is shown with the manipulated hair image 1039b in solid form, and preferably with a color option applied thereto. The tools 1071 may be implemented to modify the image 1039d (FIG. 18) from the original hair image 1039a to the resultant haircut image 1039b, and preferably, the hair image 1039d is dynamically correspondent with the application of the cutting tool, so that the image on the display screen 1075 is presented in a form adjusted for each application of a tool. The user and stylist may view the process being applied to cut the hair as the hair is being manipulated to simulate a cut, so that at any point, the user or stylist may make changes or revert back. According to a preferred embodiment, the screen 1075 displays a representation of hair treatment to the image on the screen 1075, including stages of a haircut to be done by manipulating the hair image presented on the screen. The haircut is represented on the individual 2010 depicted (showing the individual's face 2011 and body 2012) and which allows the cut to be displayed by simulating the cut as if the stylist was using a tool, such as scissors on the person's actual hair. The manipulation allows for viewing of the depiction of a representative cut or styling to be shown, where the operator, such as the stylist, may manipulate the user's depicted hair to remove as much or as little hair as desired, and in locations desired, and to have the image depicted on the display 1075 represent the progression of a style or haircut being carried out on the person's hair depicted on the display 1075, so that the depiction is carried out prior to the actual manipulation (e.g., cutting) of the persons' physical hair. Alternatively, the manipulation depiction on the display 1075 may be carried out at the salon as instruction and guidance during the process while actual cuts are being made (e.g., while the user is receiving a haircut) to the user or individual's actual physical hair (e.g., at the salon) so as to depict on the screen a potential next step or stage in the cutting process.

According to a preferred embodiment, the image of the person is taken using a recording device, such as, for example, a camera (e.g., a stand-alone camera, phone camera, or camera on a tablet). The image preferably includes the person's hair and face, and may also include part of the upper body, e.g., shoulders, or part necessary to depict the hair in the image (e.g., such as those with longer hair). The image preferably is stored on a storage media, such as a hard drive, flash memory or removable disk media. The image, if not taken on the tablet, phone or computing device that is running the application software, is uploaded so that it is available to the application or app software. This may involve uploading to the network salon server (e.g., the cloud server 701, FIG. 8, and/or cc server 806, FIG. 9), a salon local computing device, or other computing device.

Preferably, the photograph is stored in association with, and as part of, a user profile. After the image is captured and is available to the application, the imaged is processed by transforming the image. The transformation of the image involves separating the hair from the face (and body portion if the body portion also is part of the image). Next, the hair image is processed by evaluating the hair image in view of a grayscale to determine a grayscale level for the hair image, and assigning a grayscale level to the hair image. Assigning a grayscale level may be done manually by salon personnel using the application, or with software of the application configured to process the image and based on a grayscale comparison, assign to the image a preferred grayscale level. Once the desired grayscale level is determined and assigned to that hair image, the image is assigned a tone. The tone assigned may be from a tone level, and may be done manually by the salon personnel, or alternatively, may be done by the application software, which includes instructions for processing the image for tone assignment, by comparing the image properties to a tone level scale and assigning a tone level to the image. Subsequent to the initial establishment of the gray scale values, subsequent refinements or alterations to the grayscale value may be made to lighten and or darken the hair, even where one or more manipulations have taken place. With the image being assigned both a grayscale level and a tone level, the brush brushstroke tool is used to manipulate the hair to create the desired dimension. One exemplary depiction of the usage of the brushstroke tool is shown in FIG. 18, applying it to the hair 1039*d* of the user, wherein, FIG. 19 shows the resultant hair image 1039*b*, with the simulated cut hair depicted on the screen 1075 as the lightened or ghosted hair image 1039*e*. The hair image 1039*d* depicted in FIG. 18 is transformed so that the hair image 1039*b* in FIG. 19 is shown with the simulated transformation made to the hair 1039*d* on the screen using the tools 1071 (here the brushstroke tool), with the manipulation shown as the transformed hair image 1039*b* and cut away or tool manipulated portion of the hair illustrated as the hair image 1039*e* (a separately identifiable ghosted image). For example, once the tool is applied to the hair image 1039*d* shown in FIG. 18, then the desired dimension is processed and then separated out from the hair image 1039*d* based on the manipulations made by the user using the tools 1071. The processor processes the input. The input preferably is made using a computing device, such as, for example, a tablet with a touch screen, on which the user may trace with the user's finger or stylus or other input tool, to generate manipulations to the hair 1039*d* displayed on the screen (FIG. 18), and have those manipulation processed by the processor, which, in addition to applying the manipulation, based on the manipulation tool selected from the tool menu 1070, and based on the use of that tool on the image, separates those manipulated portions out, and displays them as the transformed portion of the image, as shown in the exemplary depiction of the hair image 1039*e* of FIG. 19. This process may be repeated for multiple tonal and dimensional effects, and may be applied in any order desired by the user, so for example, a user is able to switch between the manipulation tools for cutting and styling the hair, and the color level application and tone applications. According to a preferred embodiment, the image manipulations for the transformation of the color and tone levels, may be stored, and a specific formula may be selected or generated by the application, or other software configured to receive the application inputs, so that the dispensing machine 210 receives information to dispense a formula that when applied on that user's hair will produce the desired effect. For example, the color and tone level may be reproduced on the user's hair to resemble the displayed manipulations corresponding to those selections. The user may require separate applications to produce the hair image having the desired color and effects. Preferably, the application software is configured with instructions to handle each effect separately, and to store one or more manipulations to the hair, for example, where those manipulations correspond to a formula that is to be applied to achieve the resultant effect. For example, each separation preferably is interpreted to correspond with a specific formula and sent to the machine to be dispensed. For example, a transformed hair image may have a first separation or associated formula that provides a base color for the hair, a second separation that provides a second formula for the hair, which is a highlight, and a third separation that has associated with it a third formula for the hair, which is a lowlight. Each of the separation or separate formulas may be stored in the client profile and be dispensed from the dispensing machine. The dispensing of the separation formulations also are recorded, thereby presenting the potential where multiple separation formula are utilized but not accounted for. The system also may link dispensings from the dispensing apparatus 210 with the client profile, so that at the salon where treatments have been dispensed and applied, there is a record of the dispensings which may be stored and collected for usage in billing at the salon location. The dispensings and user profile information may be used to generate an invoice for the customer at the salon location, based on the manipulations applied (e.g., a cut), and the products dispensed.

The system, method and device also provide for matching or coloring one part of the user's hair separate from other parts. For example, a user may use one's finger or other implement to work the display and address the area of the hair appearing on the display image that the user desires to work on, such as, by coloring it, duplicating a color on the screen, and altering the color palettes and grayscale to match another portion of the hair image or another image. One example is treatment of hair regrowth. The application may be used to identify the regrowth area of the hair and generate or derive one formula for the regrowth area another for the midshaft and ends, or alternately separate formulas each for the regrowth area, midshaft and ends. Another example is where the regrowth area is desired to match to the existing hair areas of the midshaft and ends. The system, method and apparatus or device 210 may be utilized to provide a matching formulation. This may be done as described herein by imaging the person and applying the manipulations to the hair. The hair image of the person would show the regrowth area color (e.g., gray) and the midshaft and ends (e.g., brown). However, the color manipulation that is done by utilizing the transformations and selections depicted on the screen displays is applied to the regrowth area of the hair appearing in the hair image, and the midshaft and ends image may be left unchanged. In this manner, the color of the regrowth area may be manipulated on the screen so that the regrowth area of the image matches the midshaft and/or ends image color appearing on the display. The formula therefore may be generated to provide the resultant effect, which in this example, is to color the gray hair regrowth portion of the hair to match the surrounding hair. The user of the application may make these transformations on the screen and the software may process the manipulations and associate the selections (e.g., the color and/or effects selections) to provide a formulation to the dispensing machine 210 to produce the product (e.g., colorant) that, when applied to the regrowth area of the individual's hair will produce a hair color that matches the surrounding hair (e.g., midshaft and/or ends). This is an example, but the color selection and manipulation tools provide for coloring one or more separate portions of the hair apart from other portions, so multiple formulations may be generated to achieve multiple effects. The image therefore provides for transformation and saving of the image where portions have been manipulated differently than other portions. For example, there may be a cut manipulation, a first color manipulation, a highlight manipulation, and so forth. The application provides for a user and salon personnel to preview the hair image transformation with the selections being applied. Before any manipulation of the hair color begins, the user may adjust the image to an exact color match of the actual color of the client. This will balance light variations from location to location. Therefore, each image will be an exact representation of what is actually there unaltered by existing light conditions.

Figure 20:
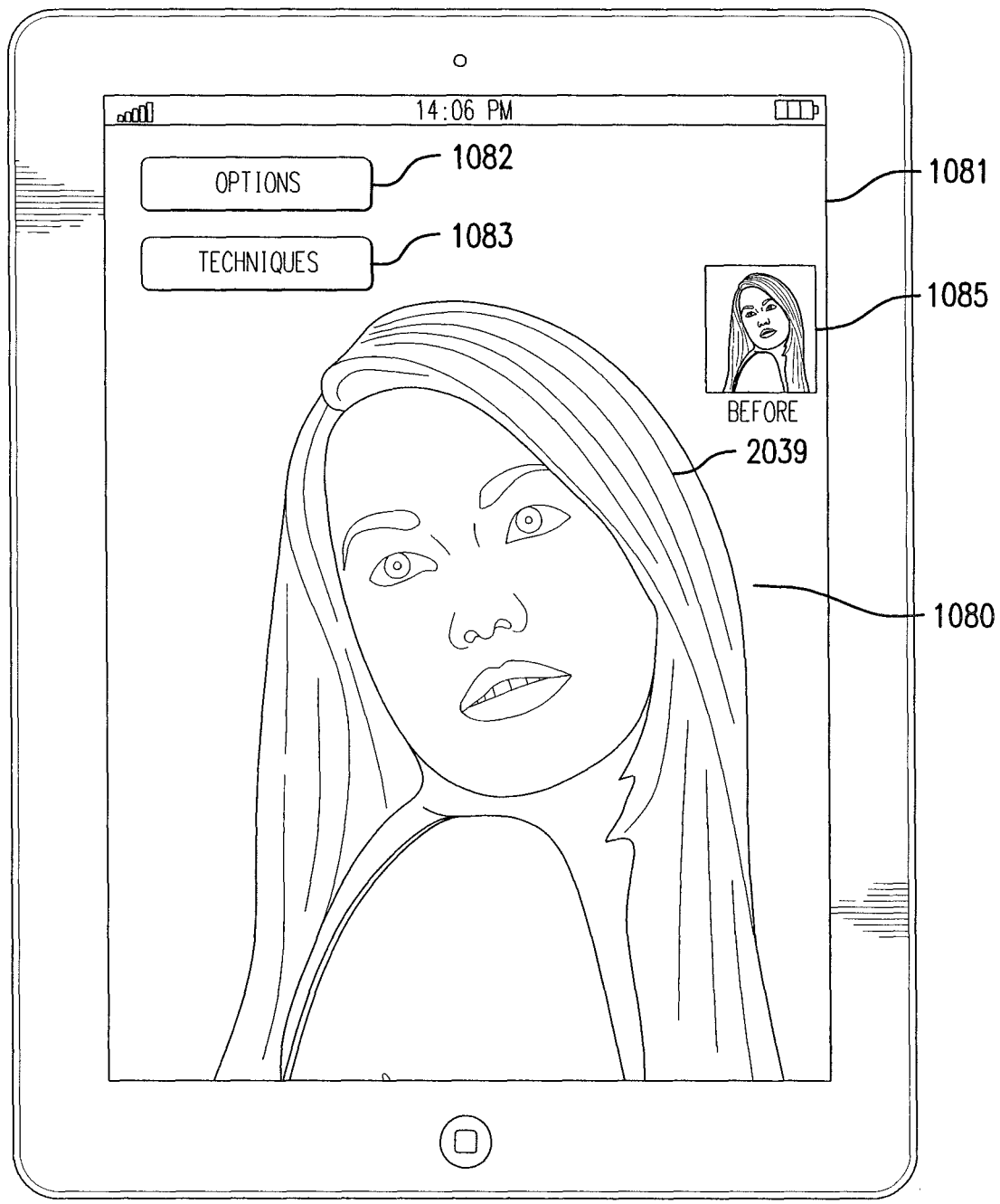
FIG. 20 is an exemplary embodiment of a screen display for the application or app, depicting an example of a representation of options and techniques for application to the hair of a person depicted in the screen.
Figure 21:
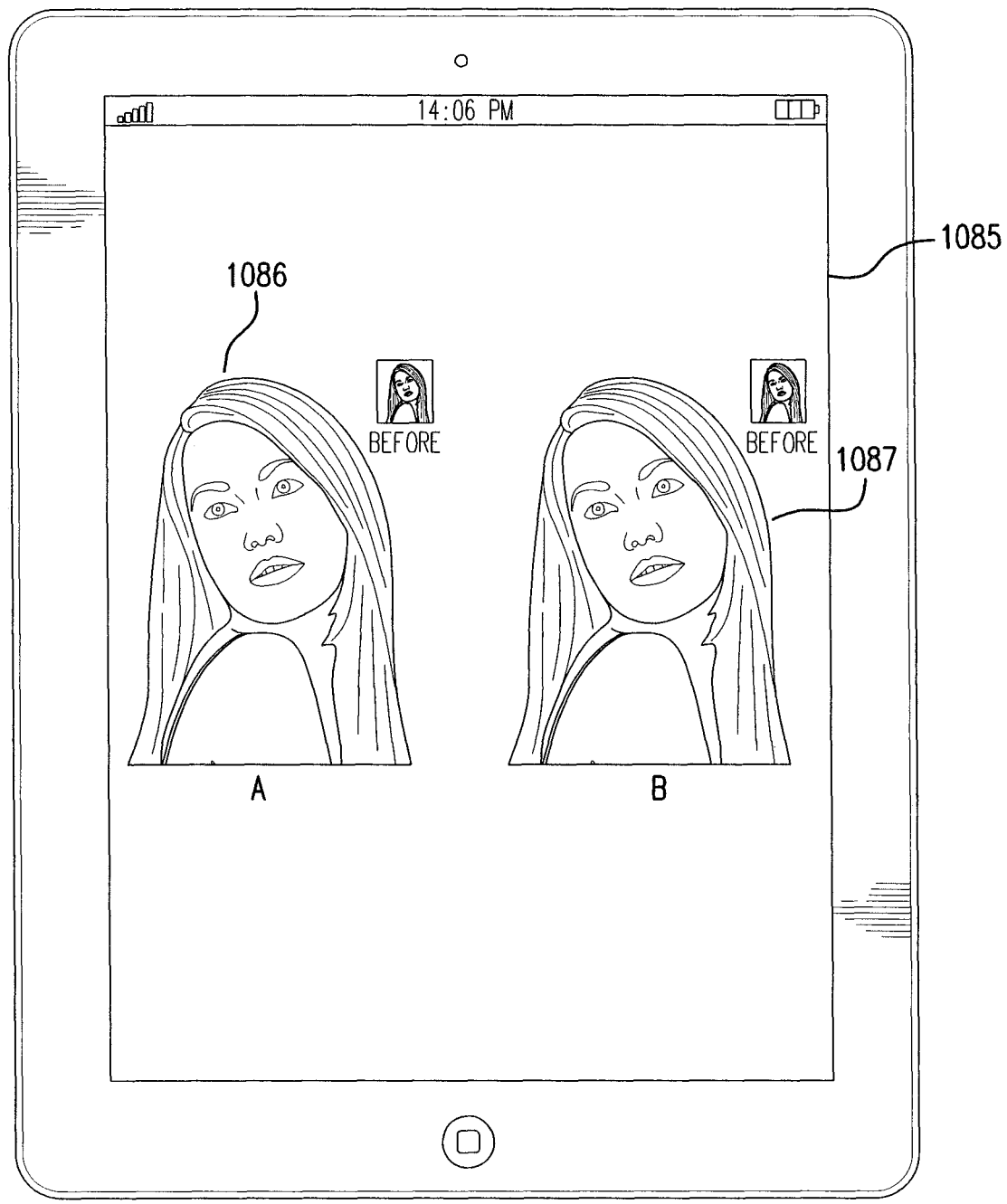
FIG. 21 is an exemplary embodiment of a screen display for the application or app, depicting an example of a representation of applied options and effects to the depiction of the client's hair, and providing selection options from which to select.
Figure 22:
FIG. 22 is an exemplary embodiment of a screen display for the application or app, depicting an example of a representation of a transfer or upload screen to upload the selection to the salon network or server.

In addition, for the shape, similar to the coloring process described herein, the hair image is separated from the face portion of the image, and is manipulated through multiplication or subtraction of the actual image. The user or stylist may make changes to arrive at a manipulated hair depiction, and may save the changes. For example, the user or salon personnel may select between options and save multiple options to have them display on a screen for comparison. FIG. 20 shows an alternate image of a user upload photograph 1080 depicted on a display screen 1081, with an options menu 1082 and techniques menu 1083. According to one embodiment, the options open a selection menu from which manipulations may be applied to the hair image 2039 depicted. A techniques menu 1083 may be selected to provide a menu of techniques that may be applied to the hair image 2039 of the user to depict a technique that may be applied to alter the appearance of the hair. A secondary image window 1085 is shown to depict another image of the user which may provide a reference and which may include an alternate treatment, style, color or other option, for comparison with the alternate image user upload photograph 1080. According to an alternate embodiment, the user upload image or photograph 1080 may be manipulated as discussed herein in connection with the image 2010, however, there may be limitations when using that photograph. FIG. 21 shows a first image window 1086 corresponding to image "A" and second image window 1087 corresponding to image "B". A different treatment option is applied to each image so a comparison may be presented for preview and further selection. The image with the applications desired to manipulate the hair to a desired changed representation preferably is uploaded to the server, such as, for example, the cc server 806 (FIG. 9) or other server, as represented in FIG. 22, so that the data may be saved, and the salon and user may have access to the desired selections. The user may receive services at a salon. Preferably, the user selections, whether by the client or individual user or a salon stylist user, may be evaluated with the cc system, which preferably includes a control system to provide a formulation that may be used to produce the desired treatment or effect selected. The formulation may be a product that is dispensed by the dispensing apparatus 210.

According to preferred embodiments, the consumer or stylist using an application may derive and select a customized formulation. For example, referring to FIG. 21, the selection image screen 1085 may display Option A showing one image of a color of the person's hair, and Option B showing another image of the person's hair. The user may desire something between the two shades displayed on each of the respective images. In this example, the software is configured with the formulas corresponding with the formulations that correspond with the result on the person for images A and B. The person may make a color selection that is between A and B. Preferably, the software is configured to provide the option for a middle shade, and have that image appear on the screen (as augmented or changed A or B, or as a new image C). The desired result and expected outcome may be accomplished through the customization of the software to dispense components that provide the in between shading. This option also is provided for the stylist, so that the stylist may manipulate and make selections of colors on the display screen and receive and view actual image depictions of the effects of the change on the image of the hair being styled. For example, the options provided for the stylist may include the ability to mix and select colors, levels and shades, as well as experiment by applying alternate developer selections to determine the resultant effect likely on the hair of the individual. The software of the application program is configured with instructions to generate a display of the user's hair image (the hair that is being manipulated) to show the manipulation effect of the addition of the colors, amount of developers and other choices or selections. For example, the software may be configured to dispense a portion of the component or, for example, such as ¼ oz. less than the formula. This may be done according to predetermined instructions provided for the software for colorants, developers, and other components. The changes to the existing formulas that the software has stored may be implemented by the designation of a change amount, so that when the processor receives an instruction for a selection, and the software determines that the selection is not a formula from its known established formulas, then the software ascertains the closest formula and makes a corresponding alteration of a component of the known established formula (which may be an addition or subtraction of component, or alteration of the component amount). An altering instruction may be provided so that software has an instruction corresponding with the selection. The altering instruction may implement a change to a closest known formula, and thereby provide and save a new formula. The new formula may be dispensed from the dispensing apparatus 210 based on instructions to operate the pumps to deliver the new formula that is a customized formula (e.g., between two corresponding formula image options). The control mechanism of the device 210 allows the stylist or salon personnel to create numerous custom color formulations, based on generations that the stylist may customize using the stylist application on a computing device, such as a tablet.

According to a preferred embodiment, the client may be presented with selection options that include a dial, slide or level control that corresponds with the hair image 1039*a* on the screen display. In this manner, a range of colors, shades, intensity and/or tonal levels may be selected, displayed and viewed. Where a selection is made, the beauty product called for to produce the desired or target result on the person's hair may implement dosing of beauty component products from the dispensing machine based on the selections made. For example, where the person has selected a color between two shades, by adjusting the slide or dial levels, the information is processed and the dispensing machine is instructed to deliver amounts of component products that includes the two shades between which the person has made a selection in amounts to produce a mid level, that is a level that is between the levels of each of those shades. The formulation preferably is saved to the client's profile, which provides the ability for the client to receive custom formulated product, whether at the salon or even for home use. Another example is where a custom shampoo with a scalp treatment is provided. The shampoo may be formulated at the salon for the client. The levels of components used for the shampoo in this example are personal for that client, and while other clients could use that formulation, the potential for tens to hundreds of different formulations may be accommodated. The shampoo formulation in this example also is saved to the client profile, and, the client therefore has the ability to order replacement shipments of the customized product from the salon network operator, through the retail purchasing system, which is associated to utilize the client profile and provide the desired product.

The application software preferably includes instructions to receive a first input that identifies the condition of a person's existing hair. This first input may include one or more of user profile input information and an image of the user that preferably is electronically stored. The software also includes instructions to receive a second input of a target color, which preferably is done by generating on a display screen a selection of color options from which to choose a desired target color for transformation of the existing hair. The software also includes an instruction to recognize and receive a selection of a target color that a user makes from the selection of color options. The information preferably is processed as the first input and the second input. The system preferably processes the first and second inputs and generates a formula for a beauty product that is designed to produce the target color when applied to the person's existing hair. The production of the beauty product is carried out through the control mechanism which operates the respective pumps to deliver from the respective containers a dosage of one or more of the respective beauty product components in accordance with the formula. The components are delivered to the dispenser output.

The salon app or application also may include an education system component. According to a preferred embodiment, the app may guide the salon personnel, such as, a technician, stylist or the like, through the necessary steps and techniques to produce the desired result from the client's starting hair condition. For example, where the client or salon personnel has selected a cut or style for the client hair, the app provides a display that may depict step by step implementations of the use of tools at locations of the hair, and how to use them, and provide a sequential series of instructions to arrive at the desired end result. The salon may implement the salon app as a teaching system to instruct salon personnel in aspects of applying a hair treatment or other manipulation, including application of a color, streak, effect, cut or style. The app also may implement the instructional system, so that if a customer profile is saved, it includes information that may relate to a teaching database, so if the customer is traveling, the customer may seek services of a different one of the network salons that use the system, and is able to receive the desired effect, which may be directed to salon personnel through the teaching system instructions.

Figure 23:
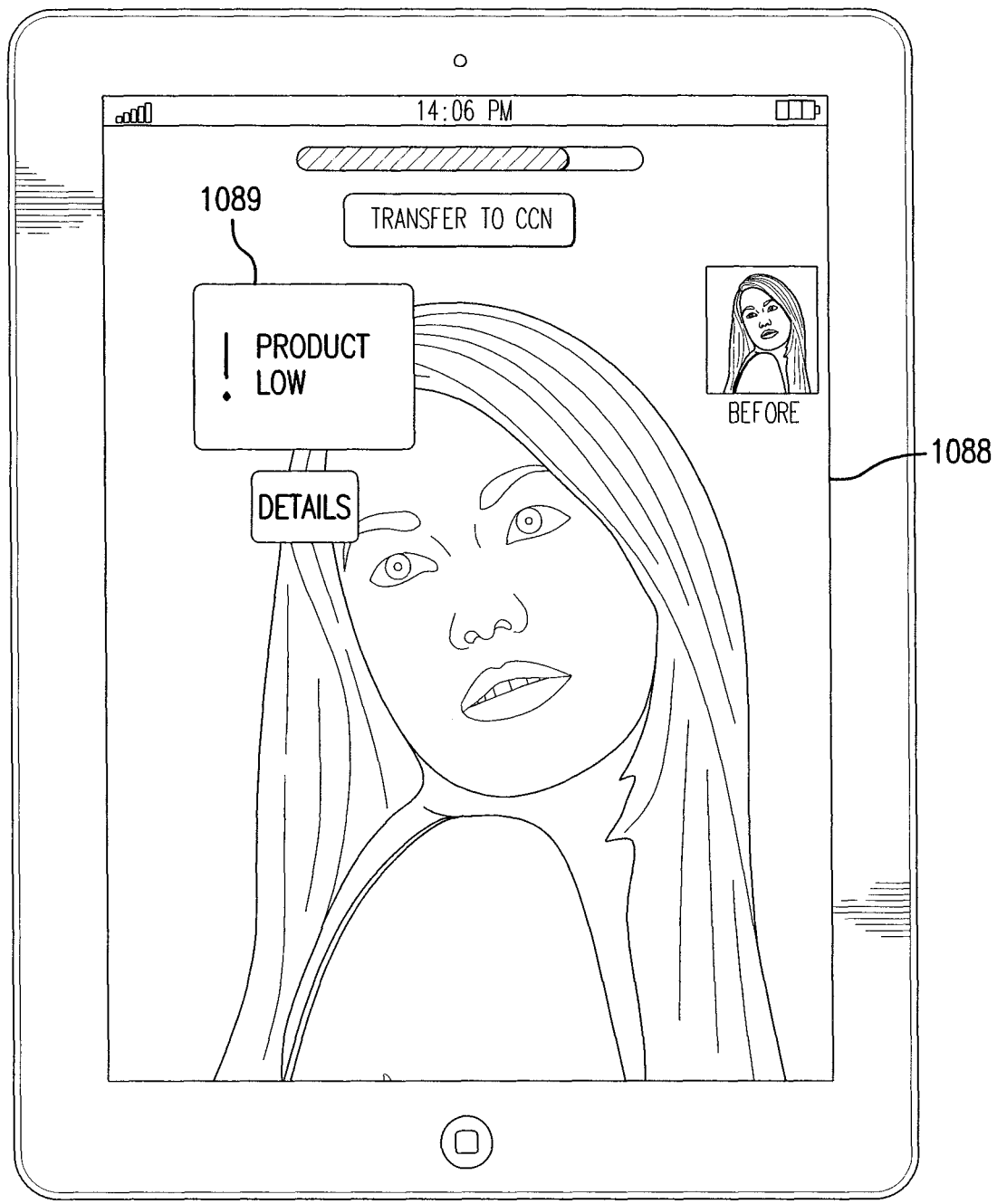
FIG. 23 is an exemplary embodiment of a screen display for the application or app, depicting an example of a representation of an alert, which is illustrated as a low product indication alert.
Figure 24:
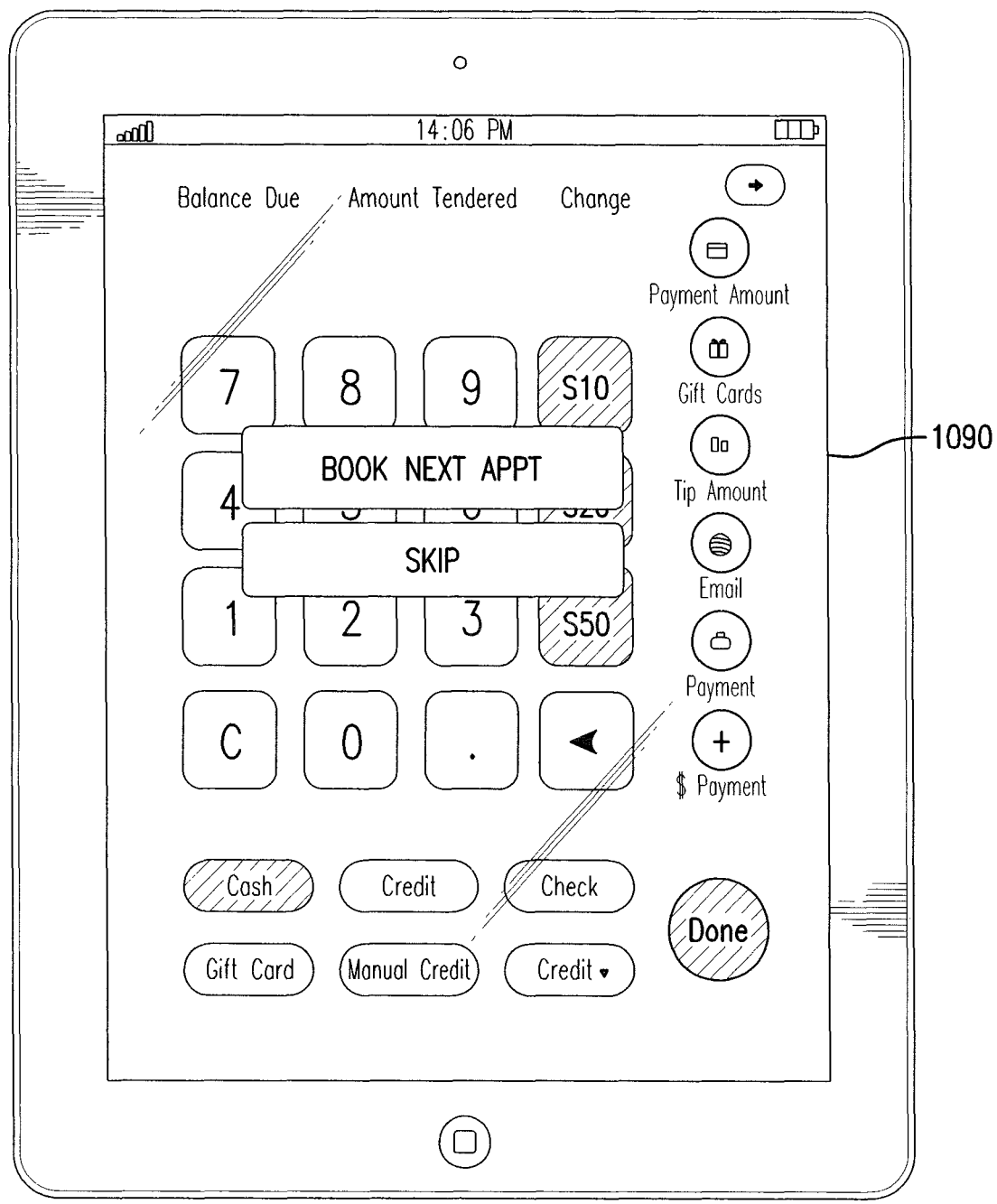
FIG. 24 is an exemplary embodiment of a screen display for the application or app, depicting an example of a representation of a purchase screen showing options to book an appointment (at a salon).
Figure 25:
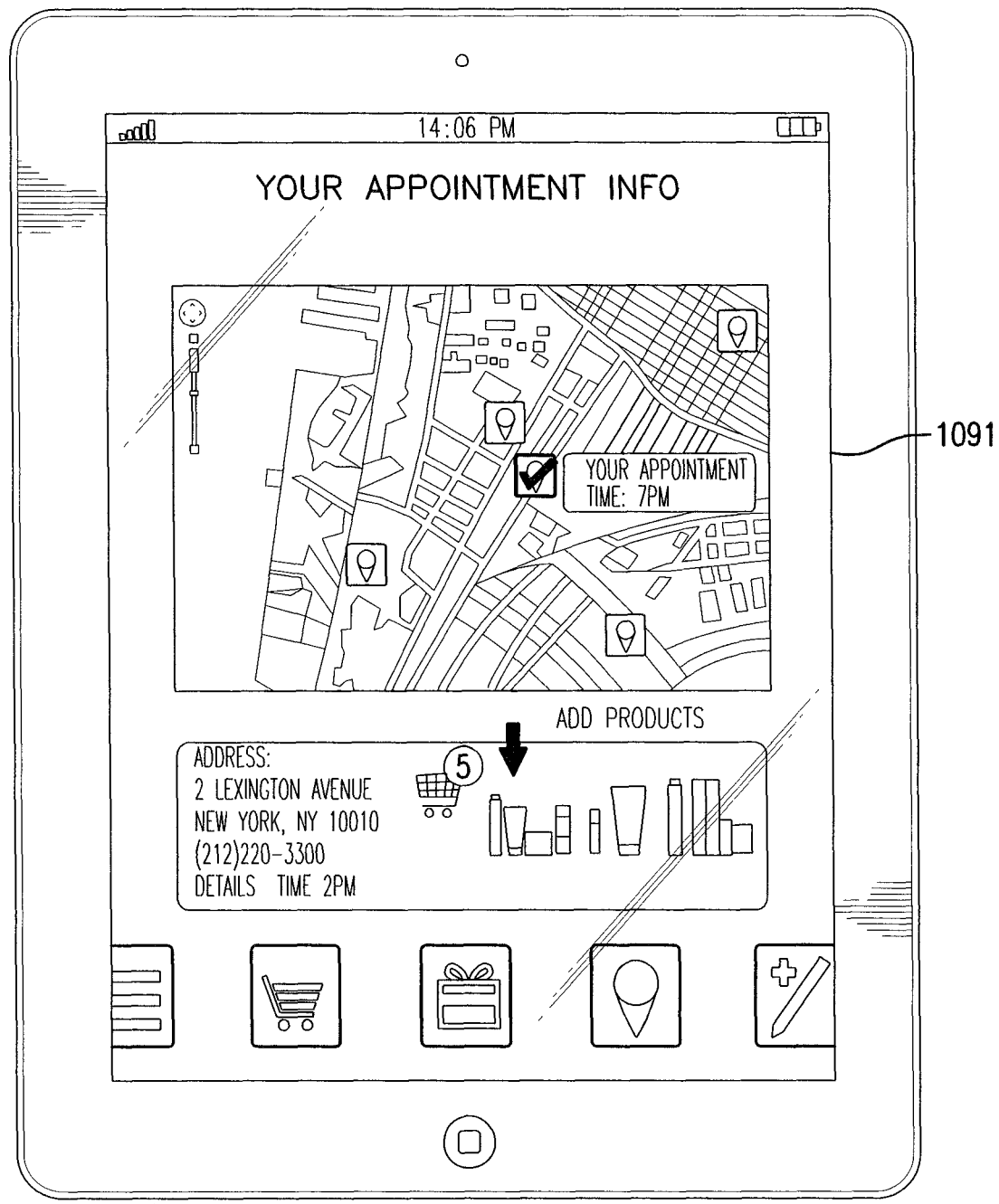
FIG. 25 is an exemplary embodiment of a screen display for the application or app, depicting an example of a representation of an appointment booking screen.

FIG. 23 depicts a screen display 1088 for the application or app, and shows an example of a representation of an alert 1089, which is illustrated as a low product indication alert. FIG. 24 depicts a screen display 1090 for the application or app, depicting an example of a representation of a purchase screen showing options to book an appointment (at a salon). FIG. 25 depicts a screen display for the application or app, depicting an example of a representation of an appointment booking screen 1091. The appointment booking screen 1091 also shows preferred locations for salons of the network salon operator, or those salons that use the app and are able to provide services and products associated with the app features and products, which preferably include product dispensing requirements, such as dispensing a product from the dispensing apparatus 210.

The salon app preferably may take the information obtained for the user through the consultation performed using the salon app, and save the information to a server or other data storage component. Preferably, the information is transferred or otherwise communicated to the salon's dispensing machine, such as, for example, the dispensing apparatus 210. Customized products are provided for the consumer, and preferably are produced using the dispensing apparatus 210. Customized product selections, for example, may include custom formulated pigment refreshing shampoos and conditioners, prescriptive scalp therapy additives and styling aids. Although the products may be formulated at the salon, and applied by the technician, the app also saves the product information and selections so the customer/user may continue to make purchases of and use the specially formulated customized products even after the user leaves the salon. According to one preferred embodiment, the customer is offered the opportunity to purchase the custom formulated products, such as, custom hair coloring products, shampoos, conditioners and hair, skin and/or scalp treatments. As discussed herein, the consumer app preferably includes a listing of the products (e.g., such as custom formulations recommended by the app, or used at the salon) that may be made available for purchase by the consumer. The warehouse distribution system, as discussed herein, preferably includes a server that receives or to which the consumer information is communicated. The consumer selections preferably may be processed at a warehouse location or a distribution location, which may, for example, be a location at which the custom formulation is prepared and dispensed into a suitable container for shipment to the consumer.

The monitoring and/or sensing mechanisms described herein may be used to monitor usage by the consumer of the products and generate reorders and/or reminders to reorder the products. According to one preferred embodiment, the frequency of use of a product that the consumer has ordered may be designated so that the consumer may receive automatic shipments corresponding with the time expected for the prior product to be consumed or almost consumed. The user alternately may designate a frequency for order and shipment, e.g., such as monthly. The system also may be configured to provide reminders to users, for example, where a user has not designated a selection to automatically receive product shipments/reorders.

According to alternate embodiments, the monitoring and sensing mechanisms may include RFID tags that include information or encoded information that may be decoded (e.g., such as a bar code or number series). Information provided by the RFID tag may include the type of product, date purchased, expiration date (where applicable) and other information. The RFID tag also may be provided at a location on or in the container to provide an indication of usage level or threshold level of product. One preferred embodiment provides an RFID tag that senses a low level of product. The RFID tag may be interrogated to determine the presence of inventory at a location where the RFID tag may be read, and preferably, where the reader or interrogator may relay the information through a communication link or network to a server for processing. A reader may be installed at the location where the inventory is kept, such as, on the salon premises. The reader may be configured to operate through a Wi-Fi or other communication signal, through signal generating and receiving components (e.g., in connection with a transponder or decoder). The components preferably are placed throughout the location of the salon so as to sense the presence of inventory of beauty product components (such as, for example, components that are used by the dispensing apparatus 210). A reorder or reminder generator may be configured to correlate with the salon detected inventory, and provide suitable reminders or automatic reordering of product as needed. The reorders preferably are generated by the server and automatic reorders may be produced at the dispensing location, such as the dispensing distribution location, and shipped to the salon.

The shipping from the dispensing location also may ship product to the consumer. According to a preferred embodiment, the consumer's usage of product and reorders may be tracked and reminders issued based on historic usage. The consumer app preferably may be configured to receive information about reorders or low product quantity, including for example information delivered to the server, and the consumer app may provide a message or alert that the consumer is running low on the particular product item.

The application is further configured to show information to the salon, including for example, personnel, such as owner and/or technician. The salon app may include point of sale checkout services, which take into account the custom formulations and treatments applied (e.g., styling, cuts and coloring) and generate invoicing based on products used and services provided. The salon app may further facilitate consumer interaction by allowing the consumer to opt for current or future purchases of products, pre-book subsequent appointments, pre-reorder products, which also may be linked to or synchronized with the consumer app to indicate to the consumer what products have been purchased and when it will be delivered, or the schedule for replenishment.

The salon app further is configured to collect, store and manipulate data for consumers of that salon, as well as collect and store data that may be processed to provide salon-wide data for customers of the salon using the system. The analytics preferably are provided as a feature of the app. The app preferably may be linked with a server that collects, stores and processes the information for each customer. The salon therefore may track within its own salon, or across a number of salons, information such as, which products are selling the most, what services are being demanded (low or high), which products are being used the most and the least, as well as stylist blends that are popular or well received. The app therefore may provide options, including featured selections for the technician, as well as the customer, to provide the current up to date (in real time or near real time) of trending styles, colors and products. The consumer and salon personnel therefore may have the benefit of information immediately pertinent to options that may be provided for a customer.

An alert for a consumer also may be generated when the consumer is geographically proximate to the salon location. The app, for example, may be configured to issue a pop-up alert, such as a screen display or text message, to tell the consumer to stop in the salon to check out a new product or for some other reason. The app also may generate messages and alters from time to time. For example, the app may provide on the screen a message "Style Alert! Brunettes are warm and spicy this fall" and "request a refreshing cinnamon spice color wash and treatment now". The app message may be customized based on the input characteristics and properties that the consumer has provided. For example, if the consumer/user of the app has a particular hair color, and a treatment applies to that color, the consumer may receive a message pertaining to that treatment. The app also may be configured to generate messages or seek feedback from a customer. For example, a solicitation message may be provided to the consumer: "We miss you. How is your color?" (seeking consumer feedback). The app also may be configured to display to the consumer key product trends by region or culture. This, for example, may be generated using the information collected and stored by the server for particular consumer types, regions or geographies, climates or other property associated with a consumer.

In addition, the app may be configured to not only ship replacement product to the consumer, but also to refill and/or make available for picked-up at the salon location, in addition to shipment by pre-ordering or reordering from an app. According to alternate embodiments, a call center may be provided for salon apps as well as consumer apps. Where the applications are used by a number of consumers and a number of salons or subscribing salons, the call center may serve all users, salons and consumers.

According to a preferred embodiment, the app may be configured with a component referred to as "The Professional Visual Studio". The visual studio component may evaluate the formulation data and record the most recognized formulas. It may then translate this information into a color trend or trends and provide this information to the consumer by drive these trends straight back to the consumer app.

According to a preferred embodiment, the app is configured with associated information, such as videos, graphics or demonstrations. Salon professionals may be able to watch tips, trends and techniques related to the formulas selected that appear below the chosen selection in an options menu.

The invention provides associations between retail, E-tail and service sales. The consumer using the app may receive a virtual consultation in the home or other location remote from the actual salon location. According to one embodiment, the application programming interface (API) may include an application that is a private (API) that integrates with a POS system provided to a vendor so that products, including custom formulated, recommended and selected products, may be provided to the consumer. The POS vendor may be an approved vendor, and may be validated through an approval procedure as a control of the system and procedures in place.

According to a preferred embodiment, the invention also provides a salon cloud store and a retail component. The cloud store may provide custom formulations, make recommendations, and be associated with the customer app. The client app, as discussed herein, may include loyalty programs for the client based on salon visits and purchases. The customer app preferably may be linked with or to social media sites of the customer, an individual salon, or the salon network or operator. A website portal also may be provided to be linked with the usage of the apparatus 210, the customer app and salon app.

Figure 27:
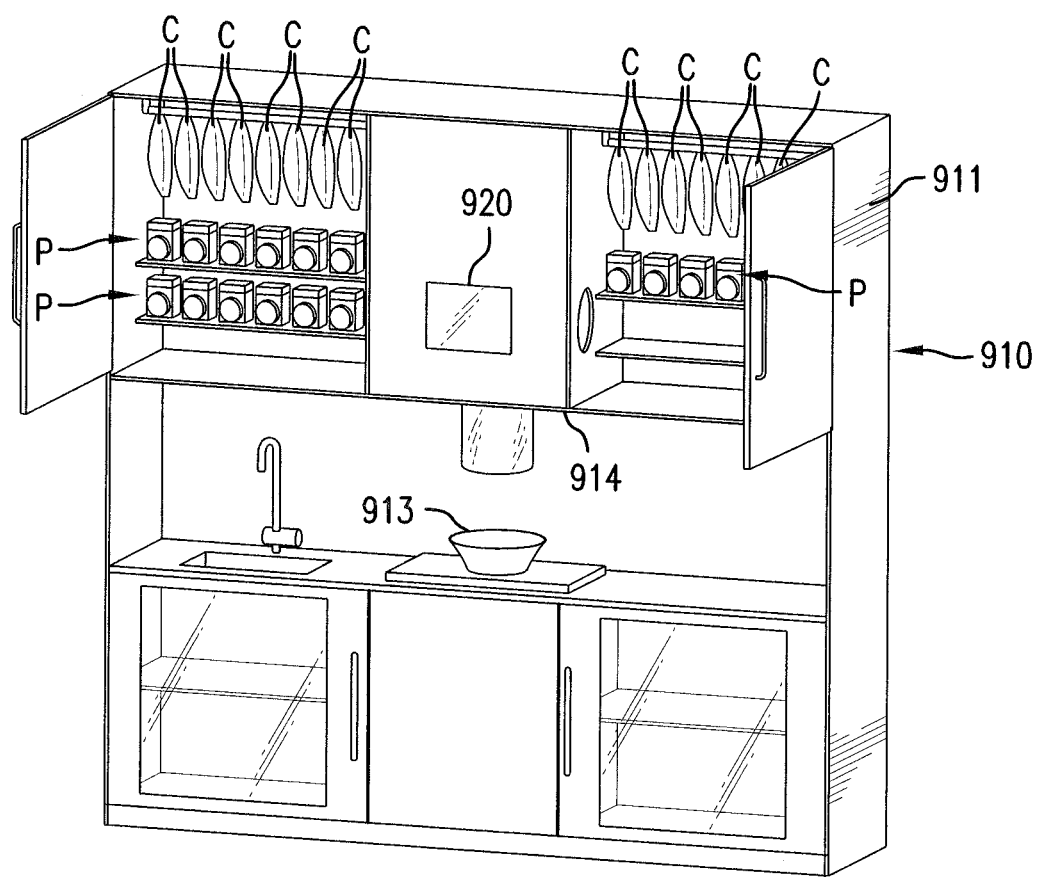
FIG. 27 is a perspective view of an alternate embodiment of a dispensing device according to the invention.

Referring to FIG. 27 an alternate embodiment of a dispensing apparatus is illustrated, showing a dispensing apparatus 910 configured with the dispensing mechanisms, such as the pumps generally referenced as "P", lines (not shown) and container bags (generally referenced as "C") located within the cabinet 911, and with dispensing nozzles provided to deliver components from the bags through the bottom of the upper cabinet enclosure 914 to a receptacle 913. The dispensing components preferably are configured as discussed herein in connection with the pumps, lines and bags shown and described with the dispensing apparatus 210. Although not shown, the control mechanism preferably resides within the cabinet 911 (or may be remote therefrom). A screen display 920, preferably a touch screen, is provided on the cabinet front panel and may be used to control the dispensing of product from the apparatus 910. The control mechanism and screen display may operate as shown and described herein in connection with the apparatus 210, and apps and applications shown and described in connection with displays, such as tablets.

Although not shown, a printer may be provided as part of, or in association with the dispensing apparatus shown and described herein, which print product information on a label that may be used to identify the product that is dispensed. The label may include the date dispensed, location, personnel requesting it, customer and formulation.

While preferred embodiments of the apparatus or devices 10,210 are described in connection with hair colorants, the dispensing apparatus may be used for dispensing one or more shampoos, conditioners or other products used in a wash area of a salon. For example, a first dispenser 10,210 configured with containers to supply and dispense colorant, may be provided in a first location, which may be where coloring is done, and a second dispenser 10,210 configured with shampoos and conditioners, may be provided where washing is done. The bags and device configurations for the wash area dispenser may be similar to the apparatus 10,210 as shown and described herein in connection with the hair colorant components.

A training system may be implemented in connection with the above systems or may be separately provided. The training system utilizes an image from a person and from software instructions may display that image along with preferred cutting instructional graphics to facilitate instruction of the method of cutting required to achieve the desired result. The instruction may comprise an overlay of an image provided on the display, and preferably a filtered translucent overlay, so that the display captures the person to whom the treatment, here a salon cut, is being applied, and the filtered translucent overlay is displayed relative to the location of the person and the image thereof. (See e.g., FIGS. 18 and 19) For example, if the person desired to receive a particular style, that cut may be instructed through the use of overlay lines and graphics which may appear on the display screen to direct where the hair should be angled and where the cut should be made. The implementation may be used in conjunction with the dispenser 10 the database and information provided, stored and collected thereby to integrate the instructional method, or may be separately used. According to preferred embodiments, the image is carried out by utilizing the pixel range and locations and using indications to overlay the pixels, where a filtered translucent overlay is provided. In some instances, where a background is utilized, the software may be programmed to distinguish pixels of hair, and its movement from other images and objects.

According to an alternate embodiment, a continuous monitoring mechanism may be implemented, so that once the cut is made to the actual physical hair of the individual and the individual's hair has settled, the computer software is instructed to continually monitor and track the hair location, and to provide further instructions on the next step. This may be done based on the current image being read and processed, as well as the steps already carried out. In this manner, the guiding of a hair stylist or technician may be accomplished with a continuous reference to the manipulations actually being made to the individual's physical hair.

While the invention has been described with reference to specific embodiments, the description is illustrative and is not to be construed as limiting the scope of the invention. Although the terms user and client and individual are used, the app may be carried out by a user, and in some instances, the app may be carried out by salon personnel, such as, for example, a salon technician, where the user is the client. Where appropriate, the user may be the client, and in other instances the user may be a salon professional. The app may have feature sets that are particular to the consumer or client user and may have limitations and feature sets that are for use by the salon or professional user. References to salon technician may include others at the salon that engage in or are capable of providing services that use the product dispensed or formulated with the apparatus disclosed herein, or provide services on a person's hair, such as hair styling or cutting services. Although screen displays are shown in FIGS. 10-26, features and displayed contents, although not shown on one of the screens depicted, may be generated to appear on the display as discussed herein, including for example, in accordance with selection options and menus described herein for making and storing manipulations to an image and generating a formula for dispensing. In addition, although the dispensing apparatus 210 is shown with six beauty product components, in six bags, the dispensing apparatus according to the invention may be provided to dispense different numbers of components. Accordingly, additional pumps and lines may be added to handle and dispense additional components. The control mechanism and formulas are configurable for use with the additional pumps and additional components. In addition, although bags are shown supported on a frame of the dispensing apparatus with hooks in some embodiments, the apparatus may be constructed in an alternate configuration where, in place of the hooks, a shelf and/or slots are provided for supporting the containers that contain the components. In addition, although the dispensing apparatus, method and system has been discussed and shown in accordance with preferred embodiments, for dispensing of hair dye components, the dispensing apparatus alternately may be configured to dispense shampoo, lotions and/or creams, that may be custom formulated for user, and the system may implement, as part of the application software, recommendations for dispensing formulas based on a user profile, which may include user skin, scalp or other profile information regarding the formulation of custom dispensed shampoos' conditioners, lotions and creams. Accordingly, a dispensing apparatus may be constructed to accommodate a larger number of pumps, component bags and associated lines, so that expansion may be accomplished using the same dispensing apparatus. Further, the control mechanism for operating the pumps that dispense the components may be linked with one or more remote servers to receive formulations and dispensing instructions, or alternatively, the control mechanism may include software that is configured with instructions to operate the dispensing apparatus to deliver a product, even where the dispensing apparatus is not connected to a remote server. The control mechanism may download information, including formulation information. In addition, although some features are mentioned in connection with the dispensing apparatus 10, those features may be utilized in connection with the dispensing apparatus 210. References herein to "cc" and "cc system" and "CCN" refer to "ColorCulture" which is a trademark of the Colorculture Network, LLC. The method, system and device also provide for on demand production of additional product, as needed. For example, at any time throughout the client visit, in the event that there is an immediate need for additional amount of product (e.g., of product already dispensed for that client), the formula associated with the client profile may be recalled and an additional amount of the formulation dispensed. Furthermore, even after a dispensing has been made, also at any time throughout the client's visit in the salon, alterations to the formulations may be made by retrieving the client profile on a computing device (e.g., such as for example, the salon tablet running the app, or the control mechanism of the dispensing apparatus), making the appropriate change, and having the dispensing apparatus 210 produce an altered formula product.

Figure 26:
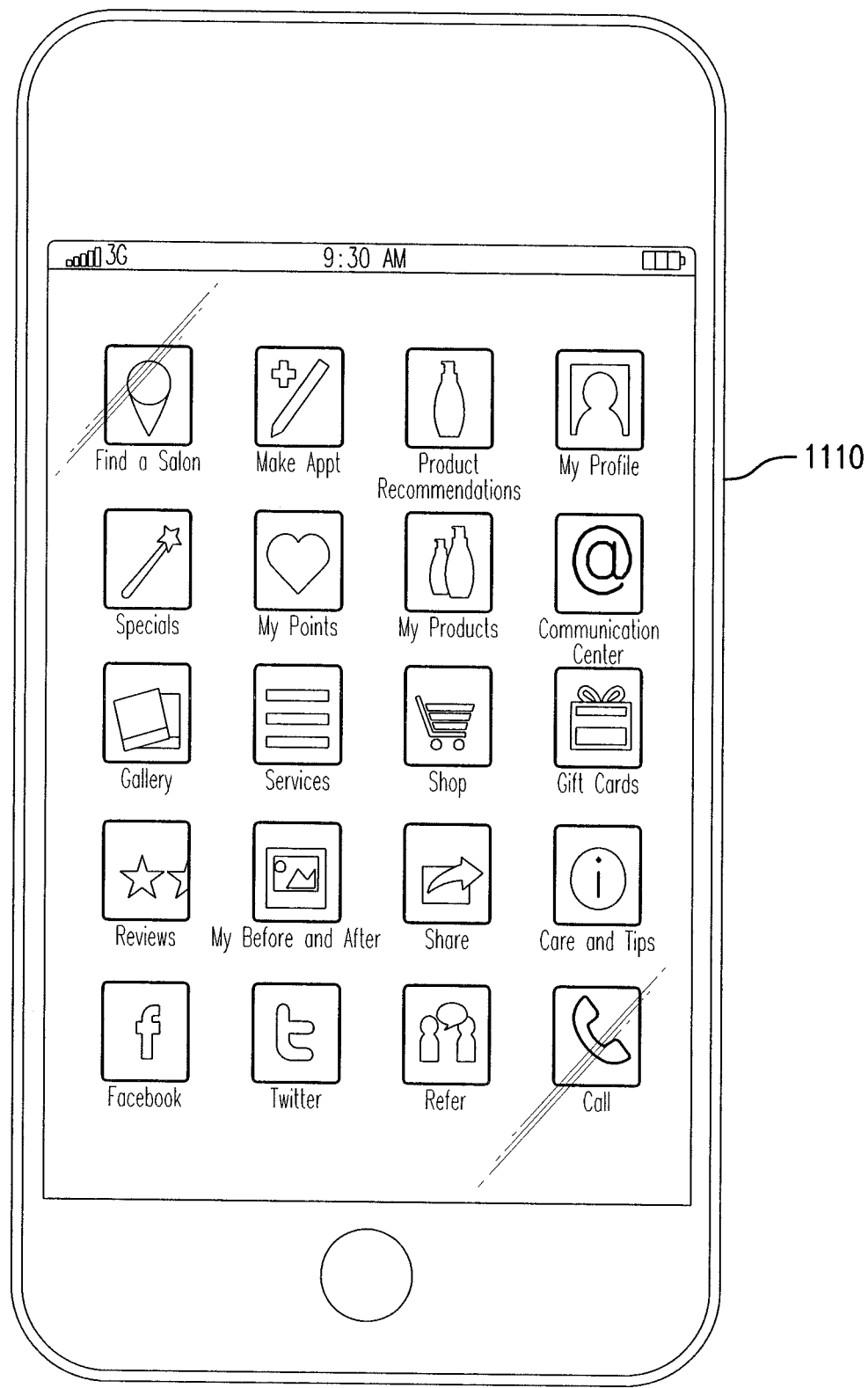
FIG. 26 is an exemplary embodiment of a screen display for a smartphone that may be used to operate the application.

The present system, device and method integrates the roles for mutual benefit for the manufacturer, salon owners, stylists and consumers through the implementation thereof. The manufacturer is able to save on marketing, sales, workforce, R&D, packaging, spoilage and diversion, for example. The salon owner may saves in waste and theft, and in addition, may build a client stream through the utilization and implementation of the app, which, according to some embodiments, facilitates driving of traffic to the destination then automatically establishes a refill protocol and reminds the consumer to set up future appointments for maintenance. The system, device and method automate tasks to provide a product replenishment procedure for the dispensing devices or apparatus and for retail sale to deliver to the consumer, preferably, in a seamless manner and, according to some options that may be implemented, without having to be prompted. The system, method and device further benefits the salon owner by minimizing efforts to deal with waste, theft expired product or unskilled, unmotivated staff that otherwise may not provide salon clients with a consistent experience. The present method, system and device provide a free-standing retail/sales outlet for a manufacturer or business owner that desires to enter the industry, such as, for example, the salon industry. The system, method and device preferably guides stylists through steps of the client experience, while, at the same time, permits creativity as a result of the customization of beauty products, such as customized hair coloring that may be formulated, controlled and selected. The present method, system and device further facilitate promotion of a salon and/or stylist by feeding clientele through the app. The stylist and customer may be guided through the most complete consultation possible. Stylists may utilize the app in conjunction with the device and system to receive and implement product and technique options and with the allowance and ability to adjust according to a desired result. Once established, the desired results preferably are stored and processed to dispense from the dispensing device the appropriate amount of product for the specified service. When services are completed, the app automatically recommends specific and personalized home care for the client based on frequency of visits to the salon as well as hair condition, age, exposure to the elements and other factors. This latter step and app feature is likely to generate increased sales for the salon, add a level of predictable, controlled consistency to the client experience, and encourage as well as establish a pattern of service and sales behavior in the consumer. The system, method and device provide a number of benefits for the consumer. First, the consumer is able to see actual haircolors and styles on their own actual hair. The system, method and device provide for the consumer or client to be presented with a manipulation applied to that individuals' own hair image. The present system, method and devices provide the consumer with a true to life simulation based on the stylist consultation in the salon, which depicts the natural image look of the consumer, as opposed to unnatural looking, pasted over images. The system, method and device further facilitate driving the consumer to the salon, through the implementation of some of the aforementioned selection and imaging features on an application or app for smartphones, (e.g., such as iPhones and Androids), tablets and other computing devices, that take the consumer through a similar but less sophisticated, or scaled down version to the salon version of the application. FIG. 26 depicts an exemplary screen and menu options for an app that may be used on a smartphone to implement the system and method in conjunction with the dispensing devices discussed and shown herein. According to some embodiments, once scheduled, the data stored in the consumer app is automatically downloaded, or available for automatic download, to the salon (e.g., the salon server or salon network server or other remote server) where the appointment is scheduled and saved for the appointment consultation, saving the consumer time and adding critical personal data to benefit the consultation process. Once completed, all relevant data like formulas, techniques, before and after images and sales data is pushed back up to the salon network database (and in some cases locally at the salon) and processed for the next salon visit at any location worldwide (in a participating or subscriber salon of the salon network). This present method, system and device, when implemented preferably increase consumer confidence, take the fear out of trying something new, recommend related products to the consumer based on a very specific and individual need and allow the consumer to freely travel from salon to salon without fear of losing formulas. In addition, the device and system may be configured to dispense product components from different manufacturers. For example, one manufacturer's product components may be utilized and the software configured to provide formulas for dispensing those components. Alternative formulas and software may be provided and utilized for components from a different manufacturer. According to some embodiments, a salon network utilizes a particular manufacturer's hair color product (or other products) and may have a first network of salons that utilize one type of manufacturer or brand product, and a second network of salons that use another manufacturer's product or brand. Various modifications and changes may occur to those skilled in the art without departing from the spirit and scope of the invention described herein and as defined by the appended claims.

What is claimed is:

1. A system for presenting a simulation of a hair application, comprising:
   a) a display that is configured to display an image thereon that comprises an electronic image of a person's hair that is acquired via a digital photographic image, wherein the electronic image of the person's hair depicts the image of the actual hair of the person that is to receive the hair application;
   b) a manipulation tool for manipulating on said display the electronic image of the person's hair appearing on said display to provide a responsive representation of a cut to be displayed;
   c) wherein said cut is displayed on said hair image on said display to simulate the use of a tool;
   d) wherein a depiction of a representative transformation to said hair image on said display is carried out by allowing the manipulation of the person's depicted hair to remove as much or as little hair as desired, and in locations desired, and
   e) wherein the transformation to said hair image depicted on the display is displayed to correspond with the use of said simulated tool by depicting the progression of said transformation being carried out on the person's hair image depicted on the display.

2. The system of claim 1, wherein said simulated tools include at least one simulated scissors, and wherein said tool may be operated to represent the action of said simulated tool on the person's hair image appearing on the display.

3. The system of claim 2, wherein said hair image may receive multiple manipulations, including retraction of a previously made manipulation.

4. The system of claim 1, further including instructions for carrying out steps to accomplish on the actual hair of a parson, the manipulated hair image.

5. The system of claim 4, wherein said instructions are presented in a step by step fashion.

6. The system of claim 5, wherein said instructions are visual instructions appearing on a display.

7. The system of claim 6, wherein said instructions appear on the display along with the displayed image of the person's hair.

8. The system of claim 7, wherein said instructions are presented in a visual graphic representation on said display, and wherein said instructions comprise the steps to obtain the desired result.

9. The system of claim 1, including a captured real-time image of the person, a localization of the person's hair as depicted in the image.

10. The system of claim 9, wherein a display of graphic representations comprising procedural steps to be carried out on the person's hair are provided, wherein the hair image of the person is displayed along with the display of the procedural step, and wherein the procedural step is depicted as applied to the person's hair image.

11. The system of claim 10, wherein each subsequent procedural step is represented on said person's hair image.

12. The system of claim 11, wherein said hair manipulations of said person's hair displayed on said display are carried out with a filtered translucent overlay that retains the image of the individual and differentiates the hair portion in the displayed image.

13. The system of claim 1, wherein said persons hair image is manipulated to represent one or more cutting steps, and wherein said person's hair image is transformed to represent one or more color manipulations that represent a color applied to one or more portions of the person's hair image.

14. The system of claim 1, wherein said person's hair image comprises a separation visual, said separation visual comprising a separate graphic image of the person's hair, and wherein said person's face image is displayed, and wherein said hair image may be manipulated apart from said face image.

15. The system of claim 1, including: a processor, and a selection on said display of a manipulation menu that includes one or more tools from which to choose; wherein the image of the person's hair is displayed along with an image of the person's face; wherein said person's image is transformed on said display based on a selected tool applied to said display, and wherein said person's hair image is transformed independently of the image of the person's face.

16. The system of claim 1, wherein said person's hair image comprises a photographic image of an individual on a white, black, blue or green screen; said system including storage media for storing the photographic image electronically; the system manipulating the image to remove background that is not the hair of the person represented in the photograph; wherein the system generates a representation of a hair treatment selection and effects, including stages of a haircut to be done, based on manipulations performed on the image appearing on the display.

17. The system of claim 16, wherein the system generates and applies a filtered translucent overlay to present the image on the display; and wherein the filtered translucent overlay is generated in conjunction with the manipulation applied to the person's hair image.

18. The system of claim 17, wherein the system tracks manipulations and provides for undoing a cut or other manipulation.

19. A system for presenting a simulation of a hair application, comprising:
   a) a display;
   b) a manipulation tool for manipulating on said display the electronic image of a person's hair appearing on said display to provide a responsive representation of a cut to be displayed;
   c) wherein said cut is displayed on said hair image on said display to simulate the use of a tool;
   d) wherein a depiction of a representative transformation to said hair image on said display is carried out by allowing the manipulation of the person's depicted hair to remove as much or as little hair as desired, and in locations desired,
   e) wherein the transformation to said hair image depicted on the display is displayed to correspond with the use of said simulated tool by depicting the progression of said transformation being carried out on the person's hair image depicted on the display, and
   f) further comprising: a dispenser that dispenses a plurality of beauty product components from containers to produce a beauty product.

20. The system of claim 19, wherein said dispenser includes a control mechanism and a delivery mechanism.

21. The system of claim 20, wherein said control mechanism regulates the operation of said delivery mechanism to deliver dosages of a plurality of said respective beauty product components to produce a beauty product.

22. The system of claim 21, wherein said dispenser includes a dispensing outlet and a plurality of lines, wherein each line of said plurality of lines has a passageway therethrough, and wherein each said line communicatively links one of said plurality of said containers with said dispensing outlet.

23. The system of claim 21, wherein said delivery mechanism includes a plurality of pumps that deliver the respective plurality of beauty product components from their respective containers to a respective plurality of output nozzles.

* * * * *